US012771073B2

(12) United States Patent
Ho

(10) Patent No.: US 12,771,073 B2
(45) Date of Patent: Oct. 20, 2026

(54) ELECTRICAL CONNECTION DEVICE

(71) Applicant: Molex, LLC, Lisle, IL (US)

(72) Inventor: Yi-Tse Ho, New Taipei City (TW)

(73) Assignee: Molex, LLC, Lisle, IL (US)

( * ) Notice: Subject to any disclaimer, the term of this patent is extended or adjusted under 35 U.S.C. 154(b) by 346 days.

(21) Appl. No.: 18/412,647

(22) Filed: Jan. 15, 2024

(65) Prior Publication Data

US 2024/0250476 A1 Jul. 25, 2024

(30) Foreign Application Priority Data

Jan. 19, 2023 (CN) ......................... 202310087646.7
Jul. 25, 2023 (CN) ......................... 202310920079.9

(51) Int. Cl.
*H01R 13/64* (2006.01)
*H01R 12/72* (2011.01)

(52) U.S. Cl.
CPC ........... *H01R 13/64* (2013.01); *H01R 12/724* (2013.01)

(58) Field of Classification Search
None
See application file for complete search history.

(56) References Cited

U.S. PATENT DOCUMENTS 3,281,753 A * 10/1966 Fink ....................... H01R 13/28 439/291
3,404,362 A * 10/1968 Amendola ......... H01R 12/7005 439/79
3,434,098 A * 3/1969 Schumacher .......... H01R 31/00 439/358
10,129,443 B2 * 11/2018 Shiraishi ................ H01R 13/64
11,239,600 B2 * 2/2022 Ishikawa ............ H01R 13/5202
12,347,951 B2 * 7/2025 Ho ..................... H01R 12/7029
2018/0062298 A1 3/2018 Mogi

FOREIGN PATENT DOCUMENTS

CN 210272770 U 4/2020
CN 216389865 U 4/2022
CN 216850571 U 6/2022
EP 2525442 A2 * 11/2012 ......... H01R 13/6474
TW M625406 U 4/2022

* cited by examiner

*Primary Examiner* — Tho D Ta

(57) ABSTRACT

An electrical connection device includes a first panel and a first connector. The first panel includes a first panel foolproof portion. The first connector includes a first insulative outer housing, two first terminals and two first cables. The first insulative outer housing is provided to the first panel and has a first housing foolproof portion which cooperates with the first panel foolproof portion, the two first terminals are diagonally provided to the first insulative outer housing, the two first cables are electrically connected with the two first terminals, respectively. By that, the two first terminals are diagonally provided to the first insulative outer housing, a volume of the first connector. By that the first housing foolproof portion cooperates with the first panel foolproof portion, it can prevent the first insulative outer housing from being wrongly reversely assembled to the first panel.

21 Claims, 57 Drawing Sheets

D3
D2

ELECTRICAL CONNECTION DEVICE

RELATED APPLICATION

The present application claims priority to Chinese Patent Application No. 202310087646.7 filed on Jan. 19, 2023, and Chinese Patent Application No. 202310920079.9 filed on Jul. 25, 2023, both of which are incorporated by reference in their entireties.

TECHNICAL FIELD

The present disclosure relates to an electrical connection device, and particularly relates to an electrical connection device which has a miniaturized connector.

BACKGROUND

A connector of an existing electrical connection device generally is electrically connected by that two terminals respectively contact two mating terminals of a mating connector. Because the two terminals and the two mating terminals are arranged and spaced apart from each other along a transverse direction respectively, a length dimension of the connector taken along the transverse direction and a length dimension of the mating connector taken along the transverse direction will be respectively affected by an arrangement manner of the two terminals and an arrangement manner of the two mating terminals and thus are difficult to be reduced, such that volumes of the connector, the mating connector and the electrical connection device are large, which results in that the electrical connection device cannot be applied in a circumstance of miniaturized product. Moreover, as various application circumstances are different, how to make the structure of the electrical connection device can meet need of application circumstance also is a subject to be overcome.

SUMMARY

Therefore, one of objects of the present disclosure is to provide an electrical connection device which can overcome at least one deficiency of existing art.

Accordingly, an electrical connection device of the present disclosure comprises a first panel and a first connector. The first panel comprises a first panel foolproof portion. The first connector comprises a first insulative outer housing, two first terminals and two first cables. The first insulative outer housing is provided to the first panel and has a first housing foolproof portion which cooperates with the first panel foolproof portion, the two first terminals are diagonally provided to the first insulative outer housing, the two first cables are electrically connected with the two first terminals, respectively.

In some embodiments, the first panel comprises a first front face and a first back face, the first panel foolproof portion is a penetrating hole which extends between the first front face and the first back face, a shape of the penetrating hole is an asymmetric shape, the first housing foolproof portion is a housing body which is provided to the first panel foolproof portion and partially protrudes from the first front face, a shape of the housing body is an asymmetric shape, a front face shape of the first housing foolproof portion is the same as a front face shape of the first panel foolproof portion but is different from a back face shape of the first panel foolproof portion.

In some embodiments, the first panel foolproof portion is a penetrating hole, a shape of the penetrating hole is an asymmetric shape, the first insulative outer housing further has a first mounting plate which abuts against the first panel, the first housing foolproof portion is a housing body which protrudes from an end of the first mounting plate, is provided to the first panel foolproof portion, and partially protrudes from the first panel, a shape of the housing body is an asymmetric shape.

In some embodiments, the first mounting plate is in form of rectangular plate shape, the first insulative outer housing further has two first mounting portions which are provided to the first mounting plate and are mounted to the first panel, the two first terminals are obliquely arranged along a first diagonal line of the first mounting plate, the two first mounting portions are obliquely arranged along a second diagonal line of the first mounting plate, the second diagonal line intersects the first diagonal line.

In some embodiments, the first panel is formed with two first engaging portions, each first engaging portion is a circular through hole, each first mounting portion is a protruding ring which protrudes from the first mounting plate and is received in the corresponding first engaging portion, a hole edge of each first engaging portion is spaced apart from an outer circumferential edge of the corresponding first mounting portion, each first mounting portion is capable of floating in the corresponding first engaging portion.

In some embodiments, the first connector further comprises two first fastening assemblies, each first fastening assembly is provided to the corresponding first mounting portion, the first mounting plate and the first panel, so as to make the first panel and the first insulative outer housing securely engaged together.

In some embodiments, the first insulative outer housing further has a first support housing body which protrudes from an end of the first mounting plate opposite to the first housing foolproof portion, the first mounting plate, the first housing foolproof portion and the first support housing body together define two first receiving grooves, each first receiving groove allows the corresponding first terminal and a part of the corresponding first cable to be received therein, the first support housing body is similar to the first housing foolproof portion in shape and is used to support the two first cables.

In some embodiments, the electrical connection device further comprises a second connector mating with the first connector, the second connector comprises two second terminals which are diagonally provided, the two second terminals are respectively electrically connected with the two first terminals.

In some embodiments, each first terminal is a female terminal, the first insulative outer housing is formed with two first receiving grooves which allow the two first terminals to be respectively received therein, the first insulative outer housing has two circumferential edge portions which respectively encircle the two first receiving grooves, each second terminal is a male terminal and has a guiding conical surface, the guiding conical surface is used to allow the corresponding circumferential edge portion to contact therewith and guide the corresponding circumferential edge portion to slide thereon.

In some embodiments, the electrical connection device further comprises a second panel, the second panel comprises a second panel foolproof portion, the second connector further comprises a second insulative outer housing and two second cables, the second insulative outer housing is provided to the second panel and has a second housing foolproof portion which cooperates with the second panel foolproof portion, the two second terminals are diagonally provided to the second insulative outer housing and are electrically connected with the two second cables respectively.

In some embodiments, the first panel comprises a first front face and a first back face, the first panel foolproof portion is a penetrating hole which extends between the first front face and the first back face, a shape of the penetrating hole is an asymmetric shape, the first housing foolproof portion is a housing body which is provided to the first panel foolproof portion and partially protrudes from the first front face, a shape of the housing body is an asymmetric shape, a front face shape of the first housing foolproof portion is the same as a front face shape of the first panel foolproof portion but is different from a back face shape of the first panel foolproof portion, the second panel comprises a second front face which faces the first front face and a second back face, the second panel foolproof portion is a penetrating hole which extends between the second front face and the second back face, a shape of the penetrating hole is an asymmetric shape, the second housing foolproof portion is a housing body which is provided to the second panel foolproof portion and partially protrudes from the second front face, a shape of the housing body is an asymmetric shape, a front face shape of the second housing foolproof portion is the same as a front face shape of the second panel foolproof portion but is different from a back face shape of the second panel foolproof portion, the front face shape of the first housing foolproof portion and the front face shape of the second panel foolproof portion are different from each other, the front face shape of the second housing foolproof portion and the front face shape of the first panel foolproof portion are different from each other.

In some embodiments, the second panel foolproof portion is a penetrating hole, a shape of the penetrating hole is an asymmetric shape, the second insulative outer housing further has a second mounting plate which abuts against the second panel, the second housing foolproof portion is a housing body which protrudes from an end of the second mounting plate, is provided to the second panel foolproof portion, and partially protrudes from the second panel, a shape of the housing body is an asymmetric shape.

In some embodiments, the second mounting plate is in form of rectangular plate shape, the second insulative outer housing further has two second mounting portions which are provided to the second mounting plate and are mounted to the second panel, the two second terminals are obliquely arranged along a first diagonal line of the second mounting plate, the two second mounting portions are obliquely arranged along a second diagonal line of the second mounting plate, the second diagonal line intersects the first diagonal line.

In some embodiments, the second panel is formed with two second engaging portions, each second engaging portion is a circular through hole, each second mounting portion is a protruding ring which protrudes from the second mounting plate and is received in the corresponding second engaging portion, a hole edge of each second engaging portion is spaced apart from an outer circumferential edge of the corresponding second mounting portion, each second mounting portion is capable of floating in the corresponding second engaging portion.

In some embodiments, the second connector further comprises two second fastening assemblies, each second fastening assembly is provided to the corresponding second mounting portion, the second mounting plate and the second panel, so as to make the second panel and the second insulative outer housing securely engaged together.

In some embodiments, the second insulative outer housing further has a second support housing body which protrudes from an end of the second mounting plate opposite to the second housing foolproof portion, the second mounting plate, the second housing foolproof portion and the second support housing body together define two second receiving grooves, each second receiving groove allows the corresponding second terminal and a part of the corresponding second cable to be received therein, the second support housing body is similar the second housing foolproof portion in shape and is used to support the two second cables.

In some embodiments, the electrical connection device further comprises a circuit board, the second connector further comprises an insulative base which is provided to the circuit board, each first terminal is a female terminal which provided in the first insulative outer housing, each second terminal is a male terminal, the two second terminals are diagonally provided to the insulative base and partially protrude from the insulative base.

In some embodiments, the second connector is a straight board-end connector, the insulative base is in form of rectangular base shape and is formed with two apertures, the two second terminals are respectively provided to the two apertures and are electrically connected to the circuit board.

In some embodiments, the second connector is a right-angle board-end connector, the insulative base is in form of rectangular shell shape, the second connector further comprises at least two adapting plates which are provided in the insulative base and are electrically connected to the circuit board, the adapting plates are arranged and spaced apart from each other along a first direction and are respectively electrically connected to the two second terminals.

In some embodiments, the adapting plates respectively are a first adapting plate and a second adapting plate, the first adapting plate is formed with a first retaining hole, the second adapting plate is formed with a second retaining hole, the two second terminals respectively are a first male terminal and a second male terminal, the first male terminal and the second male terminal each are in form of post shape and extend along the first direction, the first male terminal has a first mating segment which is exposed from the insulative base and is used to mate with the corresponding first terminal and a first retaining segment which is retained to the first retaining hole, the second male terminal has a second mating segment which is exposed from the insulative base and is used to mate with the corresponding first terminal and a second retaining segment which is retained to the second retaining hole.

In some embodiments, a length of the second male terminal extending along the first direction is larger than a length of the first male terminal extending along the first direction.

In some embodiments, the first male terminal further has a first positioning segment which inserts into the insulative base and is between the first mating segment and the first retaining segment, an outer diameter of the first positioning segment is larger than an outer diameter of the first retaining segment and the first positioning segment is stopped to the first adapting plate, the second male terminal further has a second positioning segment which inserts into the insulative base and is between the second mating segment and the second retaining segment, an outer diameter of the second positioning segment is larger than an outer diameter of the second retaining segment and the second positioning segment is stopped to the second adapting plate.

In some embodiments, the first adapting plate is further formed with a first through hole which corresponds to the second retaining hole, the second positioning segment passes through the first through hole, an outer circumferential surface of the second positioning segment is radially recessed to form an annular avoiding groove, the annular avoiding groove corresponds to the first through hole in position.

In some embodiments, the second connector further comprises a third adapting plate and a fourth adapting plate which are provided in the insulative base, the third adapting plate is positioned between the first adapting plate and the second adapting plate and is formed with a third retaining hole which corresponds to the first retaining hole, the fourth adapting plate is positioned to a side of the second adapting plate opposite to the third adapting plate, the fourth adapting plate is formed with a fourth retaining hole which corresponds to the second retaining hole, the first male terminal further has a third retaining segment which is retained to the third retaining hole, the second male terminal further has a fourth retaining segment which is retained to the fourth retaining hole.

In some embodiments, the first male terminal further has a first stopping segment which extends from the first retaining segment, an outer diameter of the first stopping segment is smaller than the outer diameter of the first retaining segment and the first stopping segment is stopped to the third adapting plate, the third retaining segment extends from the first stopping segment and an outer diameter of the third retaining segment is smaller than the outer diameter of the first stopping segment, the second male terminal further has a second stopping segment which extends from the second retaining segment, an outer diameter of the second stopping segment is smaller than the outer diameter of the second retaining segment and the second stopping segment is stopped to the fourth adapting plate, the fourth retaining segment extends from the second stopping segment and an outer diameter of the fourth retaining segment is smaller than the outer diameter of the second stopping segment.

In some embodiments, the first adapting plate is further formed with a first through hole which corresponds to the second retaining hole, the third adapting plate is further formed with a second through hole which corresponds to the first through hole, the second positioning segment passes through the first through hole and the second through hole, an outer circumferential of the second positioning segment surface is radially recessed to form an annular avoiding groove, the annular avoiding groove corresponds to the first through hole and the second through hole in position.

In some embodiments, the second connector comprises four adapting plates, each second terminal is electrically connected to the two corresponding adapting plates.

In some embodiments, each adapting plate has a plurality of soldering legs which are soldered to the circuit board, the plurality of soldering legs are arranged and spaced apart from each other along a second direction which is perpendicular to the first direction.

In some embodiments, the insulative base is formed with inserting grooves which are arranged and spaced apart from each other along the first direction, the inserting grooves are different from each other in shape, the adapting plates are different from each other in shape, each adapting plate is constructed to only be the same as one corresponding inserting groove in shape so that the adapting plate is capable of inserting into the one corresponding inserting groove.

In some embodiments, the inserting grooves each have a first groove portion and a second groove portion communicated to the first groove portion, the first groove portion and the second groove portion are arranged along a second direction which is perpendicular to the first direction and are respectively adjacent to opposite sides of the insulative base, a length of the second groove portion taken along a third direction is larger than a length of the first groove portion taken along the third direction, the third direction is perpendicular to the first direction and the second direction, lengths of the first groove portions of the inserting grooves taken along the second direction are not the same and the lengths of the first groove portions of the inserting grooves taken along the third direction are not the same, the lengths of the second groove portions of the inserting grooves along the third direction are the same, the adapting plates each have a first plate body which inserts into the first groove portion of the corresponding inserting groove and a second plate body which inserts into the second groove portion of the corresponding inserting groove, the first plate body and the second plate body are arranged along the second direction, a length of the second plate body taken along the third direction is larger than a length of the first plate body taken along the third direction, lengths of the first plate bodies of the adapting plates taken along the second direction are not the same, and lengths of the first plate bodies of the adapting plates taken along the third direction are not the same, the lengths of the second plate bodies of the adapting plates taken along the third direction are the same.

In some embodiments, the insulative base has a mating face which mates with the first insulative outer housing and a back face which is opposite to the mating face, the lengths of the first groove portions of the inserting grooves taken along the second direction gradually decrease in the first direction from the mating face toward the back face, and the lengths of the first groove portions of the inserting grooves taken along the third direction gradually decrease in the first direction from the mating face toward the back face, the lengths of the first plate bodies of the adapting plates taken along the second direction gradually decrease in the first direction from the mating face toward the back face, and the lengths of the first plate bodies of the adapting plates taken along the third direction gradually decrease in the first direction from the mating face toward the back face.

Accordingly, an electrical connection device of the present disclosure comprises a first connector and a second connector. The first connector comprises a first insulative outer housing, at least two first terminals and at least two first cables, the first insulative outer housing has a first locking structure, the first terminals is provided to the first insulative outer housing, the first cables is respectively electrically connected with the first terminals. The second connector is used to mate with the first connector and comprises a second insulative outer housing, at least two second terminals and at least two second cables, the second insulative outer housing has a second locking structure which is used to latch to the first locking structure, the second terminals are provided to the second insulative outer housing and are respectively used to be electrically connected to the first terminals, the second cables are respectively electrically connected with the second terminals.

In some embodiments, the first insulative outer housing further has a first housing body, the first housing body is formed with a recessed portion, the first terminals are obliquely arranged and are provided to the first housing body, the first locking structure is provided to the recessed portion, and the first locking structure and the first terminals are in form of triangular arrangement, the second insulative outer housing further has a second housing body, the second terminals are obliquely arranged and are provided to the second housing body, the second locking structure protrudes from the second housing body, and the second locking structure and the second terminals are in form of triangular arrangement.

In some embodiments, the first connector comprises three first terminals and three first cables which are respectively electrically connected the three first terminals, the three first terminals are in form of triangular arrangement, the second connector comprises three second terminals and three second cables which are respectively electrically connected with the three second terminals, the three second terminals are in form of triangular arrangement.

In some embodiments, the first insulative outer housing further has a first housing body which allows the three first terminals to be provided thereto, the first housing body is formed with a recessed portion which is between the three first terminals, the first locking structure is provided to the recessed portion and is between the three first terminals, the second insulative outer housing further has a second housing body which allows the three second terminals to be provided thereto, the second locking structure protrudes from the second housing body and is between the three second terminals.

In some embodiments, the electrical connection device further comprises a panel, the panel comprises a panel foolproof portion, the second housing body is provided to the panel and has a housing foolproof portion which cooperates with the panel foolproof portion.

In some embodiments, the panel foolproof portion is a penetrating hole, a shape of the penetrating hole is an asymmetric shape, the second housing body has a mounting plate which abuts against the panel, the housing foolproof portion is a housing body which protrudes from an end of the mounting plate, is provided to the panel foolproof portion, and partially protrudes from the panel, a shape of the housing body is an asymmetric shape.

In some embodiments, the second housing body has a mounting plate which abuts against the panel and two mounting portions which are provided to the mounting plate and are mounted to the panel, one mounting portion of the two mounting portions and the second terminals are in form of triangular arrangement and the one mounting portion is transversely arranged at an outer side of the second locking structure, the other mounting portion of the two mounting portions and the second terminals are in form of triangular arrangement, and the other mounting portion and the second locking structure are obliquely arranged, the second connector further comprises two fastening assemblies, each fastening assembly is provided to the corresponding mounting portion, the mounting plate and the panel, so as to make the panel and the second housing body securely engaged together.

In some embodiments, the panel is formed with two engaging portions, each engaging portion is a circular through hole, each mounting portion is a protruding ring which protrudes from the mounting plate and is received in the corresponding engaging portion, a hole edge of each engaging portion is spaced apart from an outer circumferential edge of the corresponding mounting portion, each mounting portion is capable of floating in the corresponding engaging portion.

Accordingly, an electrical connection device of the present disclosure comprises a first connector, a first circuit board and a second connector. The first connector comprises a first insulative outer housing and two first terminals which are diagonally provided to the first insulative outer housing. The first circuit board is used to be electrically connected to the two first terminals. The second connector is used to mate with the first connector and comprises a second insulative outer housing and two second terminals which are diagonally provided to the second insulative outer housing, the two second terminals are respectively used to be electrically connected to the two first terminals.

In some embodiments, the first insulative outer housing is formed with an avoiding recessed groove, the avoiding recessed groove and the two first terminals are in form of triangular arrangement, the second insulative outer housing has a locking structure which is used to be received in the avoiding recessed groove, the locking structure and the two second terminals are in form of triangular arrangement.

In some embodiments, each first terminal is a female terminal, each second terminal is a male terminal which partially protrudes from the second insulative outer housing.

In some embodiments, the second connector is a straight board-end connector, the second insulative outer housing is formed with two apertures, the two second terminals are respectively provided to the two apertures, the electrical connection device further comprises a second circuit board which is electrically connected with the two second terminals.

In some embodiments, the electrical connection device further comprises a panel, the second insulative outer housing is provided to the panel, the second connector further comprises two cables which are respectively electrically connected with the two second terminals, a side surface of the second insulative outer housing is formed with two side cable-exiting openings, a part of each cable is received in the second insulative outer housing and exits via the corresponding side cable-exiting opening.

In some embodiments, the panel comprises a panel foolproof portion, the second insulative outer housing is provided to the panel and has a housing foolproof portion which cooperates with the panel foolproof portion.

In some embodiments, the panel foolproof portion is a penetrating hole, a shape of the penetrating hole is an asymmetric shape, the second insulative outer housing has a mounting plate which abuts against the panel, the housing foolproof portion is a housing body which protrudes from an end of the mounting plate, is provided to the panel foolproof portion, and partially protrudes from the panel, a shape of the housing body is an asymmetric shape.

In some embodiments, the second insulative outer housing has a mounting plate which abuts against the panel and two mounting portions which are provided to the mounting plate and are mounted to the panel, the two second terminals are obliquely arranged, the two mounting portions are obliquely arranged, the second connector further comprises two fastening assemblies, each fastening assembly is provided to the corresponding mounting portion, the mounting plate and the panel, so as to make the panel and the insulative base securely engaged together.

In some embodiments, the panel is formed with two engaging portions, each engaging portion is a through hole, each mounting portion is a protruding ring which protrudes from the mounting plate and is received in the corresponding engaging portion, a hole edge of each engaging portion is spaced apart from an outer circumferential edge of the corresponding mounting portion, each mounting portion is capable of floating in the corresponding engaging portion.

In some embodiments, the first connector is a straight board-end connector, the first insulative outer housing is formed with two perforations, the two first terminals are respectively provided to the two perforations and are electrically connected to the first circuit board.

In some embodiments, the first connector is a right-angle board-end connector, the first connector further comprises a first adapting plate and a second adapting plate which are provided in the first insulative outer housing, the first adapting plate and the second adapting plate are arranged and spaced apart from each other along a first direction and are respectively electrically connected to two first terminals, the first adapting plate and the second adapting plate are electrically connected to the first circuit board.

In some embodiments, the first adapting plate is formed with a first retaining hole, the second adapting plate is formed with a second retaining hole, the two first terminals are respectively a first female terminal and a second female terminal, the first female terminal and the second female terminal each have a contacting member which is used to mate with the corresponding second terminal and an inserting post which extends along the first direction, the inserting post of the first female terminal has a first retaining segment which is retained to the first retaining hole, the inserting post of the second female terminal has a second retaining segment which is retained to the second retaining hole.

In some embodiments, a length of the second female terminal extending along the first direction is larger than a length of the first female terminal extending along the first direction.

In some embodiments, the inserting post of the first female terminal further has a first positioning segment which inserts into the first insulative outer housing and is between the contacting member and the first retaining segment, an outer diameter of the first positioning segment is larger than an outer diameter of the first retaining segment and the first positioning segment is stopped to the first adapting plate, the inserting post of the second female terminal further has a second positioning segment which inserts into the first insulative outer housing and is between the contacting member and the second retaining segment, an outer diameter of the second positioning segment is larger than an outer diameter of the second retaining segment and the second positioning segment is stopped to the second adapting plate.

In some embodiments, the first adapting plate is further formed with a first through hole which corresponds to the second retaining hole, the second positioning segment passes through the first through hole, an outer circumferential surface of the second positioning segment is radially recessed to form an annular avoiding groove, the annular avoiding groove corresponds to the first through hole in position.

In some embodiments, the first adapting plate and the second adapting plate each have a plurality of soldering legs which are soldered to the first circuit board, the plurality of soldering legs are arranged and spaced apart from each other along a second direction which is perpendicular to the first direction.

In some embodiments, the first insulative outer housing is formed with a first inserting groove and a second inserting groove which are arranged and spaced apart from each other along the first direction, the first inserting groove and the second inserting groove are different from each other in shape, the first adapting plate and the second adapting plate are different from each other in shape, the first adapting plate is constructed to only be the same as the first inserting groove in shape so that the first adapting plate is capable of inserting into the first inserting groove, the second adapting plate is constructed to only be the same as the second inserting groove in shape so that the second adapting plate is capable of inserting into the second inserting groove.

In some embodiments, the first inserting groove and the second inserting groove each have a first groove portion and a second groove portion communicated to the first groove portion, the first groove portion and the second groove portion are arranged along a second direction which is perpendicular to the first direction and are respectively adjacent to opposite sides of the first insulative outer housing, a length of the second groove portion taken along a third direction is larger than a length of the first groove portion taken along the third direction, the third direction is perpendicular to the first direction and the second direction, lengths of the first groove portions of the first inserting groove and the second inserting groove taken along the second direction are not the same, and the lengths of the first groove portions of the first inserting groove and the second inserting groove taken along the third direction are not the same, the lengths of the second groove portions of the first inserting groove and the second inserting groove taken along the third direction are the same, the first adapting plate and the second adapting plate each have a first plate body which inserts into the corresponding first groove portion and a second plate body which inserts into the corresponding second groove portion, the first plate body and the second plate body are arranged along the second direction, a length of the second plate body taken along the third direction is larger than a length of the first plate body taken along the third direction, lengths of the first plate bodies of the first adapting plate and the second adapting plate taken along the second direction are not the same, and the lengths of the first plate bodies of the first adapting plate and the second adapting plate taken along the third direction are not the same, the lengths of the second plate bodies of the first adapting plate and the second adapting plate taken along the third direction are the same.

In some embodiments, the first insulative outer housing has a mating face which mates with the second insulative outer housing and a back face which is opposite to the mating face, the lengths of the first groove portions of the first inserting groove and the second inserting groove taken along the second direction gradually decrease in the first direction from the mating face toward the back face, and the lengths of the first groove portions of the first inserting groove and the second inserting groove taken along the third direction gradually decrease in the first direction from the mating face toward the back face, the lengths of the first plate bodies of the first adapting plate and the second adapting plate taken along the second direction gradually decrease in the first direction from the mating face toward the back face, and the lengths of the first plate bodies of the first adapting plate and the second adapting plate taken along the third direction gradually decrease in the first direction from the mating face toward the back face.

The present disclosure at least has the following effect: by that the volume of the first connector and the volume of the second connector can be miniaturized, the volume of the electrical connection device constituted by the first connector and the second connector also can be miniaturized and can be applied in the circumstance of miniaturized product. Moreover, by providing the technical solution that different style connectors mate with each other, the electrical connection device can be applied in circumstances having different needs.

BRIEF DESCRIPTION OF THE DRAWINGS

Other features and effects of the present disclosure will be apparent from embodiments with reference to the drawings, in which.

DETAILED DESCRIPTION

Figure 1:
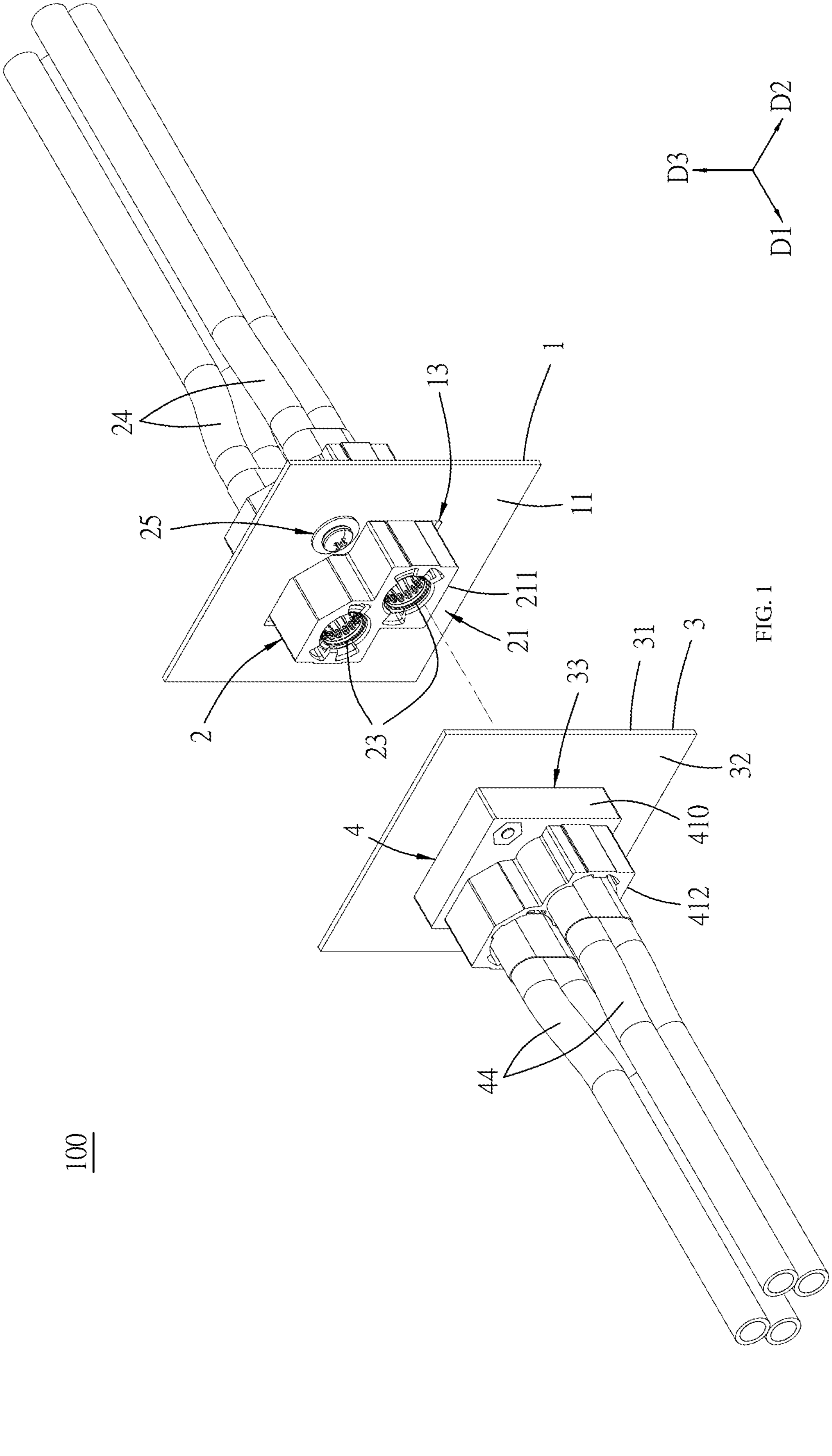
FIG. 1 is a perspective exploded view of a first embodiment of an electrical connection device of the present disclosure.

Before the present disclosure is described in detail, it is noted that the similar elements are indicated by the same reference numerals in the following description.

Figure 2:
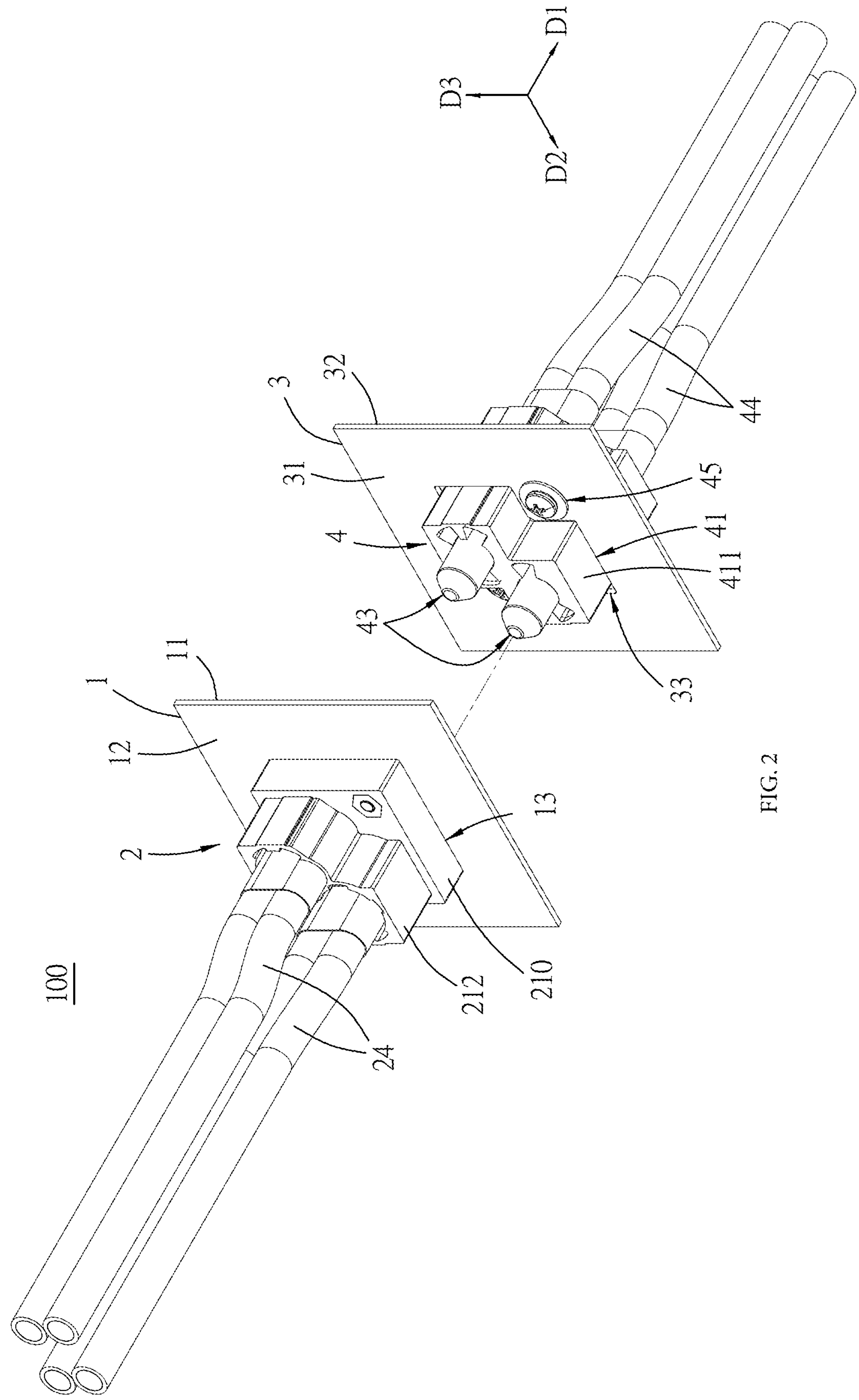
FIG. 2 is a perspective exploded view of the first embodiment viewed from another angle.
Figure 3:
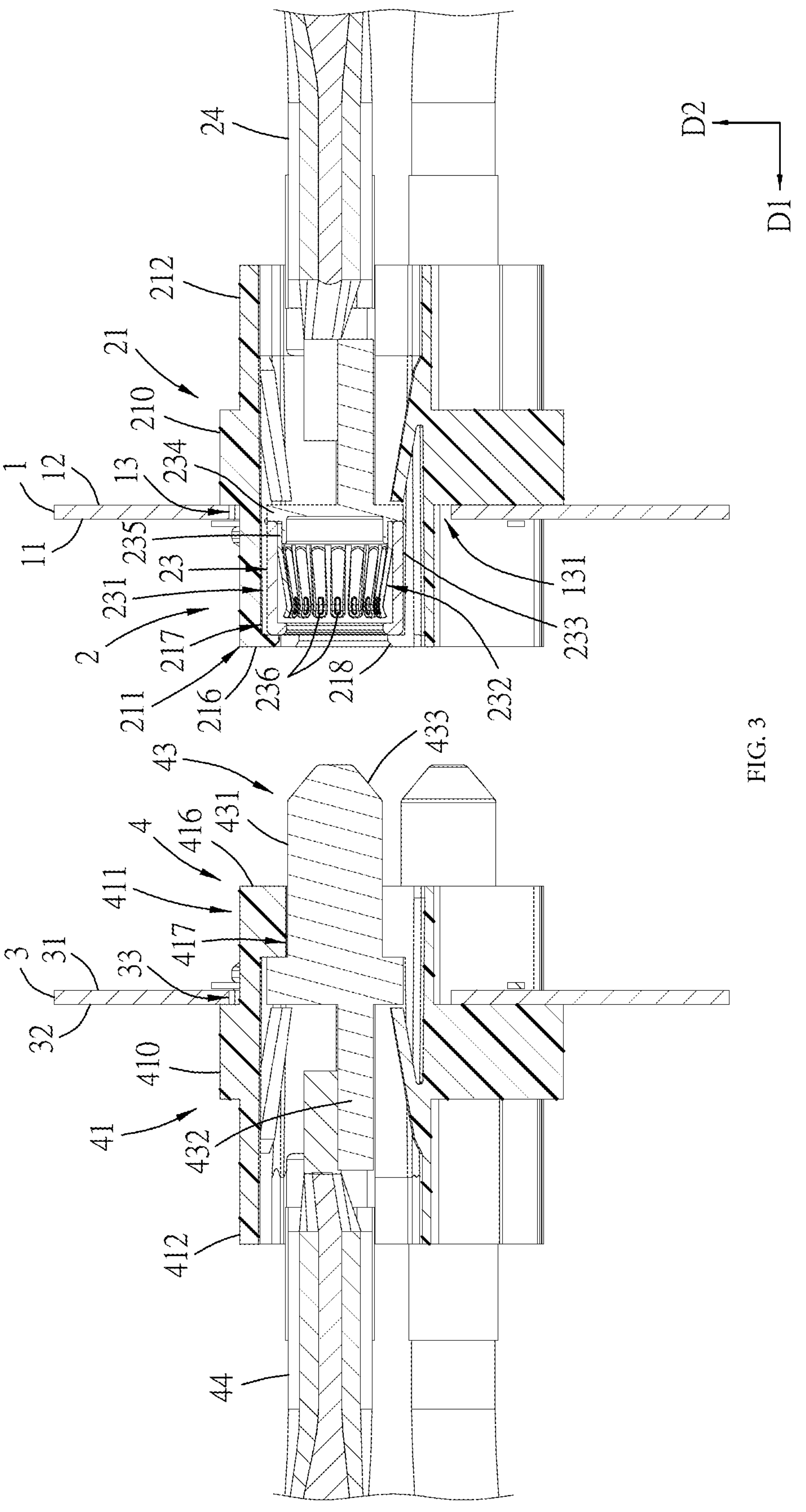
FIG. 3 is an incomplete cross sectional exploded view of the first embodiment.

Referring to FIG. 1, FIG. 2 and FIG. 3, a first embodiment of an electrical connection device 100 of the present disclosure includes a first panel 1, a first connector 2, a second panel 3 and a second connector 4.

For sake of convenience of the later description, in the electrical connection device 100, a first direction D1, a second direction D2 which is perpendicular to the first direction D1 and a third direction D3 which is perpendicular to the first direction D1 and the second direction D2 are defined. In the first embodiment, the first direction D1 takes a front-rear direction as an example, a direction to which an arrow of FIG. 1 points is front and a direction opposite to front is rear; the second direction D2 takes a left-right direction as an example, a direction to which an arrow of FIG. 1 points is left and a direction opposite to left is right; and the third direction D3 takes an up-down direction as an example, a direction to which an arrow of FIG. 1 points is up and a direction opposite to up is down.

Referring to FIG. 3, FIG. 4, FIG. 5 and FIG. 6, the first panel 1 includes a first front face 11 which is toward the front, a first back face 12 which is toward the rear and is opposite to the first front face 11 and a first panel foolproof portion 13. In the first embodiment, the first panel foolproof portion 13 is a penetrating hole which extends between the first front face 11 and the first back face 12. A shape of the penetrating hole is an asymmetric shape, the shape of the penetrating hole is for example a multilateral shape which is asymmetric with respect to both the second direction D2 and the third direction D3. Specifically, the first panel foolproof portion 13 has a first hole portion 131 and a second hole portion 132 which obliquely arranged relative to each other and are communicated with each other. The first hole portion 131 is in form of quadrilateral and is adjacent to a lower left of the first panel 1, the second hole portion 132 is in form of pentagon and is adjacent to an upper right of the first panel 1, so that the first hole portion 131 and the second hole portion 132 are diagonally provided to the first panel 1. The first panel foolproof portion 13 is constructed as the asymmetric shape by the first hole portion 131 and the second hole portion 132, and a front face shape of the first panel foolproof portion 13 and a back face shape of the first panel foolproof portion 13 are different from each other. Moreover, the first panel 1 is formed with two first engaging portions 14 which are obliquely arranged, the two first engaging portions 14 are respectively adjacent to a lower right of the first panel 1 and an upper left of the first panel 1 so as to be diagonally provided to the first panel 1. In the first embodiment, each first engaging portion 14 is a circular through hole which extends between the first front face 11 and the first back face 12.

Referring to FIG. 3, FIG. 4, FIG. 5 and FIG. 7, the first connector 2 is a panel-end connector and includes a first insulative outer housing 21, two first terminals 23, two first cables 24 and two first fastening assemblies 25. The first insulative outer housing 21 is a component made of a plastic by integrally forming manner. The first insulative outer housing 21 is provided to the first panel 1 and has a first mounting plate 210, a first housing foolproof portion 211 and a first support housing body 212 which are respectively protrude from opposite ends of the first mounting plate 210, and two first mounting portions 213 which are provided to the first mounting plate 210. The first mounting plate 210 is in form of rectangular plate shape, and is used to abut against the first back face 12 of the first panel 1. The first mounting plate 210 defines a first diagonal line L1 and a second diagonal line L2 intersecting the first diagonal line L1.

Referring to FIG. 4, FIG. 5, FIG. 6 and FIG. 7, the first housing foolproof portion 211 is used to cooperate with the first panel foolproof portion 13, so as to prevent the first insulative outer housing 21 from being wrongly reversely assembled to the first panel 1. In the first embodiment, the first housing foolproof portion 211 is a housing body which protrudes from a front end of the first mounting plate 210. A shape of the housing body in a two-dimensional plane constituted together by the second direction D2 and the third direction D3 is an asymmetric shape, a shape of the housing body is for example a multilateral shape which is asymmetric with respect to both the second direction D2 and the third direction D3. Specifically, the first housing foolproof portion 211 has a first housing portion 214 and a second housing portion 215 which are obliquely arranged and are connected with each other and a first mating face 216 which is constituted by the first housing portion 214 and the second housing portion 215. The first housing portion 214 is in form of quadrilateral in the two-dimensional plane and a shape of the first housing portion 214 cooperates with the shape of the first hole portion 131. The second housing portion 215 is in form of pentagon in the two-dimensional plane and a shape of the second housing portion 215 cooperates with the shape of the second hole portion 132. The first housing portion 214 and the second housing portion 215 are respectively adjacent to a lower left of the first mounting plate 210 and an upper right of the first mounting plate 210 and are obliquely arranged along the first diagonal line L1, so that the first housing portion 214 and the second housing portion 215 are diagonally provided to the first panel 1. The first housing foolproof portion 211 is constructed as the asymmetric shape by the first housing portion 214 and the second housing portion 215, and a front face shape of the first housing foolproof portion 211 is the same as the front face shape of the first panel foolproof portion 13 but is different from the back face shape of the first panel foolproof portion 13.

By that the first panel foolproof portion 13 is slightly larger than the first housing foolproof portion 211 and the front face shape of the first housing foolproof portion 211 is the same as the front face shape of the first panel foolproof portion 13, the first housing foolproof portion 211 is capable of being provided in the first panel foolproof portion 13 from rear to front along the first direction D1 and partially protruding from the first front face 11 of the first panel 1. By that the front face shape of the first housing foolproof portion 211 is different from the back face shape of the first panel foolproof portion 13, the first housing foolproof portion 211 cannot be provided in the first panel foolproof portion 13 from front to rear along the first direction D1, so as to prevent the first insulative outer housing 21 from being wrongly reversely assembled to the first panel 1.

Figure 5:
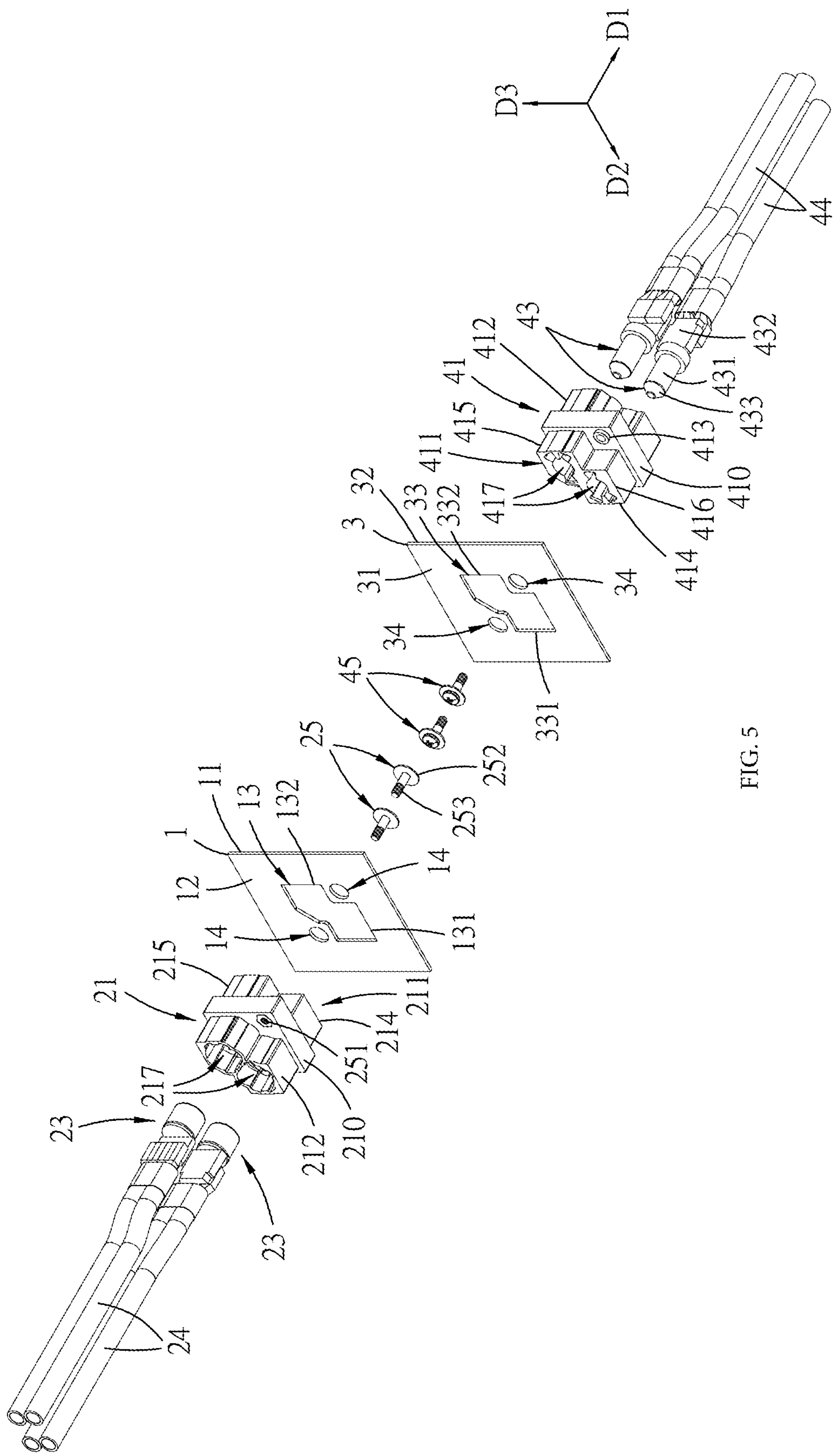
FIG. 5 is a perspective exploded view of the first embodiment viewed from another angle.
Figure 6:
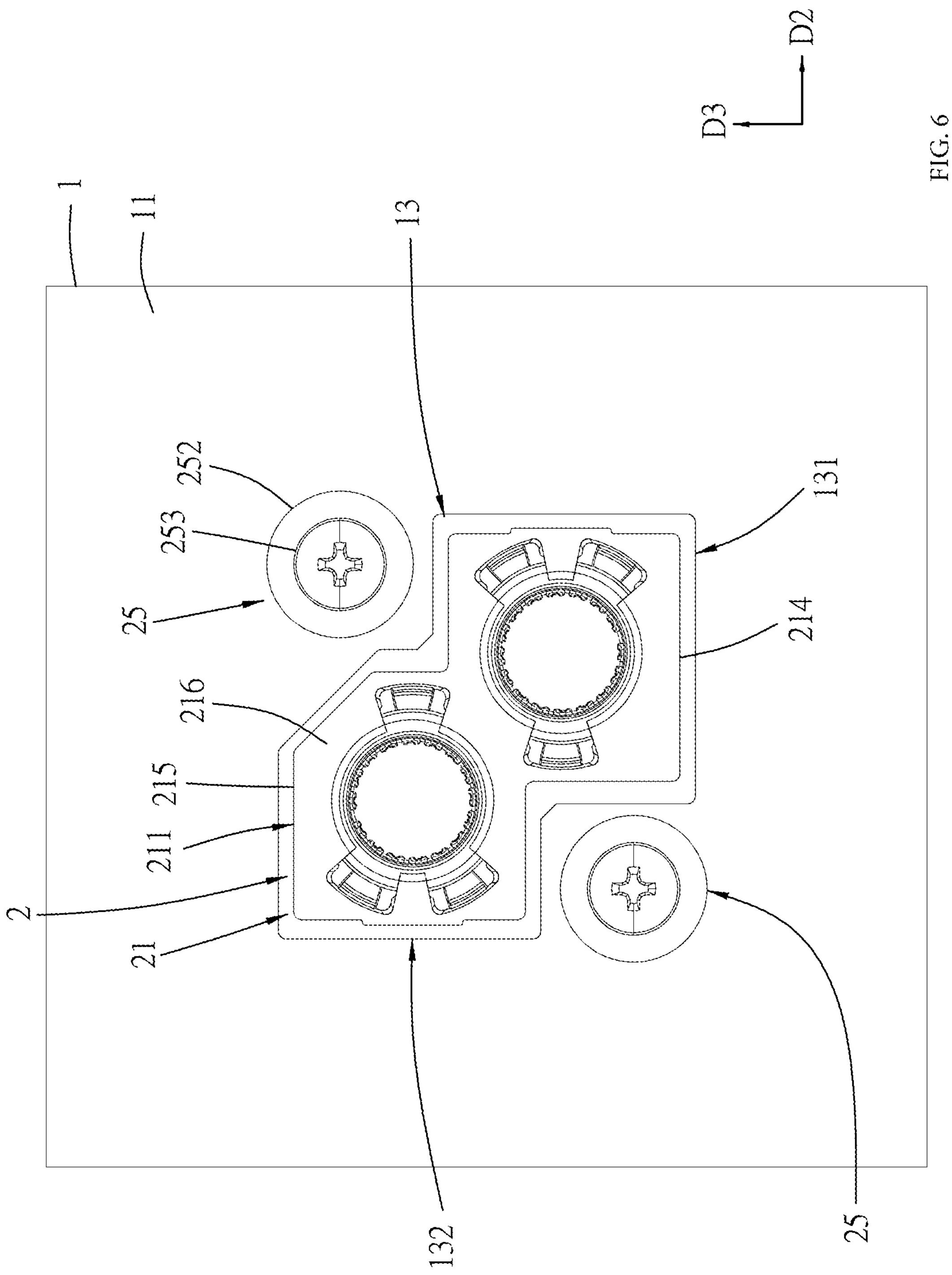
FIG. 6 is a front view of the first panel and the first connector of the first embodiment assembled together.
Figure 8:
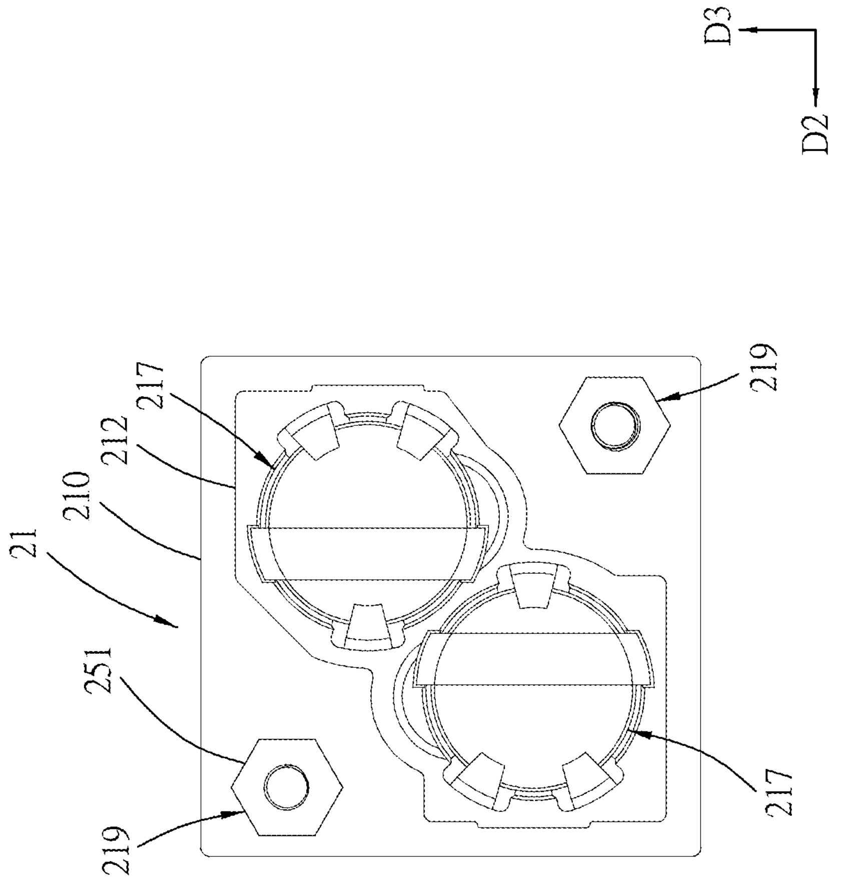
FIG. 8 is a rear view of a first insulative outer housing of the first connector of the first embodiment.

Referring to FIG. 5, FIG. 6 and FIG. 8, the first support housing body 212 protrudes from a rear end of the first mounting plate 210, the first support housing body 212 is similar to the first housing foolproof portion 211 in shape in the two-dimensional plane, therefore, an amount of plastic used for forming the first insulative outer housing 21 can be saved.

Figure 7:
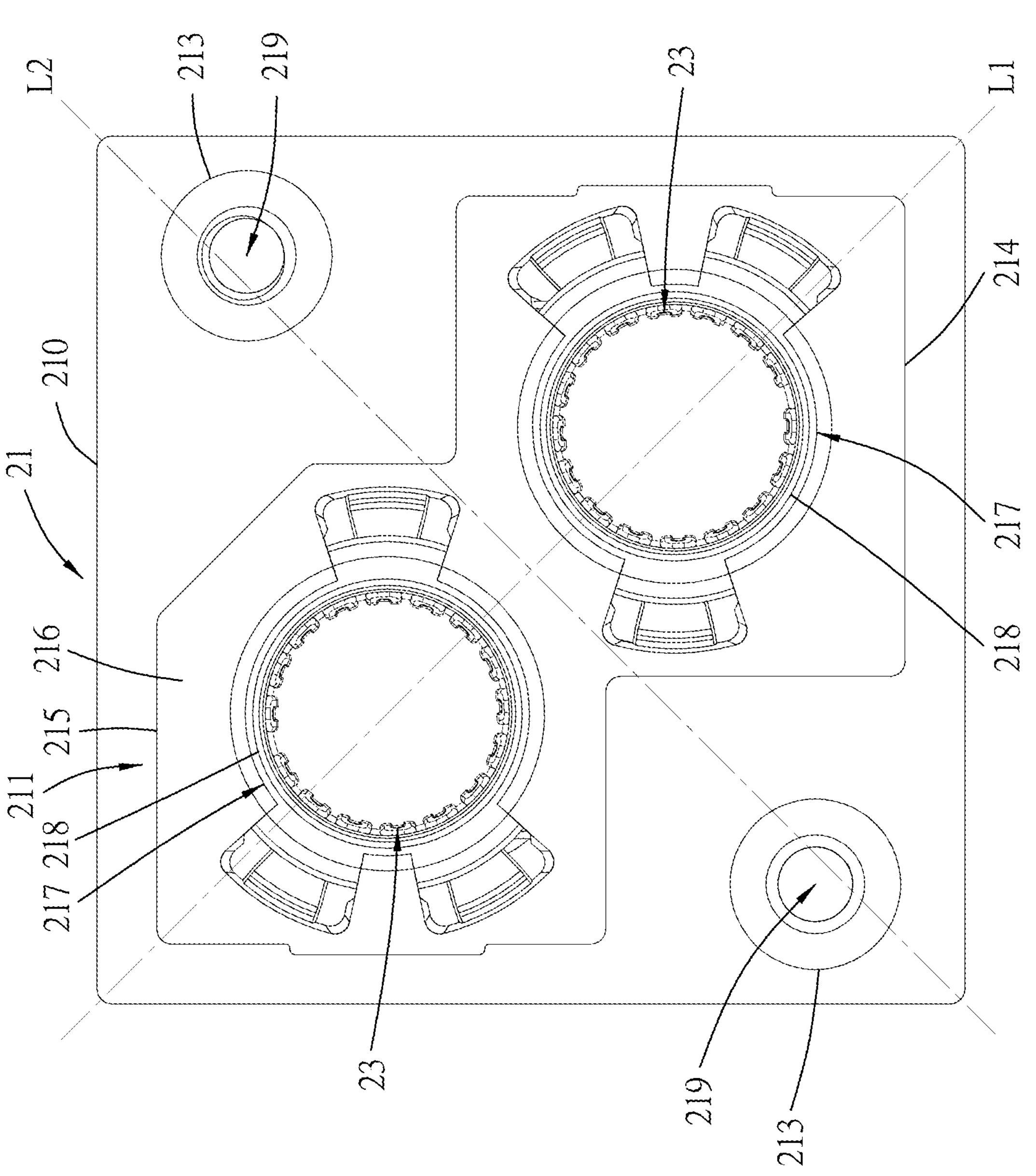
FIG. 7 is a front view of the first connector of the first embodiment.

Referring to FIG. 3 and FIG. 7, the first mounting plate 210, the first housing foolproof portion 211 and the first support housing body 212 of the first insulative outer housing 21 together define two first receiving grooves 217. The two first receiving grooves 217 are obliquely arranged along the first diagonal line L1. Each first receiving groove 217 allows the corresponding first terminal 23 and a part of the corresponding first cable 24 to be received therein. The first housing foolproof portion 211 of the first insulative outer housing 21 has two circumferential edge portions 218 which are formed to the first mating face 216 and respectively encircle the two first receiving grooves 217. Each circumferential edge portion 218 is for example a chamfered surface.

Referring to FIG. 4, FIG. 7, FIG. 8 and FIG. 9, the two first mounting portions 213 are provided to the front end of the first mounting plate 210 and are obliquely arranged along the second diagonal line L2, so that the two first mounting portions 213 are diagonally provided to the first mounting plate 210. The two first mounting portions 213 are respectively used to be mounted to the two first engaging portions 14 of the first panel 1. In the first embodiment, each first mounting portion 213 is a protruding ring which protrudes from the front end of the first mounting plate 210 and is received in the corresponding first engaging portion 14. A hole edge of each first engaging portion 14 is spaced apart from an outer circumferential edge of the corresponding first mounting portion 213, each first mounting portion 213 is capable of floating in the two-dimensional plane in the corresponding first engaging portion 14. Therefore, the first connector 2 is capable of floating relative to the first panel 1 in the two-dimensional plane. Moreover, each first mounting portion 213 and the first mounting plate 210 together define a mounting through hole 219.

Referring to FIG. 3, FIG. 4, FIG. 7 and FIG. 10, the two first terminals 23 are respectively provided in the two first receiving grooves 217 and are obliquely arranged along the first diagonal line L1, so that the two first terminals 23 are diagonally provided to the first insulative outer housing 21. In the first embodiment, each first terminal 23 is a female terminal. Each first terminal 23 has a connecting member 231 and a contacting member 232 provided in the connecting member 231. The connecting member 231 has a barrel body 233 which is adjacent to the first mating face 216 and a cover body 234 which covers a rear end of the barrel body 233. The contacting member 232 has a ring portion 235 which is clamped together by the barrel body 233 and the cover body 234 and a plurality of elastic contacting arms 236 which obliquely extend inwardly from the ring portion 235 toward a front end of the barrel body 233. The two first cables 24 are respectively electrically connected to the cover bodies 234 of the two first terminals 23 and are supported by the first support housing body 212.

Figure 4:
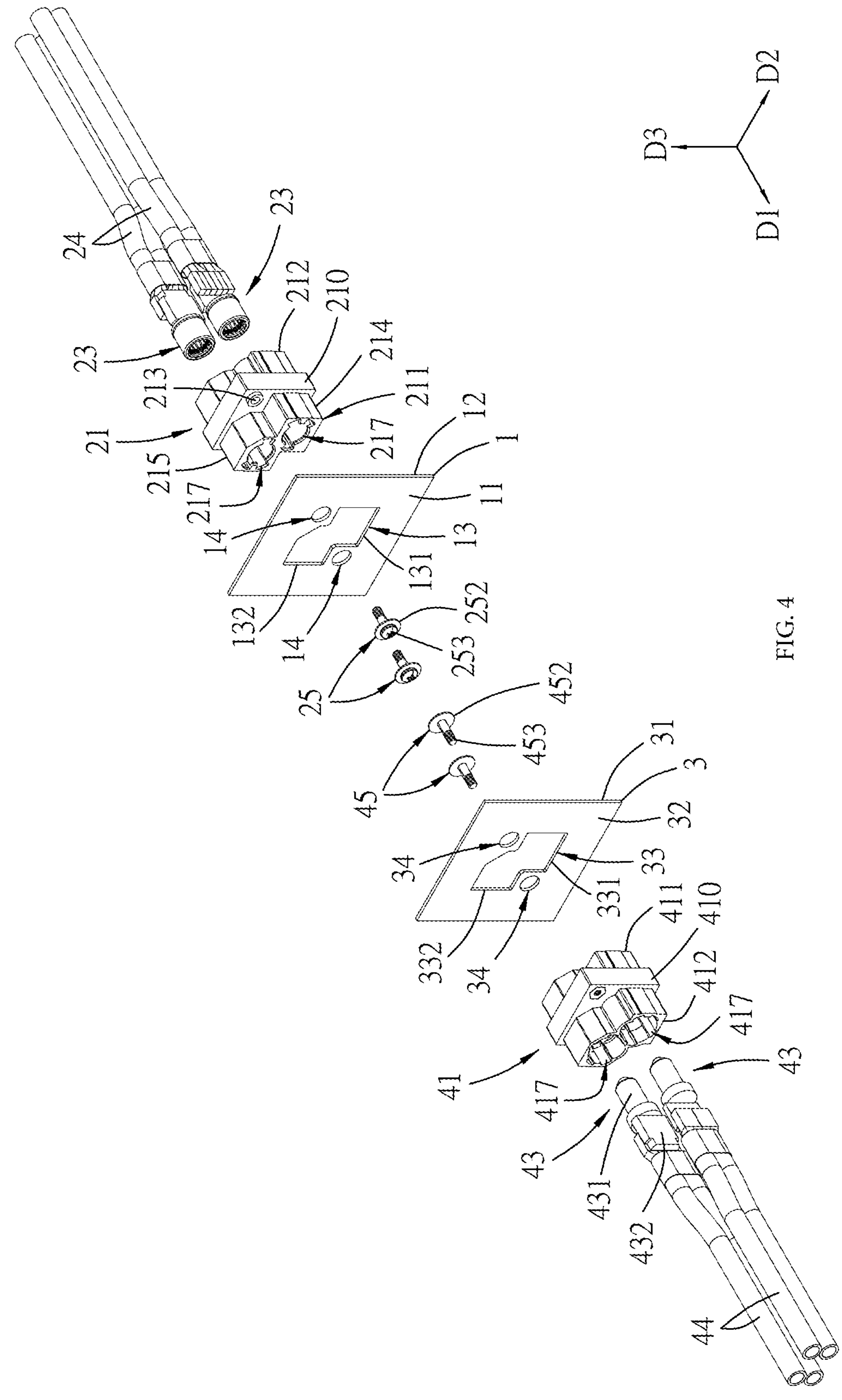
FIG. 4 is a perspective exploded view of the first embodiment illustrating a connecting relationship among a first panel, a first connector, a second panel and a second connector.
Figure 9:
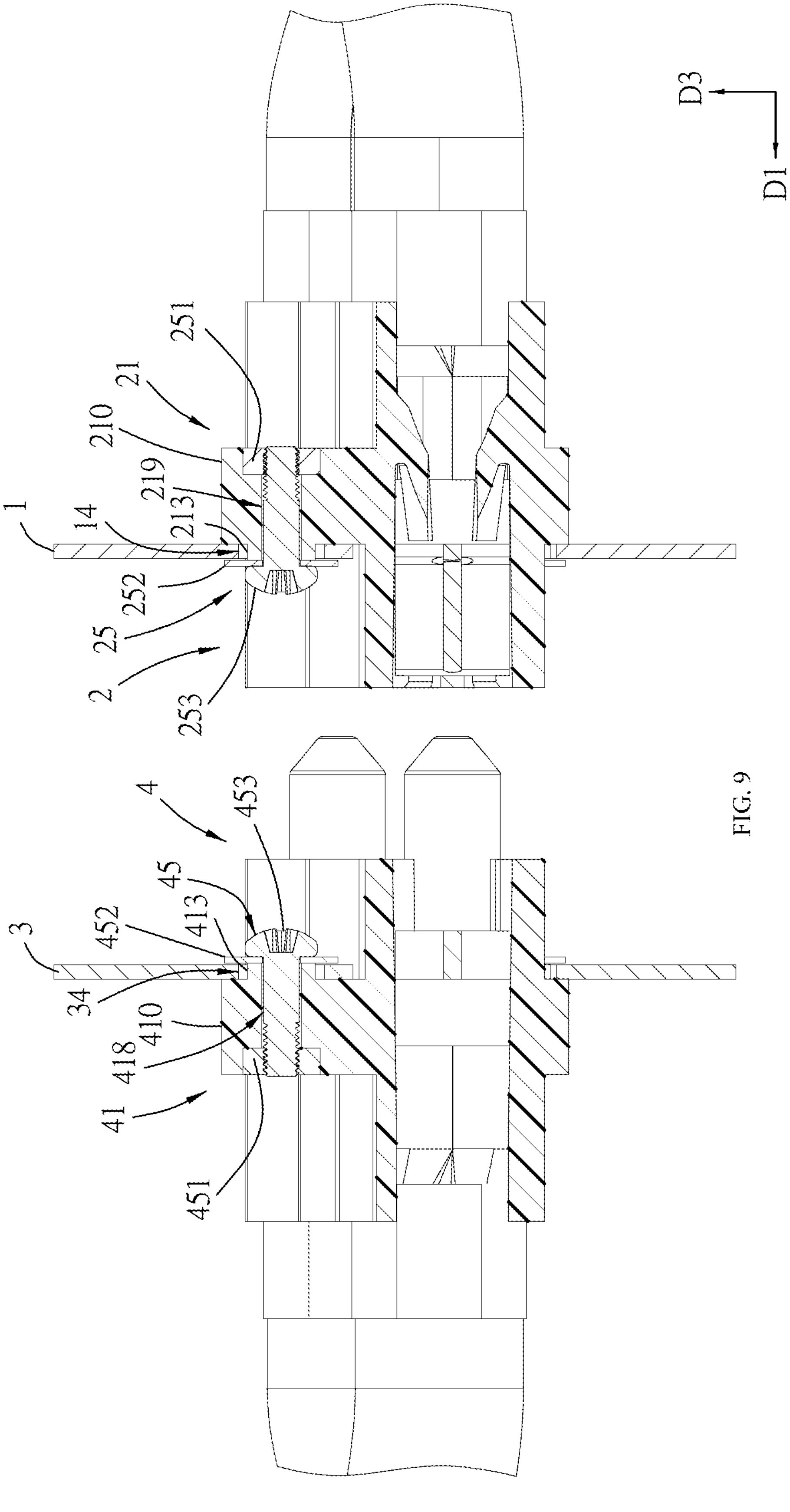
FIG. 9 is an incomplete cross sectional exploded view of the first embodiment.
Figure 10:
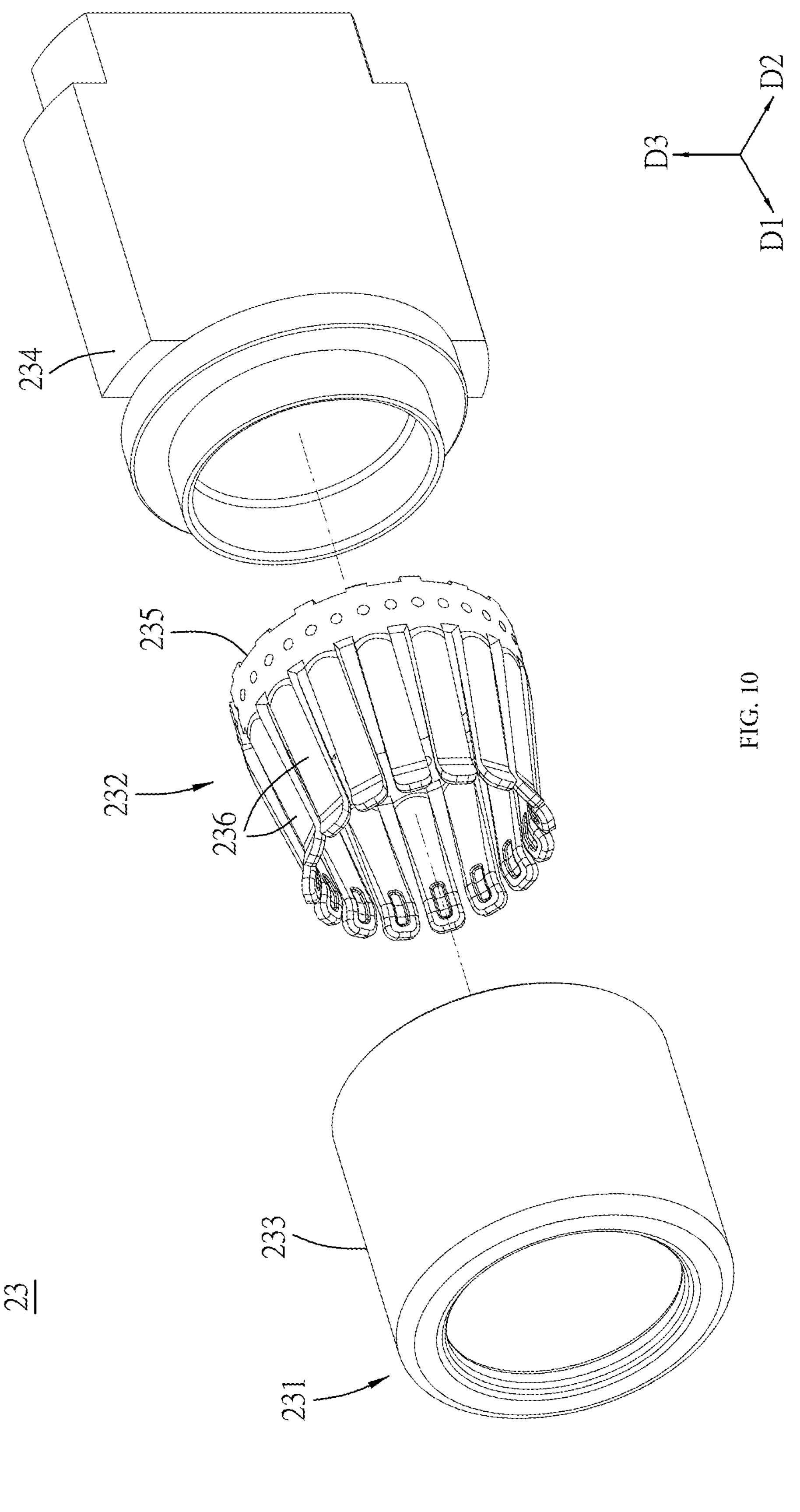
FIG. 10 is a perspective exploded view of a first terminal of the first embodiment.

Referring to FIG. 4, FIG. 5 and FIG. 9, each first fastening assembly 25 is provided to the corresponding first mounting portion 213, the first mounting plate 210 and the first panel 1, so as to make the first panel 1 and the first insulative outer housing 21 securely engaged together. In the first embodiment, each first fastening assembly 25 has a nut 251, a gasket 252 and a bolt 253. The nut 251 is provided in the corresponding mounting through hole 219 and is adjacent to the rear end of the first mounting plate 210. The gasket 252 abuts against the corresponding first mounting portion 213 and closes the corresponding first engaging portion 14. The bolt 253 is provided to the gasket 252 and the corresponding mounting through hole 219 and is screwed to the nut 251. Therefore, the first fastening assembly 25 can lock the first panel 1 and the first insulative outer housing 21 together.

Referring to FIG. 3, FIG. 4, FIG. 5 and FIG. 11, the second panel 3 includes a second front face 31 which is toward the rear and faces the first front face 11, a second back face 32 which is toward the front and is opposite to the second front face 31, and a second panel foolproof portion 33. In the first embodiment, the second panel foolproof portion 33 is a penetrating hole which extends between the second front face 31 and the second back face 32. A shape of the penetrating hole is an asymmetric shape, the shape of the penetrating hole is for example a multilateral shape which is asymmetric with respect to both the second direction D2 and the third direction D3. Specifically, the second panel foolproof portion 33 has a first hole portion 331 and a second hole portion 332 which are obliquely arranged and are communicated with each other. The first hole portion 331 is in form of quadrilateral and is adjacent to a lower left of the second panel 3, the second hole portion 332 is in form of pentagon and is adjacent to an upper right of the second panel 3, so that the first hole portion 331 and the second hole portion 332 are diagonally provided to the second panel 3. The second panel foolproof portion 33 is constructed as the asymmetric shape by the first hole portion 331 and the second hole portion 332, and a front face shape of the second panel foolproof portion 33 and a back face shape of the second panel foolproof portion 33 are different from each other. Moreover, the second panel 3 is formed with two second engaging portions 34 which are obliquely arranged, the two second engaging portions 34 are respectively adjacent to a lower right of the second panel 3 and an upper left of the second panel 3 so as to be diagonally provided to the second panel 3. In the first embodiment, each second engaging portion 34 is a circular through hole which extends between the second front face 31 and the second back face 32.

Referring to FIG. 3, FIG. 4, FIG. 5 and FIG. 12, the second connector 4 is a panel-end connector which is used to mate with the first connector 2. The second connector 4 includes a second insulative outer housing 41, two second terminals 43, two second cables 44 and two second fastening assemblies 45. The second insulative outer housing 41 is a component made of plastic by integrally forming manner. The second insulative outer housing 41 is provided to the second panel 3 and has a second mounting plate 410, a second housing foolproof portion 411 and a second support housing body 412 which respectively protrude from opposite ends of the second mounting plate 410, and two second mounting portions 413 which are provided to the second mounting plate 410. The second mounting plate 410 is in form of rectangular plate shape, and is used to abut against the second back face 32 of the second panel 3. The second mounting plate 410 defines a first diagonal line L1 and a second diagonal line L2 intersecting the first diagonal line L1.

Referring to FIG. 4, FIG. 5, FIG. 11 and FIG. 12, the second housing foolproof portion 411 is used to cooperate with the second panel foolproof portion 33, so as to prevent the second insulative outer housing 41 from being wrongly reversely assembled to the second panel 3. In the first embodiment, the second housing foolproof portion 411 is a housing body which protrudes from a rear end of the second mounting plate 410. A shape of the housing body in the two-dimensional plane is an asymmetric shape, the shape of the housing body is for example a multilateral shape which is asymmetric with respect to both the second direction D2 and the third direction D3. Specifically, the second housing foolproof portion 411 has a first housing portion 414 and a second housing portion 415 which are obliquely arranged and are connected with each other and a second mating face 416 which is constituted by the first housing portion 414 and the second housing portion 415. The first housing portion 414 is in form of quadrilateral in the two-dimensional plane and the shape of the first housing portion 414 cooperates with the shape of the first hole portion 331. The second housing portion 415 is in form of pentagon in the two-dimensional plane and the shape of the second housing portion 415 cooperates with the shape of the second hole portion 332. The first housing portion 414 and the second housing portion 415 are respectively adjacent to a lower left of the second mounting plate 410 and an upper right of the second mounting plate 410 and are obliquely arranged along the first diagonal line L1, so that the first housing portion 414 and the second housing portion 415 are diagonally provided to the second panel 3. The second housing foolproof portion 411 is constructed as the asymmetric shape by the first housing portion 414 and the second housing portion 415, and a front face shape of the second housing foolproof portion 411 is the same as the front face shape of the second panel foolproof portion 33 but is different from the back face shape of the second panel foolproof portion 33.

By that the second panel foolproof portion 33 is slightly larger than the second housing foolproof portion 411 and the front face shape of the second housing foolproof portion 411 is the same as the front face shape of the second panel foolproof portion 33, the second housing foolproof portion 411 is capable of being provided in the second panel foolproof portion 33 from front to rear along the first direction D1 and partially protruding from the second front face 31 of the second panel 3. By that the front face shape of the second housing foolproof portion 411 is different from the back face shape of the second panel foolproof portion 33, the second housing foolproof portion 411 cannot be provided in the second panel foolproof portion 33 from rear to front along the first direction D1, so as to prevent the second insulative outer housing 41 from being wrongly reversely assembled to the second panel 3.

Referring to FIG. 4, FIG. 5, FIG. 6 and FIG. 11, the front face shape of the first housing foolproof portion 211 of the first insulative outer housing 21 and the front face shape of the second panel foolproof portion 33 of the second panel 3 are different from each other, therefore, the first housing foolproof portion 211 cannot be provided in the second panel foolproof portion 33 from front to rear along the first direction D1, so as to prevent the first connector 2 from being wrongly assembled to the second panel 3. The front face shape of the second housing foolproof portion 411 of the second insulative outer housing 41 is different from the front face shape of the first panel foolproof portion 13 of the first panel 1, therefore, the second housing foolproof portion 411 cannot be provided in the first panel foolproof portion 13 from rear to front along the first direction D1, so as to prevent the second connector 4 from being wrongly assembled to the first panel 1.

Figure 11:
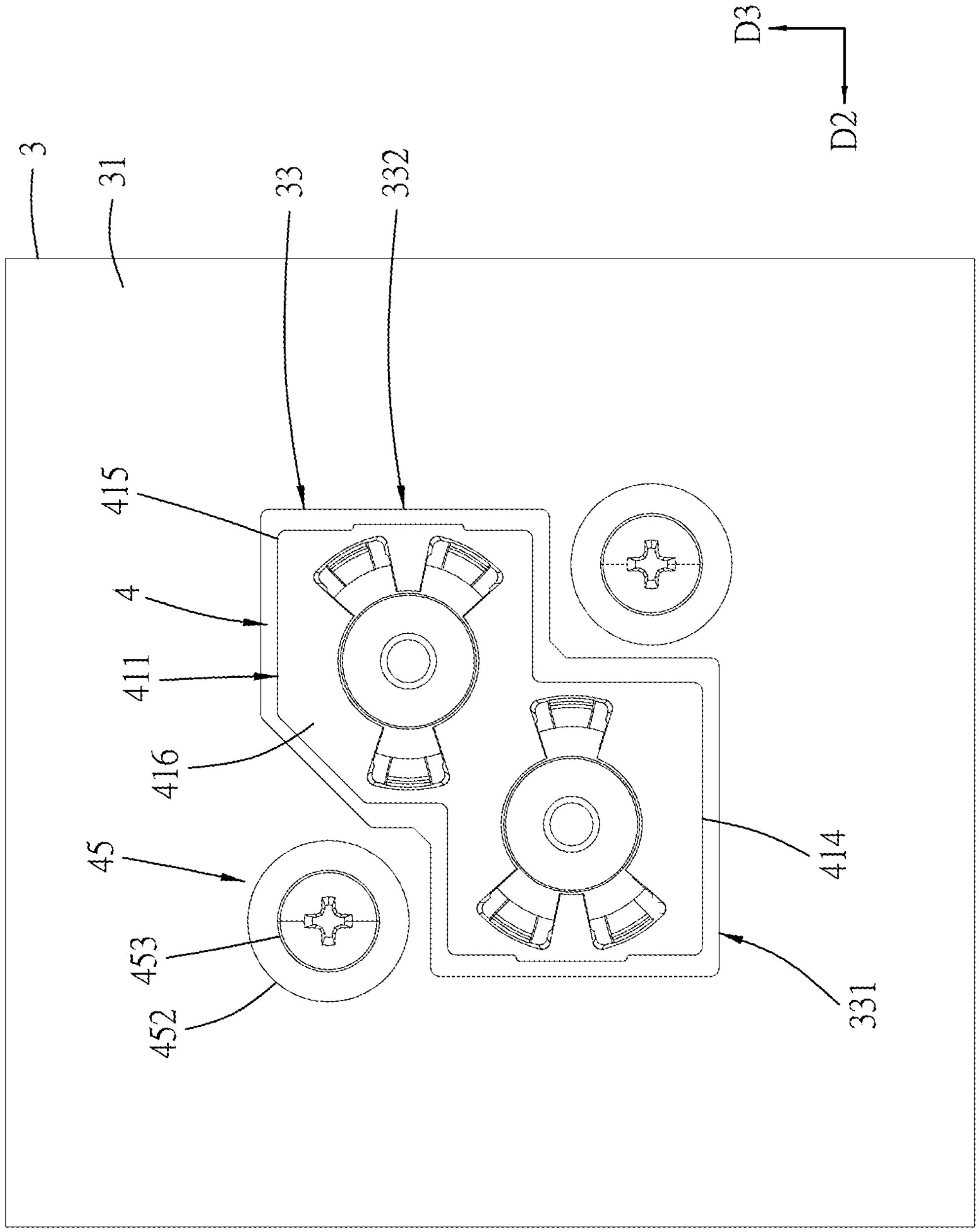
FIG. 11 is a rear view of the second panel and the second connector of the first embodiment assembled together.
Figure 13:
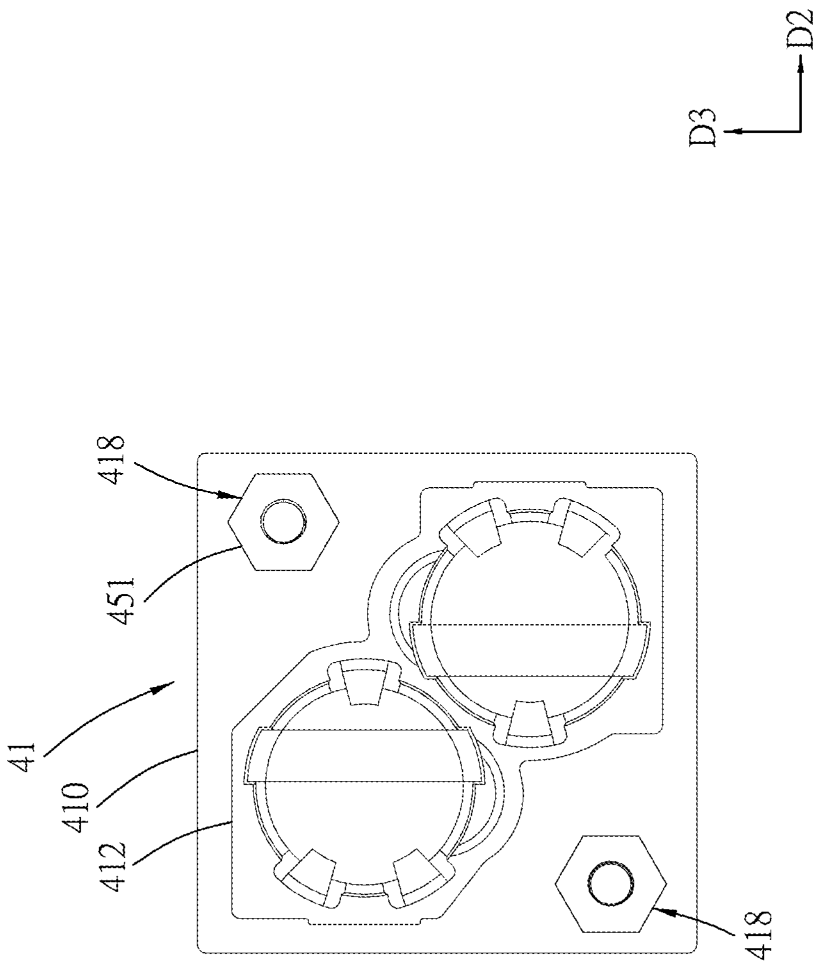
FIG. 13 is a front view of a second insulative outer housing of the second connector of the first embodiment.

Referring to FIG. 4, FIG. 11 and FIG. 13, the second support housing body 412 protrudes from the front end of the second mounting plate 410, the second support housing body 412 and the second housing foolproof portion 411 are similar in shape in the two-dimensional plane, therefore, an amount of plastic used for forming the second insulative outer housing 41 can be saved.

Figure 12:
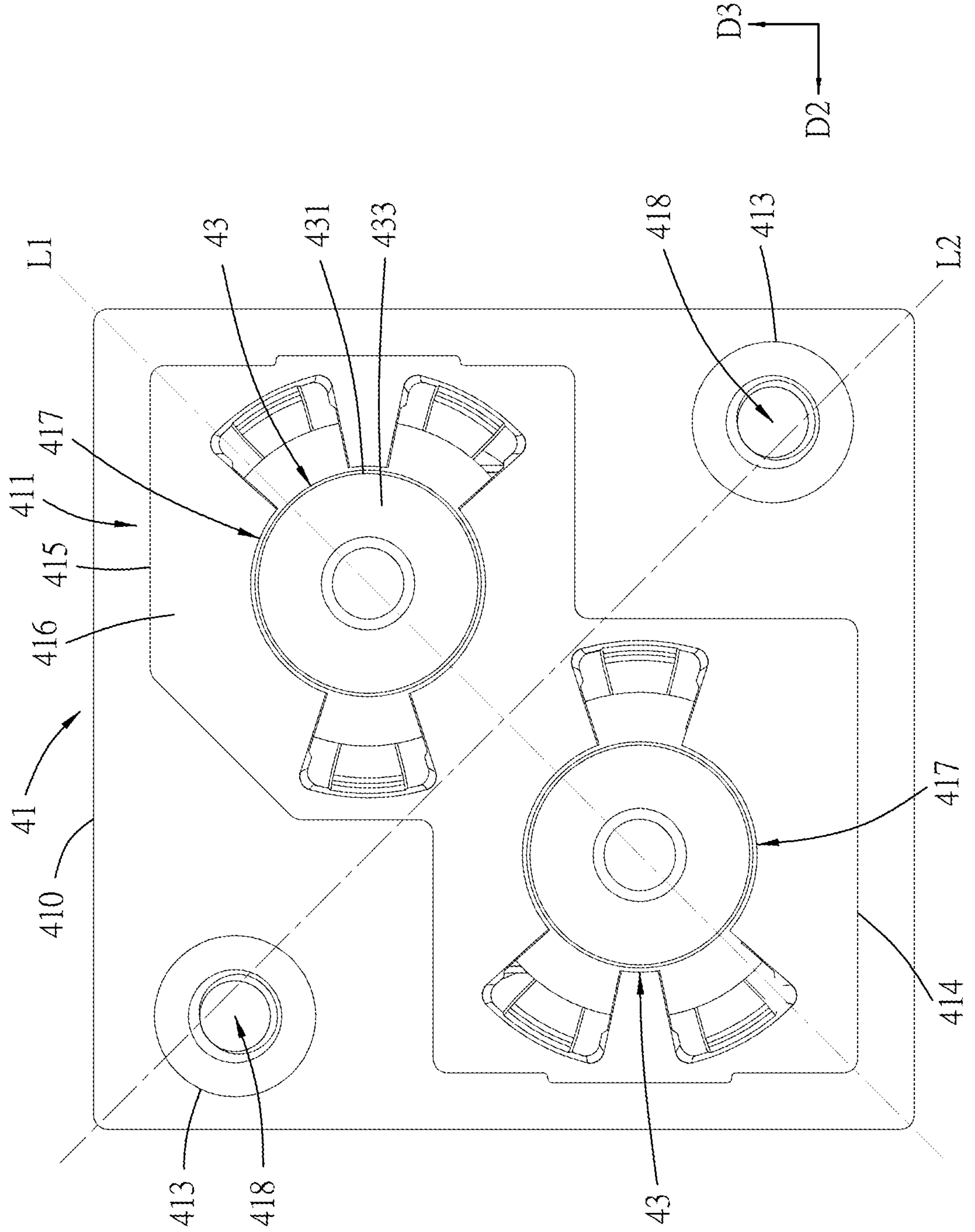
FIG. 12 is a rear view of the second connector of the first embodiment.

Referring to FIG. 3 and FIG. 12, the second mounting plate 410, the second housing foolproof portion 411 and the second support housing body 412 of the second insulative outer housing 41 together define two second receiving grooves 417. The two second receiving grooves 417 are obliquely arranged along the first diagonal line L1. Each second receiving groove 417 allows the corresponding second terminal 43 and a part of the corresponding second cable 44 to be received therein.

Referring to FIG. 5, FIG. 9, FIG. 12 and FIG. 13, the two second mounting portions 413 are provided to a rear end of the second mounting plate 410 and are obliquely arranged along the second diagonal line L2, so that the two second mounting portions 413 are diagonally provided to the second mounting plate 410. The two second mounting portions 413 are respectively used to be mounted to the two second engaging portions 34 of the second panel 3. In the first embodiment, each second mounting portion 413 is a protruding ring which protrudes from the rear end of the second mounting plate 410 and is received in the corresponding second engaging portion 34. A hole edge of each second engaging portion 34 is spaced apart from an outer circumferential edge of the corresponding second mounting portion 413, each second mounting portion 413 is capable of floating in the two-dimensional plane in the corresponding second engaging portion 34. Therefore, the second connector 4 is capable of floating relative to the second panel 3 in the two-dimensional plane. Moreover, each second mounting portion 413 and the second mounting plate 410 together define a mounting through hole 418.

Referring to FIG. 3, FIG. 5 and FIG. 12, the two second terminals 43 are respectively provided in the two second receiving grooves 417 and are obliquely arranged along the first diagonal line L1, so that the two second terminals 43 are diagonally provided to the second insulative outer housing 41. In the first embodiment, each second terminal 43 is a male terminal, and is used to be electrically connected to the corresponding first terminal 23. Each second terminal 43 has a mating segment 431 and a connecting segment 432 which extends forwardly from the mating segment 431. The mating segment 431 is in form of post shape, is partially exposed from the corresponding second receiving groove 417, protrudes from the second mating face 416, and is used to insert into the corresponding first receiving groove 217 and the contacting member 232 of the corresponding first terminal 23 so as to be electrically connected to the plurality of elastic contacting arms 236. The mating segment 431 has a guiding conical surface 433 which is exposed from the corresponding second receiving groove 417. The guiding conical surface 433 is used to allow the corresponding circumferential edge portion 218 to contact therewith and guide the corresponding circumferential edge portion 218 to slide thereon. Therefore, each guiding conical surface 433 can function as an effect of guiding an inserting direction of the first connector 2. The connecting segment 432 is in form of plate shape. The two second cables 44 are respectively electrically connected with the connecting segments 432 of the two second terminals 43 and are supported by the second support housing body 412.

Referring to FIG. 4, FIG. 5 and FIG. 9, each second fastening assembly 45 is provided to the corresponding second mounting portion 413, the second mounting plate 410 and the second panel 3, so as to make the second panel 3 and the second insulative outer housing 41 securely engaged together. In the first embodiment, each second fastening assembly 45 has a nut 451, a gasket 452 and a bolt 453. The nut 451 is provided in the corresponding mounting through hole 418 and is adjacent to the front end of the second mounting plate 410. The gasket 452 abuts against the corresponding second mounting portion 413 and closes the corresponding second engaging portion 34. The bolt 453 is provided to the gasket 452 and the corresponding mounting through hole 418 and is screwed to the nut 451. Therefore, the second fastening assembly 45 can lock the second panel 3 and the second insulative outer housing 41 together.

Figure 14:
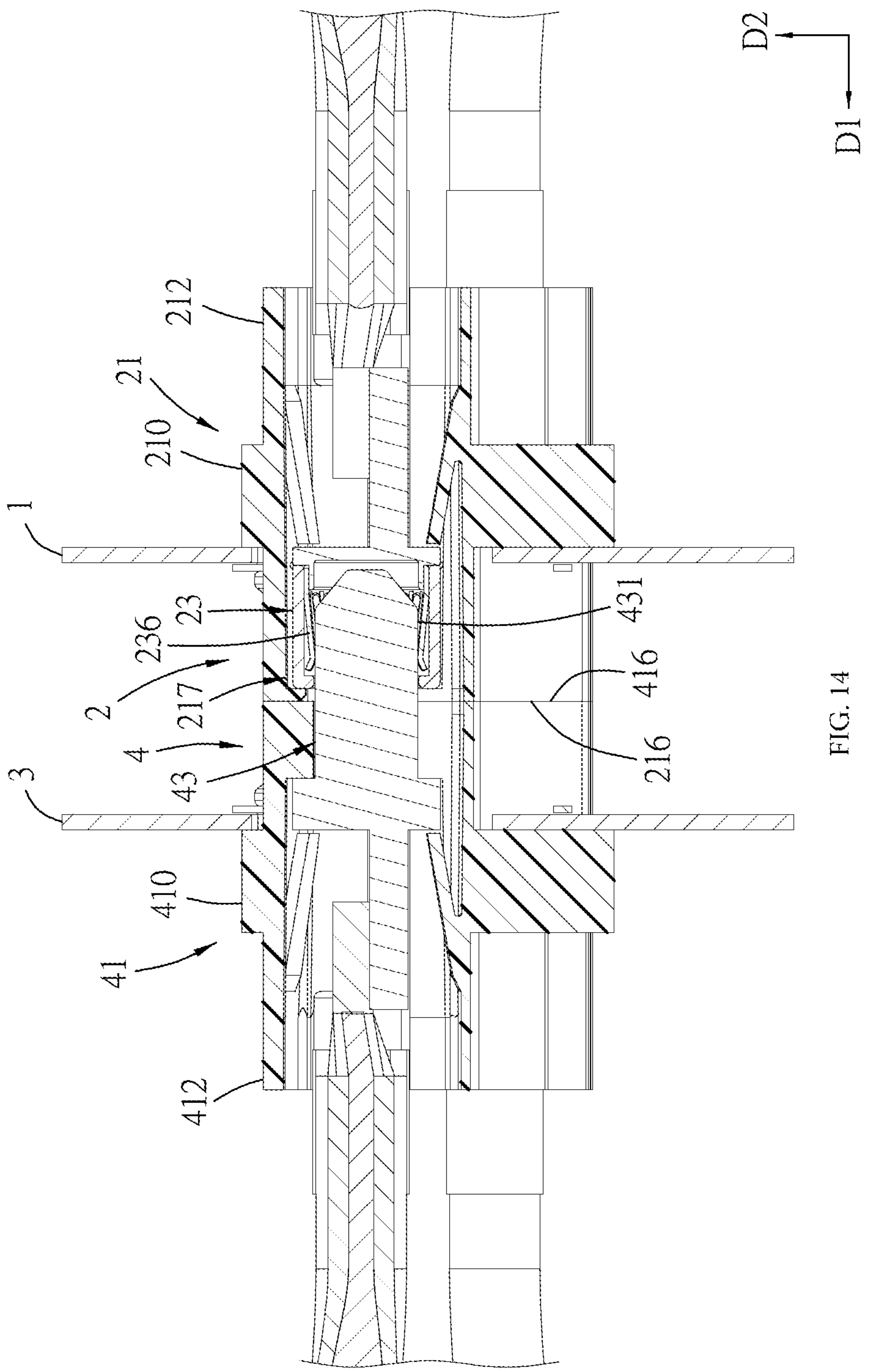
FIG. 14 is an incomplete cross-sectional view of the first embodiment.

Referring to FIG. 3 and FIG. 14, when the first connector 2 mates with the second connector 4, first the two first receiving grooves 217 are respectively aligned with the mating segments 431 of the two second terminals 43. Subsequently, the first connector 2 is moved forwardly toward the second connector 4. When the first connector 2 has a position offset in the two-dimensional plane constituted together by the second direction D2 and the third direction D3 to result in that the circumferential edge portion 218 corresponds to the corresponding guiding conical surface 433 in position, the circumferential edge portion 218 will first contact the corresponding guiding conical surface 433 and slides on the corresponding guiding conical surface 433. In a process that the circumferential edge portion 218 slides forwardly on the corresponding guiding conical surface 433, the circumferential edge portion 218 will be guided by the corresponding guiding conical surface 433 to be correct in position, so that the two first receiving grooves 217 can be respectively aligned with the mating segments 431 of the two second terminals 43. Therefore, the position offset of the first connector 2 in the two-dimensional plane can be overcome, the mating segments 431 of the two second terminals 43 can respectively insert into the contacting members 232 of the two first terminals 23. When the first mating face 216 abuts against the second mating face 416 and is stopped by the second mating face 416, an operation of the first connector 2 mating with the second connector 4 is completed.

Referring to FIG. 7, FIG. 12 and FIG. 14, by that the two first terminals 23 are obliquely arranged along the first diagonal line L1 so as to be diagonally provided to the first insulative outer housing 21 and the two first mounting portions 213 are obliquely arranged along the second diagonal line L2 so as to be diagonally provided to the first mounting plate 210, length dimensions of the first insulative outer housing 21 in the second direction D2 and the third direction D3 can be reduced, so that a volume of the first connector 2 can be miniaturized. By that the two second terminals 43 are obliquely arranged along the first diagonal line L1 so as to be diagonally provided to the second insulative outer housing 41 and the two second mounting portions 413 are obliquely arranged along the second diagonal line L2 so as to be diagonally provided to the second mounting plate 410, length dimensions of the second insulative outer housing 41 in the second direction D2 and the third direction D3 can be reduced, so that a volume of the second connector 4 can be miniaturized. Therefore, a volume of the electrical connection device 100 constituted by the first connector 2 and the second connector 4 also can be miniaturized and can be applied in a circumstance of miniaturized product. By that the first connector 2 and the second connector 4 are respectively provided to the first panel 1 and the second panel 3, the electrical connection device 100 of the first embodiment provides a technical solution that the panel-end connectors mate with each other, so that the electrical connection device 100 of the first embodiment can be applied in the circumstance having the aforementioned need.

Figure 15:
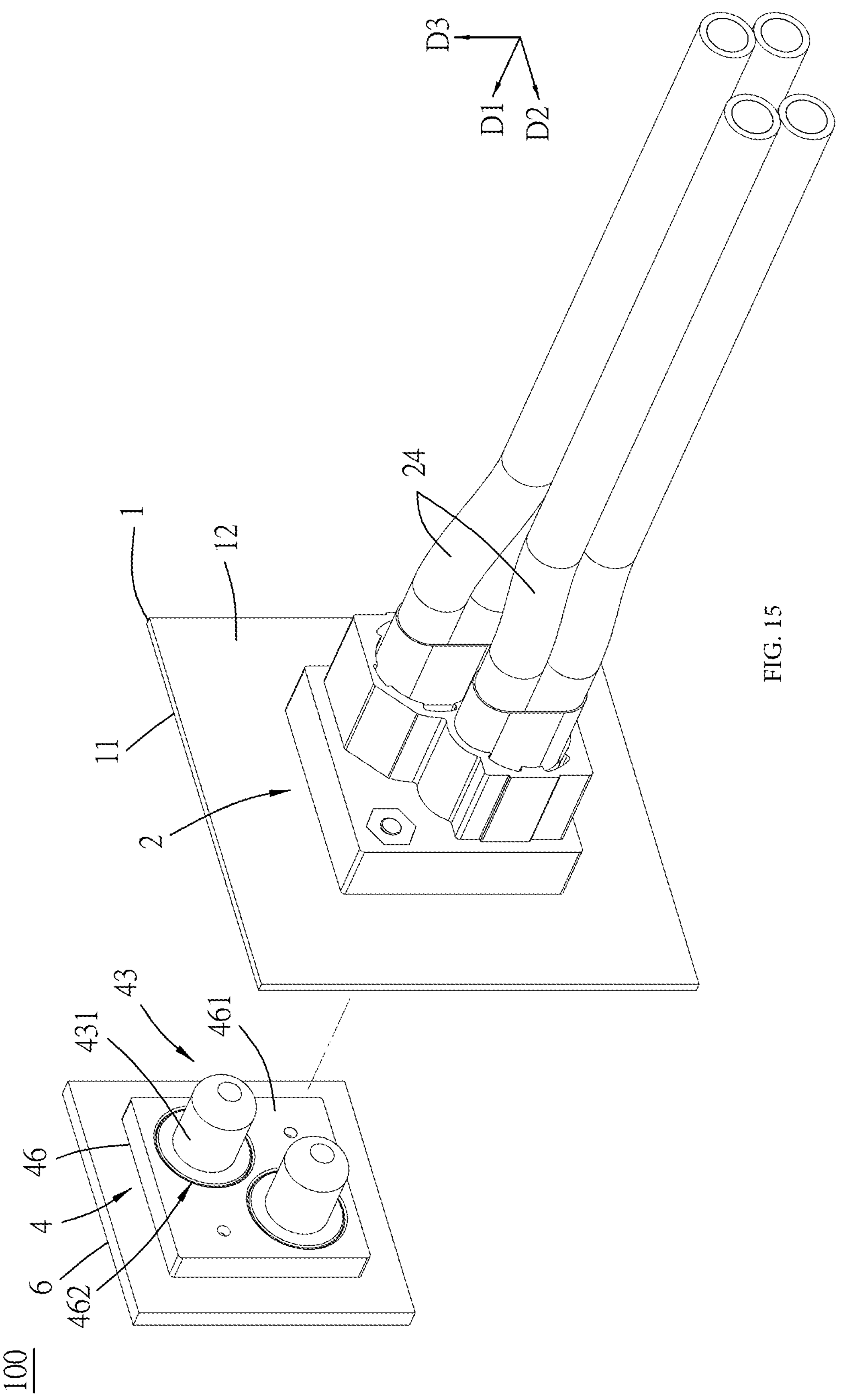
FIG. 15 is a perspective exploded view of a second embodiment of the electrical connection device of the present disclosure.

Referring to FIG. 15, a second embodiment of the electrical connection device 100 of the present disclosure is substantially the same as the first embodiment in entire structure, difference lies in the second connector 4.

Figure 16:
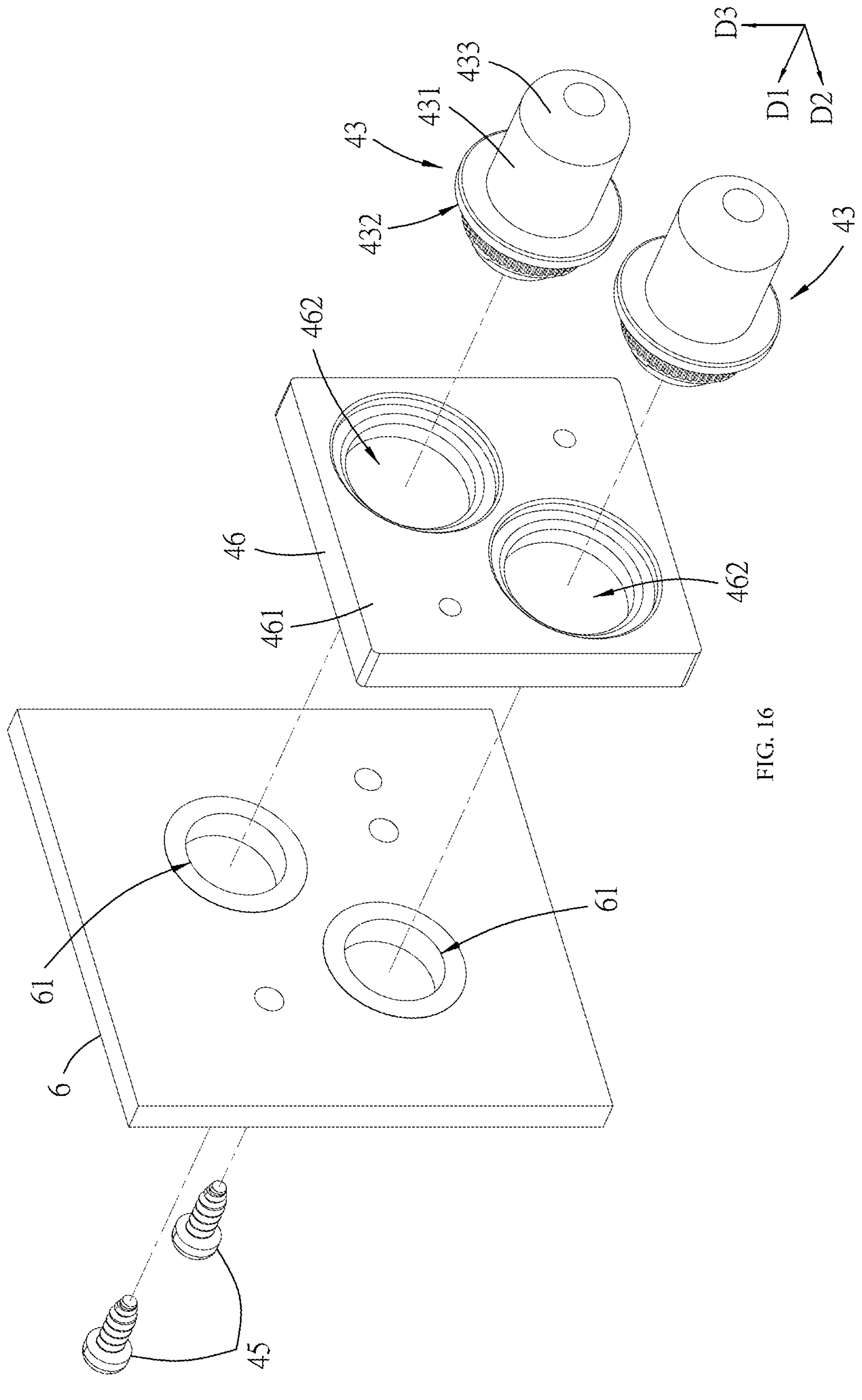
FIG. 16 is a perspective exploded view of the second connector and a circuit board of the second embodiment.
Figure 17:
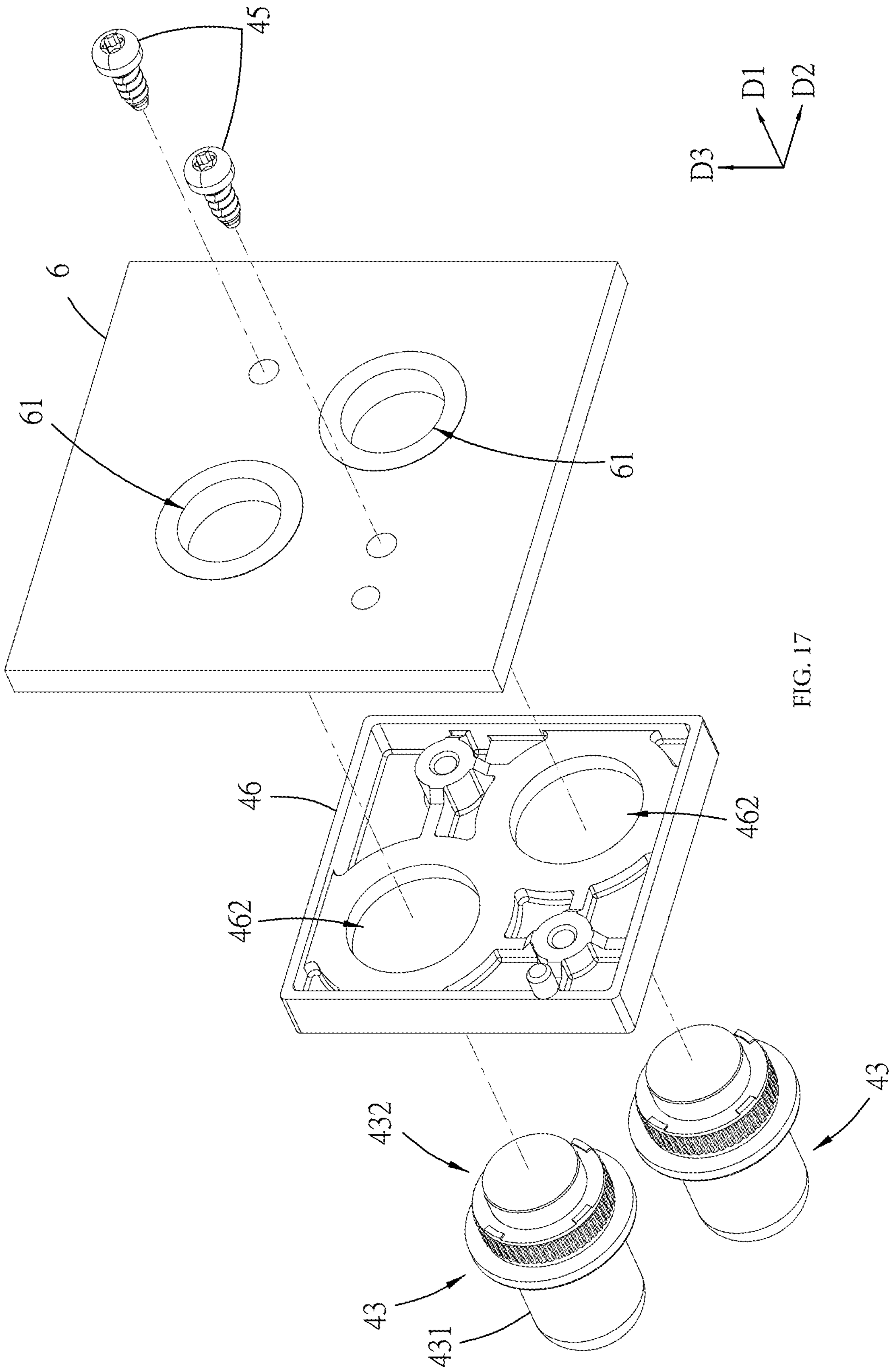
FIG. 17 is a perspective exploded view t of the second connector and the circuit board of the second embodiment viewed from another angle.

Referring to FIG. 15, FIG. 16 and FIG. 17, the electrical connection device 100 further includes a circuit board 6 which faces the first front face 11 of the first panel 1. The circuit board 6 is in form of rectangular plate shape and is formed with two soldering holes 61 which are obliquely arranged and are diagonally provided. The second connector 4 is a straight board-end connector which is provided to the circuit board 6. The second connector 4 includes an insulative base 46 which is provided to the circuit board 6. Each second fastening assembly 45 is a screw which locks the circuit board 6 and the insulative base 46 together. The insulative base 46 in form of rectangular base shape and has a second mating face 461 which is used to mate with the first mating face 216 of the first connector 2 (as shown in FIG. 14). The insulative base 46 is formed with two apertures 462 which are obliquely arranged and are diagonally provided to the second mating face 461, the two apertures 462 are respectively communicated with the two soldering holes 61. The connecting segment 432 of each second terminal 43 is provided to the corresponding aperture 462 and the corresponding soldering hole 61 so that the mating segment 431 protrudes from the second mating face 461. The connecting segment 432 is caught to the insulative base 46 by interference fit manner and in turn is retained to the corresponding aperture 462. The connecting segment 432 is soldered to the corresponding soldering hole 61 by a solder, so that the connecting segment 432 is electrically connected to the circuit board 6.

By that, the two second terminals 43 are diagonally provided to the insulative base 46, length dimensions of the insulative base 46 in the second direction D2 and the third direction D3 can be reduced, a volume of the second connector 4 can be miniaturized. By that the first connector 2 and the second connector 4 are respectively provided to the first panel 1 and the circuit board 6, the electrical connection device 100 of the second embodiment provides a technical solution that the panel-end connector and the straight board-end connector mate with each other, so that the electrical connection device 100 of the second embodiment can be applied in the circumstance having the aforementioned need.

Figure 18:
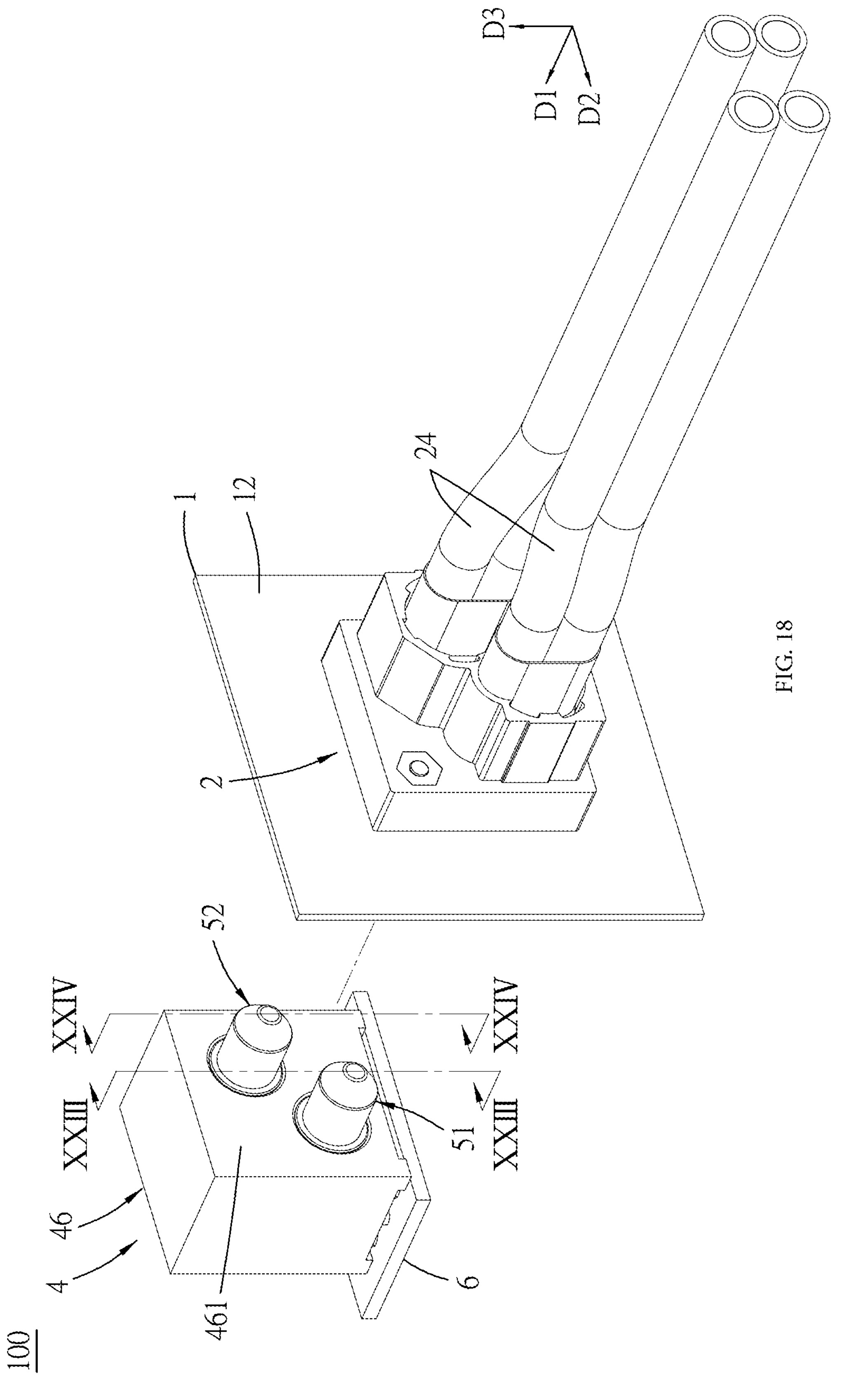
FIG. 18 is a perspective exploded view of a third embodiment of the electrical connection device of the present disclosure.
Figure 19:
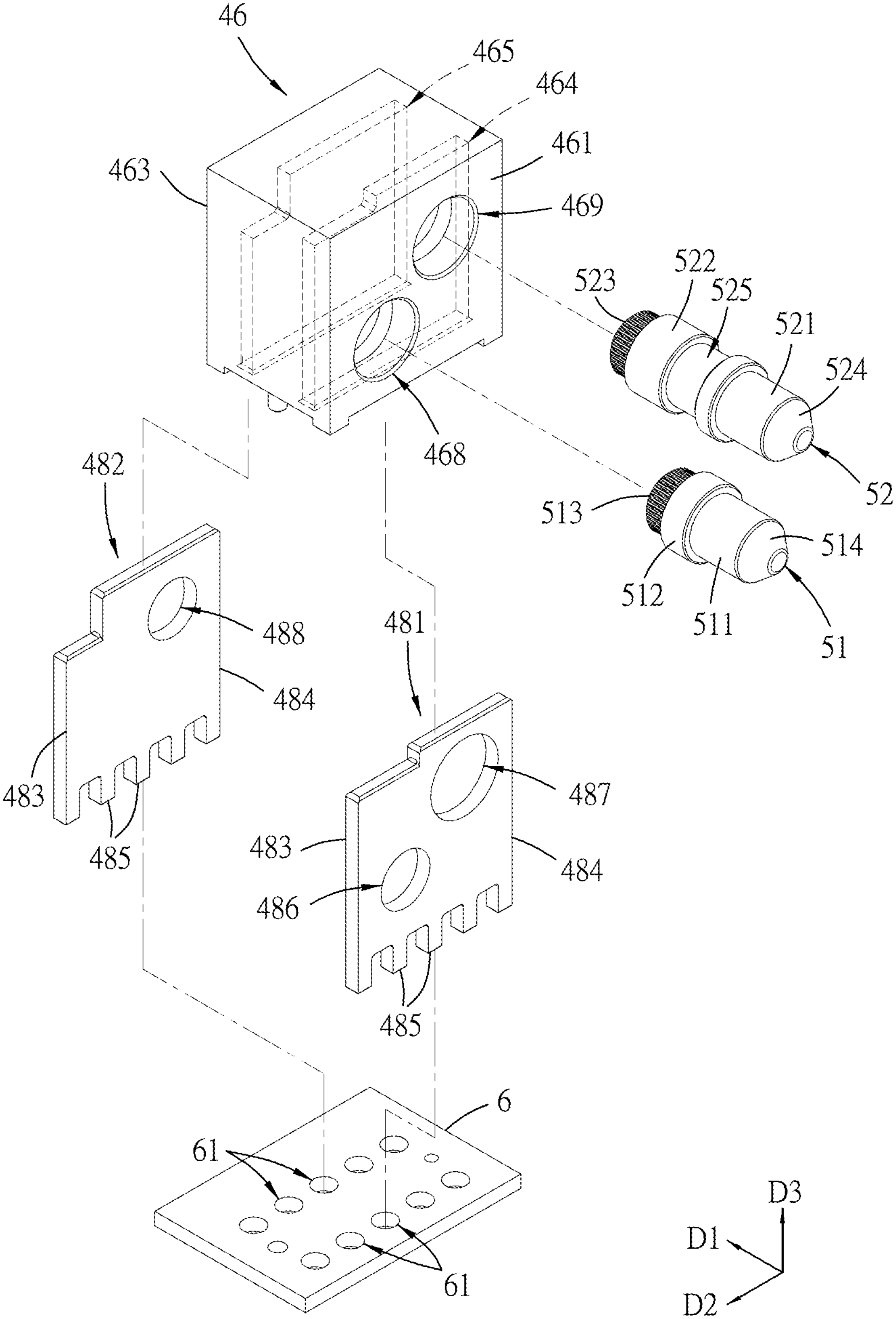
FIG. 19 is a perspective exploded view of the second connector and the circuit board of the third embodiment.

Referring to FIG. 18 and FIG. 19, a third embodiment of the electrical connection device 100 of the present disclosure is substantially the same as the second embodiment in entire structure, difference lies in the second connector 4 and the circuit board 6.

The circuit board 6 is positioned in a two-dimensional plane constituted together by the first direction D1 and the second direction D2. The second connector 4 is a right-angle board-end connector which is provided to the circuit board 6. The insulative base 46 is in form of rectangular shell shape. The second connector 4 further includes two adapting plates which are provided in the insulative base 46 and are electrically connected to the circuit board 6, the two adapting plates are arranged and spaced apart from each other along the first direction D1. The two second terminals are diagonally provided to the insulative base 46 and partially protrude from the second mating face 461, the two second terminals respectively electrically connected to the two adapting plates.

The insulative base 46 is formed with two inserting grooves which are arranged and spaced apart from each other along the first direction D1 and respectively allow the two adapting plates to insert therein and two terminal grooves which are respectively allow the two second terminals to insert therein. The two inserting grooves are different from each other in shape. The two adapting plates are different from each other in shape, each adapting plate is constructed to be only the same as one corresponding inserting groove in shape so that the adapting plate is capable of inserting into the one corresponding inserting groove. Therefore, it can provide a foolproof mechanism to prevent the adapting plate from wrongly inserting into the other inserting groove.

Hereinafter a specific structure of the second connector of the third embodiment 4 of described in detail.

The number of the soldering holes 61 of the circuit board 6 is two or more, the number of the soldering holes 61 is for example but is not limited to ten. The soldering holes 61 are in form of array arrangement.

Referring to FIG. 19, FIG. 20, FIG. 21 and FIG. 22, the insulative base 46 further has a back face 463 which is opposite to the second mating face 461. The inserting grooves are positioned between the second mating face 461 and the back face 463. The inserting grooves respectively are a first inserting groove 464 which is adjacent to the second mating face 461 and a second inserting groove 465 which is adjacent to the back face 463. The first inserting groove 464 and the second inserting groove 465 each have a first groove portion 466 which is arranged along the second direction D2 and a second groove portion 467 which is communicated to a right side of the first groove portion 466. The first groove portion 466 and the second groove portion 467 are respectively adjacent to a left side and a right side of the insulative base 46. A length of the second groove portion 467 taken along the third direction D3 is larger than a length of the first groove portion 466 taken along the third direction D3. Here, a length of the first groove portion 466 of the first inserting groove 464 taken along the second direction D2 and a length of the first groove portion 466 of the second inserting groove 465 taken along the second direction D2 are not the same, and the length of the first groove portion 466 of the first inserting groove 464 taken along the third direction D3 and the length of the first groove portion 466 of the second inserting groove 465 taken along the third direction D3 are not the same. The length of the second groove portion 467 of the first inserting groove 464 taken along the third direction D3 and the length of the second groove portion 467 of the second inserting groove 465 taken along the third direction D3 are the same.

More specifically, the lengths of the first groove portions 466 of the first inserting groove 464 and the second inserting groove 465 taken along the second direction D2 gradually decrease in the first direction D1 from the second mating face 461 toward the back face 463, and the lengths of the first groove portions 466 of the first inserting groove 464 and the second inserting groove 465 taken along the third direction D3 gradually decrease in the first direction D1 from the second mating face 461 toward the back face 463. That is to say, the length of the first groove portion 466 of the first inserting groove 464 taken along the second direction D2 is larger than the length of the first groove portion 466 of the second inserting groove 465 taken along the second direction D2. The length of the first groove portion 466 of the first inserting groove 464 taken along the third direction D3 is larger than the length of first groove portion 466 of the second inserting groove 465 taken along the third direction D3.

Figure 20:
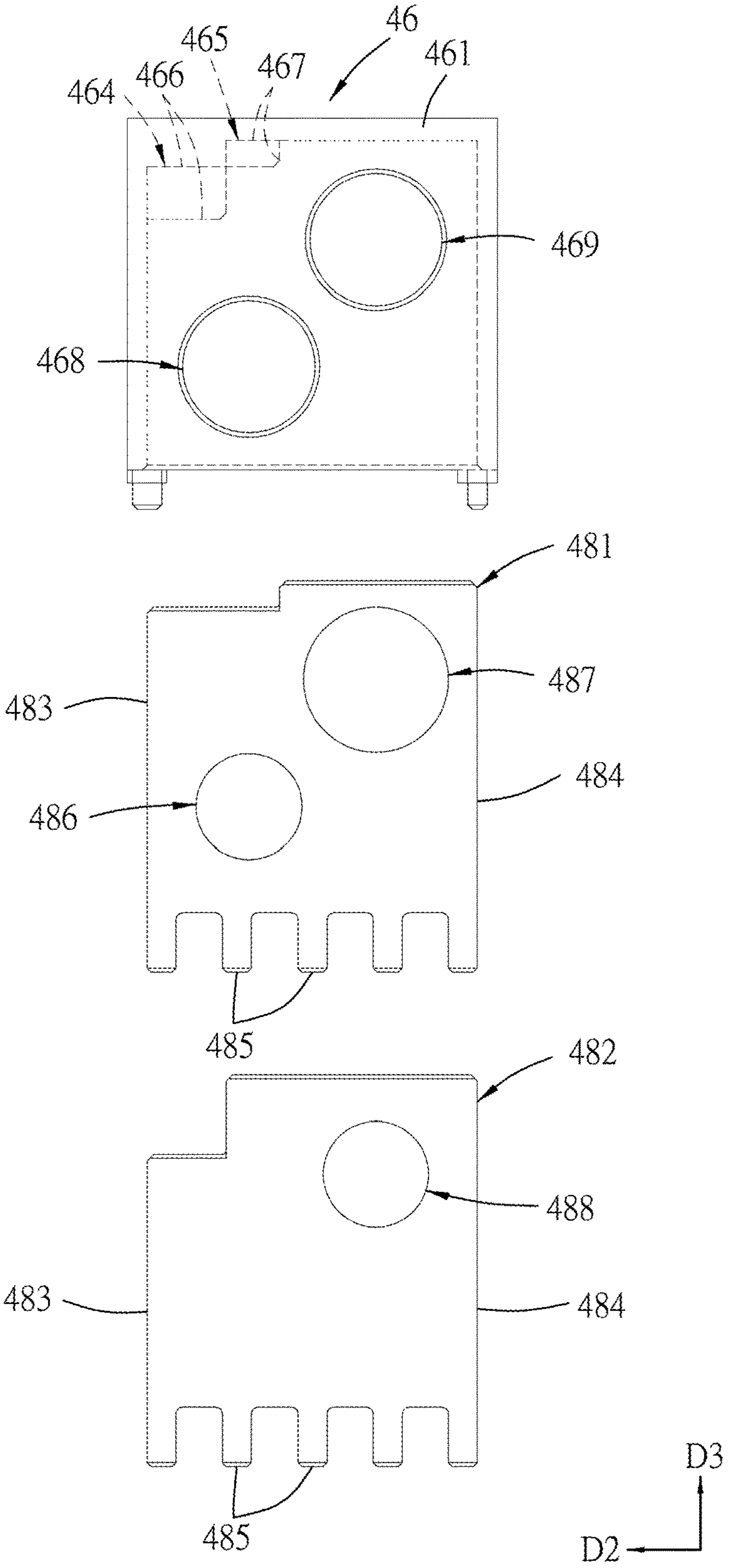
FIG. 20 is an incomplete rear exploded view of the second connector of the third embodiment.
Figure 21:
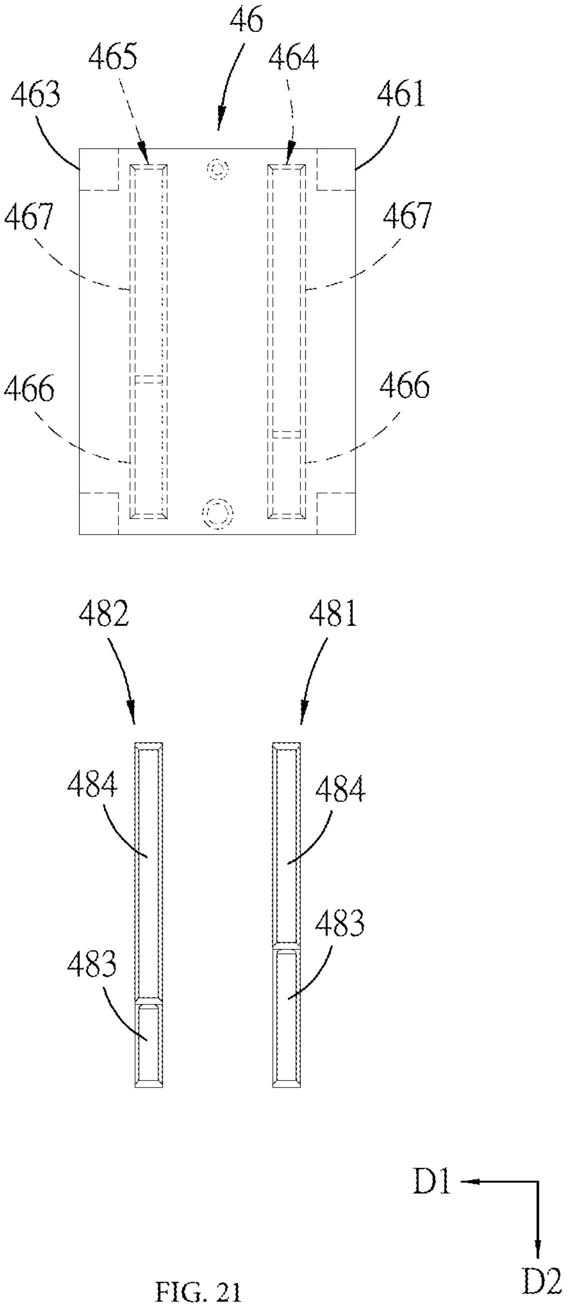
FIG. 21 is an incomplete top exploded view of the second connector of the third embodiment.
Figure 22:
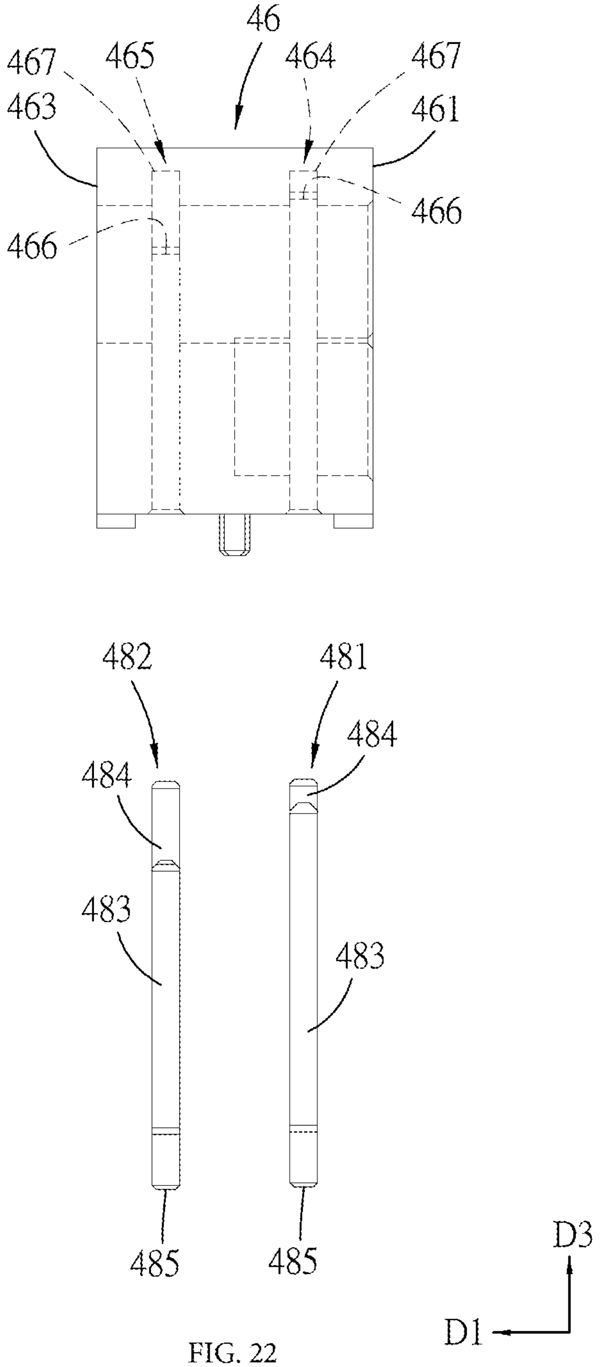
FIG. 22 is an incomplete side exploded view of the second connector of the third embodiment.
Figure 23:
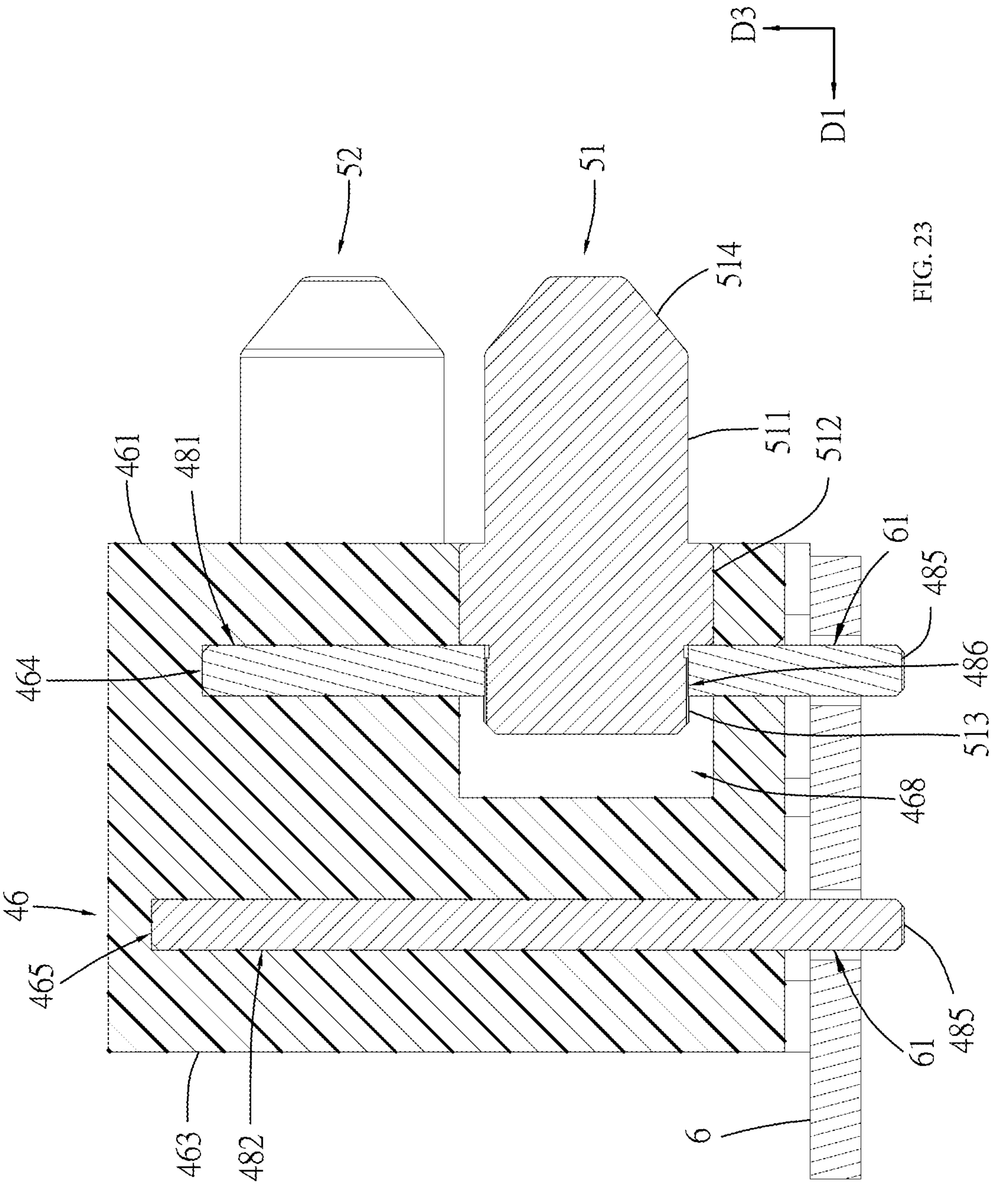
FIG. 23 is a cross sectional view taken along a line XXIII-XXIII of FIG. 18.
Figure 24:
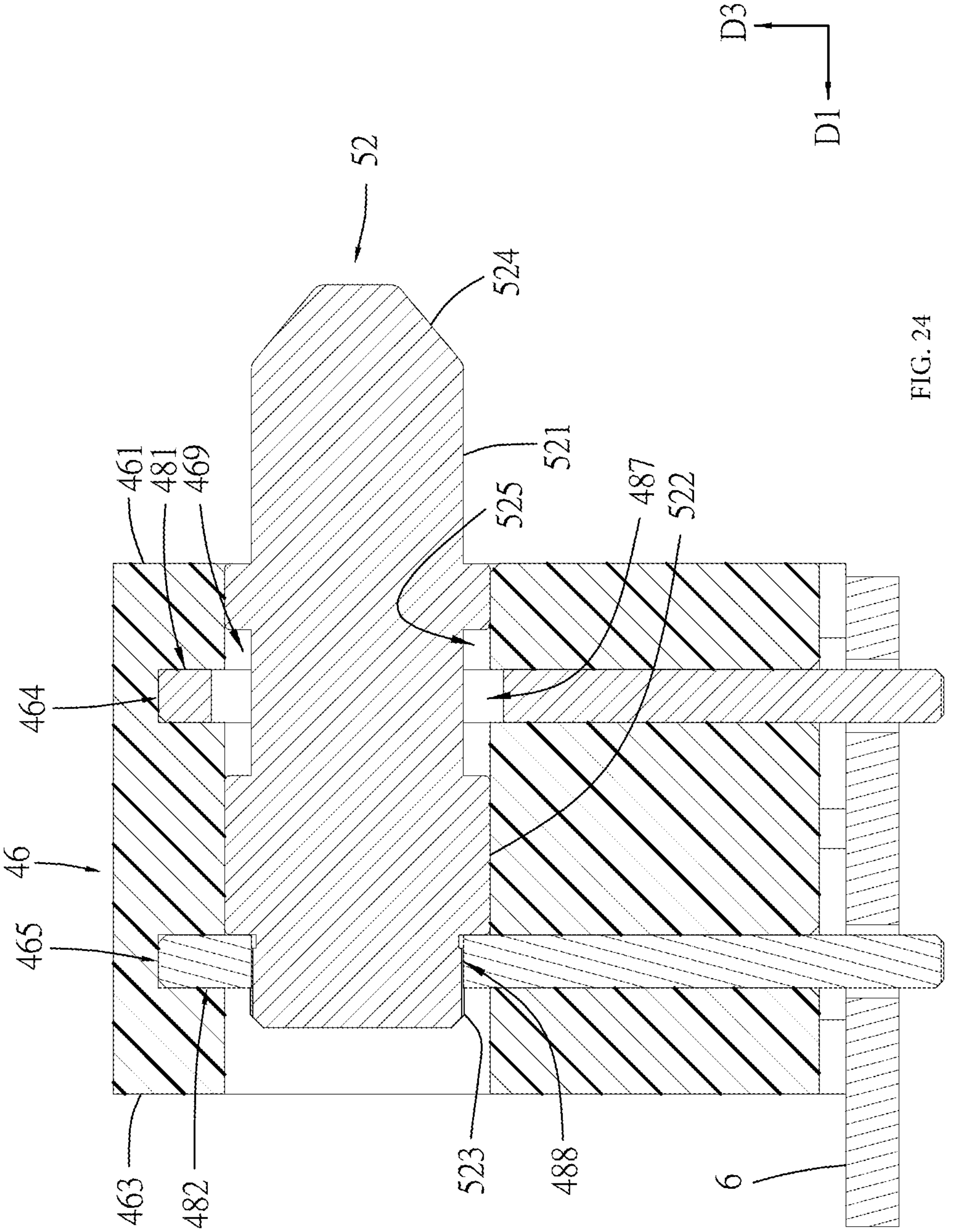
FIG. 24 is a cross sectional view taken along a line XXIV-XXIV of FIG. 18.

Referring to FIG. 20, FIG. 23 and FIG. 24, the terminal grooves are obliquely arranged and are diagonally provided to the second mating face 461. The terminal grooves respectively are a first terminal groove 468 and a second terminal groove 469. The first terminal groove 468 is adjacent to a lower left of the insulative base 46 and is communicated to the first inserting groove 464. The second terminal groove 469 is adjacent to an upper right of the insulative base 46 and is communicated to the first inserting groove 464 and the second inserting groove 465.

Referring to FIG. 19, FIG. 20, FIG. 21 and FIG. 22, the adapting plates respectively are a first adapting plate 481 and a second adapting plate 482. The first adapting plate 481 and the second adapting plate 482 each have a first plate body 483 which is arranged along the second direction D2 and a second plate body 484 which is connected to a right side of the first plate body 483 and a plurality of soldering legs 485 which protrude from a bottom end of the first plate body 483 and a bottom end of the second plate body 484. A length of the second plate body 484 taken along the third direction D3 is larger than a length of the first plate body 483 taken along the third direction D3. Here, a length of the first plate body 483 of the first adapting plate 481 taken along the second direction D2 and a length of the first plate body 483 of the second adapting plate 482 taken along the second direction D2 are not the same, and the length of the first plate body 483 of the first adapting plate 481 taken along the third direction D3 and the length of the first plate body 483 of the second adapting plate 482 taken along the third direction D3 are not the same. The length of the second plate body 484 of the first adapting plate 481 taken along the third direction D3 and the length of the second plate body 484 of the second adapting plate 482 taken along the third direction D3 are the same.

More specifically, the lengths of the first plate bodies 483 of the first adapting plate 481 and the second adapting plate 482 taken along the second direction D2 gradually decrease in the first direction D1 from the second mating face 461 toward the back face 463, and the lengths of the first plate bodies 483 of the first adapting plate 481 and the second adapting plate 482 taken along the third direction D3 gradually decrease in the first direction D1 from the second mating face 461 toward the back face 463. That is to say, the length of the first plate body 483 of the first adapting plate 481 taken along the second direction D2 is larger than the length of the first plate body 483 of the second adapting plate 482 taken along the second direction D2. The length of the first plate body 483 of the first adapting plate 481 taken along the third direction D3 is larger than the length of the first plate body 483 of the second adapting plate 482 taken along the third direction D3.

Dimensions of the first plate body 483 and the second plate body 484 of the first adapting plate 481 match with a dimension of the first inserting groove 464, so that the first plate body 483 and the second plate body 484 of the first adapting plate 481 only can completely insert into the first groove portion 466 and the second groove portion 467 of the first inserting groove 464 respectively, but cannot completely insert into the first groove portion 466 and the second groove portion 467 of the second inserting groove 465 respectively. Dimensions of the first plate body 483 and the second plate body 484 of the second adapting plate 482 match with a dimension of the second inserting groove 465, so that the first plate body 483 and the second plate body 484 of the second adapting plate 482 only can completely insert into the first groove portion 466 and the second groove portion 467 of the second inserting groove 465 respectively, but cannot completely insert into the first groove portion 466 and the second groove portion 467 of the first inserting groove 464 respectively. Therefore, it can prevent the first adapting plate 481 from wrongly inserting into the second inserting groove 465 and the second adapting plate 482 from wrongly inserting into the first inserting groove 464.

Because the lengths of the second plate bodies 484 of the first adapting plate 481 and the second adapting plate 482 taken along the third direction D3 are the same, before an assembling personnel assembles the first adapting plate 481 and the second adapting plate 482 to the insulative base 46, the assembling personnel can first adjust the second plate bodies 484 of the first adapting plate 481 and the second adapting plate 482 to be positioned to the same side. Moreover, the lengths of the first plate bodies 483 of the first adapting plate 481 and the second adapting plate 482 taken along the second direction D2 gradually decrease in the first direction D1 from the second mating face 461 toward the back face 462 and the lengths of the first plate bodies 483 of the first adapting plate 481 and the second adapting plate 482 taken along the third direction D3 gradually decrease in the first direction D1 from the second mating face 461 toward the back face 462, as such can the first adapting plate 481 and the second adapting plate 482 smoothly respectively insert into the first inserting groove 464 and the second inserting groove 465, therefore, after the assembling personnel adjusts the second plate bodies 484 of the first adapting plate 481 and the second adapting plate 482 to be positioned to the same side, the assembling personnel may arrange the first adapting plate 481 and the second adapting plate 482 from rear to front along the first direction D1 according to the aforementioned manner, and then can respectively insert the first adapting plate 481 and the second adapting plate 482 into the first inserting groove 464 and the second inserting groove 465. Therefore, convenience of the operation that the first adapting plate 481 and the second adapting plate 482 are assembled to the insulative base 46 can be promoted.

Referring to FIG. 19, FIG. 20 and FIG. 23, the plurality of soldering legs 485 are arranged and spaced apart from each other along the second direction D2. Each soldering leg 485 is provided to the corresponding soldering hole 61 and is soldered to the corresponding soldering hole 61 by a solder, so that the first adapting plate 481 and the second adapting plate 482 is electrically connected to the circuit board 6.

Referring to FIG. 19, FIG. 23 and FIG. 24, the first adapting plate 481 is formed with a first retaining hole 486 which corresponds to the first terminal groove 468 and a first through hole 487 which corresponds to the second terminal groove 469. The second adapting plate 482 is formed with a second retaining hole 488 which corresponds to the second terminal groove 469 and the first through hole 487. A hole diameter of the second retaining hole 488 is smaller than a hole diameter of the first through hole 487.

The second terminals respectively are a first male terminal 51 and a second male terminal 52. The first male terminal 51 and the second male terminal 52 each are in form of post shape, extend along the first direction D1 and respectively insert into the first terminal groove 468 and the second terminal groove 469. The first male terminal 51 has a first mating segment 511, a first positioning segment 512 which extends from a front end of the first mating segment 511, and a first retaining segment 513 which extends from a front end of the first positioning segment 512. The first mating segment 511 is exposed from the first terminal groove 468, protrudes from the second mating face 461, and is used to mate with the corresponding first terminal 23 (as shown in FIG. 3). The first mating segment 511 has a guiding conical surface 514 which is used to allow the corresponding circumferential edge portion 218 (as shown in FIG. 3) to contact therewith. The first positioning segment 512 inserts into the first terminal groove 468. An outer diameter of the first positioning segment 512 is larger than an outer diameter of the first mating segment 511 and an outer diameter of the first retaining segment 513. The first positioning segment 512 is stopped to the first adapting plate 481, and is used to limit an inserting depth of the first male terminal 51. The first retaining segment 513 is provided to the first retaining hole 486 and is retained to the first retaining hole 486. The first retaining segment 513 is caught to the first adapting plate 481 by interference fit manner and in turn is retained to the first retaining hole 486.

A length of the second male terminal 52 extending along the first direction D1 is larger than a length of the first male terminal 51 extending along the first direction D1. The second male terminal 52 has a second mating segment 521, a second positioning segment 522 which extends from a front end of the second mating segment 521, and a second retaining segment 523 which extends from a front end of the second positioning segment 522. The second mating segment 521 is exposed from the second terminal groove 469, protrudes from the second mating face 461, and is used to mate with the corresponding first terminal 23 (as shown in FIG. 3). The second mating segment 521 has a guiding conical surface 524 which is used to allow the corresponding circumferential edge portion 218 (as shown in FIG. 3) to contact therewith. The second positioning segment 522 inserts into the second terminal groove 469 and passes through the first through hole 487 of the first adapting plate 481. An outer diameter of the second positioning segment 522 is larger than an outer diameter of the second mating segment 521 and an outer diameter of the second retaining segment 523. The second positioning segment 522 is stopped to the second adapting plate 482, and is used to limit an inserting depth of the second male terminal 52. The second retaining segment 523 is provided to the second retaining hole 488 and is retained to the second retaining hole 488. The second retaining segment 523 is caught to the second adapting plate 482 by interference fit manner and in turn is retained to the second retaining hole 488.

In order to avoid the second positioning segment 522 contacting the first adapting plate 481 to be electrically connected with the first adapting plate 481, an outer circumferential surface of the second positioning segment 522 is radially recessed to form an annular avoiding groove 525, the annular avoiding groove 525 corresponds to the first through hole 487 in position, therefore, it can avoid the second positioning segment 522 contacting the first adapting plate 481.

By that the first male terminal 51 and the second male terminal 52 are diagonally provided to the insulative base 46, length dimensions of the insulative base 46 in the second direction D2 and the third direction D3 can be reduced. By that the plurality of soldering legs 485 of the first adapting plate 481 are arranged and spaced apart from each other along the second direction D2 and the plurality of soldering legs 485 of the second adapting plate 482 are arranged and spaced apart from each other along the second direction D2, a length dimension of the insulative base 46 in the first direction D1 can be reduced. Therefore, a volume of the second connector 4 can be miniaturized. By that the first connector 2 and the second connector 4 are respectively provided to the first panel 1 and the circuit board 6, the electrical connection device 100 of the third embodiment provides a technical solution that the panel-end connector and the right-angle board-end connector mate with each other, so that the electrical connection device 100 of the third embodiment can be applied in the circumstance having the aforementioned need. Moreover, by that the first male terminal 51 and the second male terminal 52 each are electrically connected to one corresponding adapting plate, the second connector 4 of the third embodiment can be applied in a low current transmitting circumstance.

Figure 25:
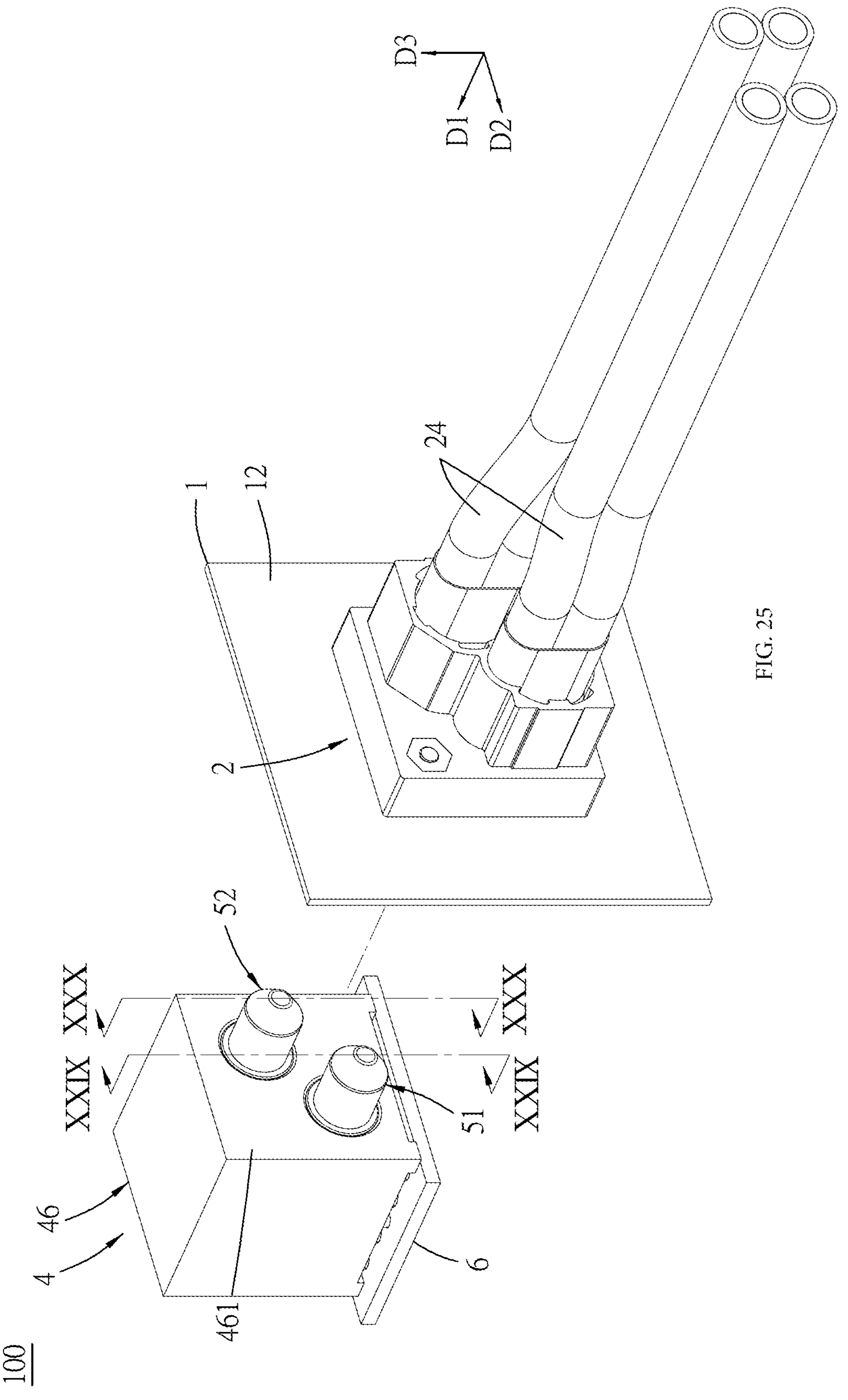
FIG. 25 is a perspective exploded view of a fourth embodiment of the electrical connection device of the present disclosure.

Referring to FIG. 25, a fourth embodiment of the electrical connection device 100 of the present disclosure is substantially the same as the third embodiment in entire structure, difference lies in the second connector 4 and the circuit board 6.

Figure 26:
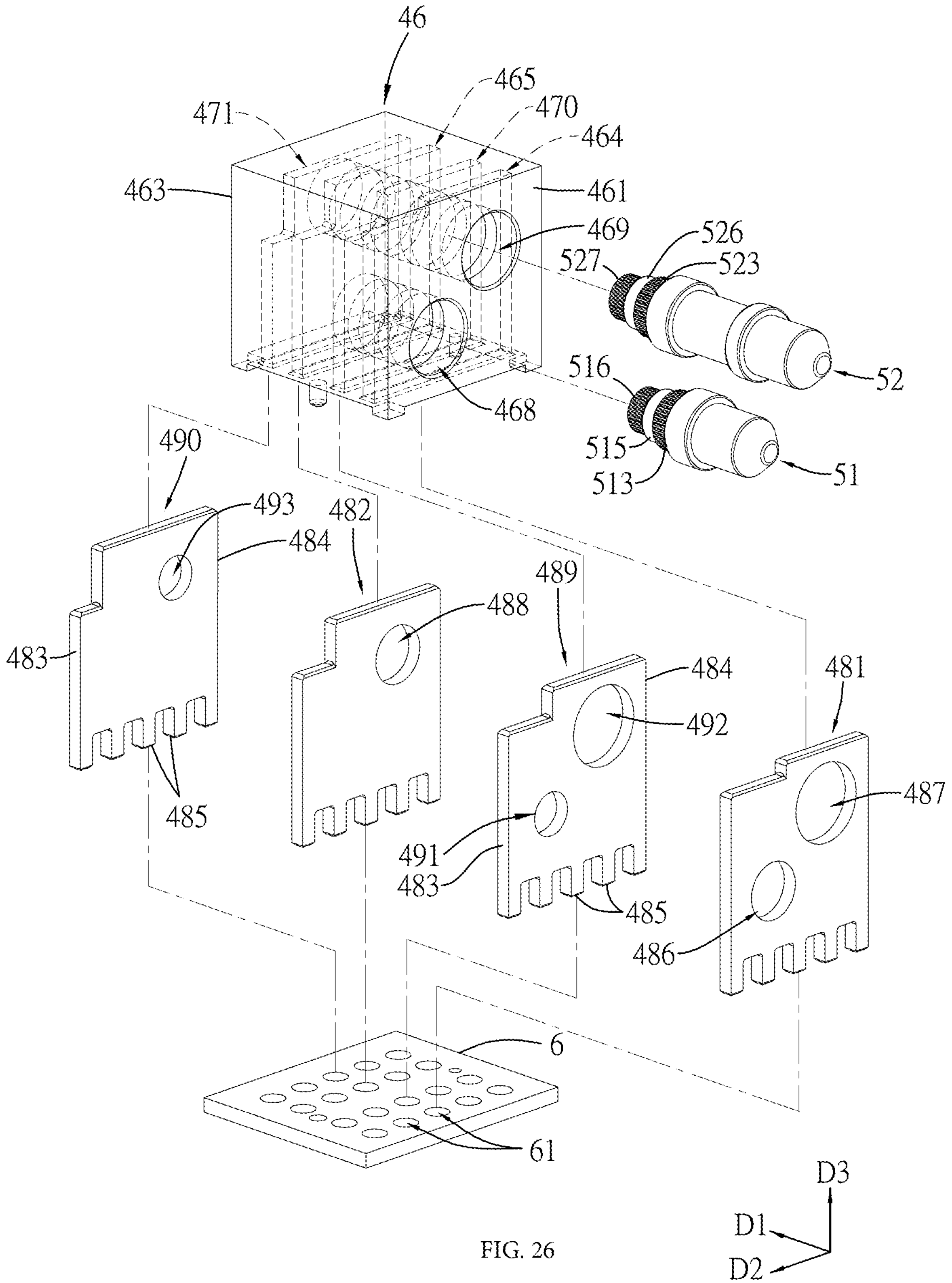
FIG. 26 is a perspective exploded view of the second connector and the circuit board of the fourth embodiment.
Figure 27:
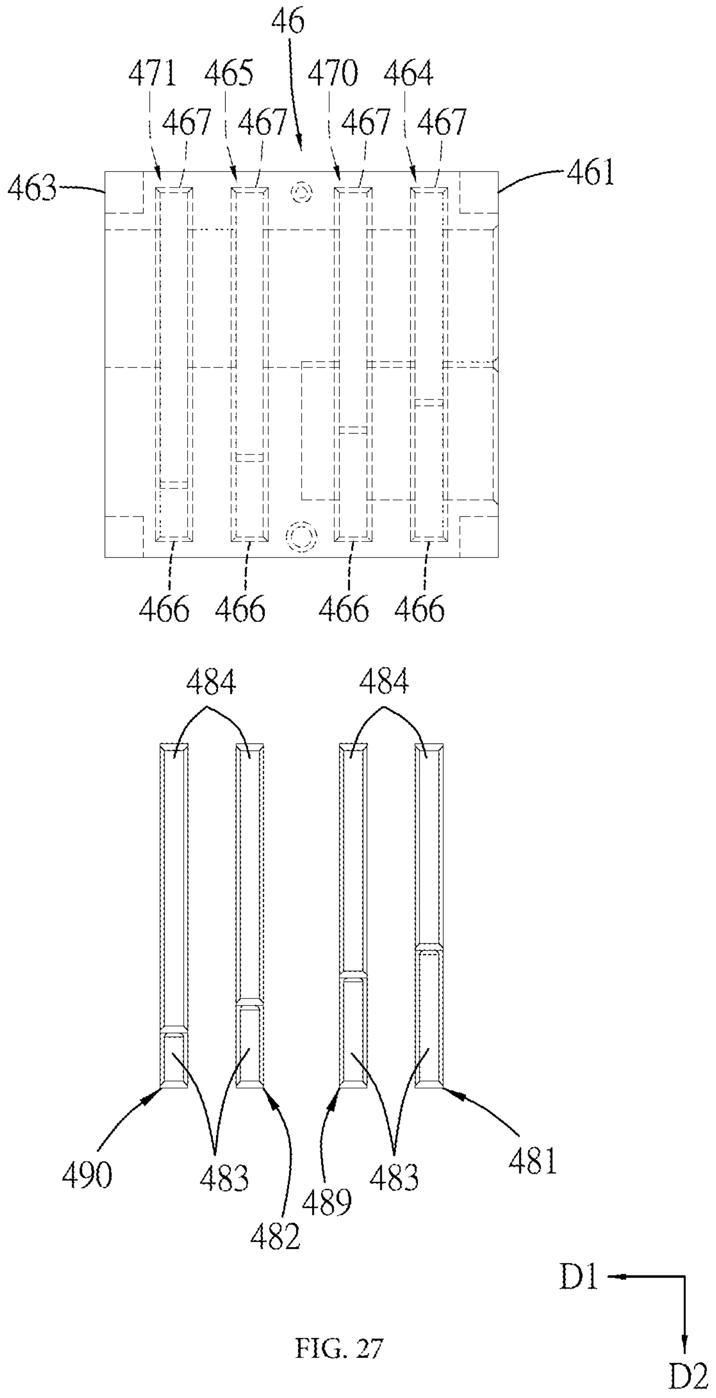
FIG. 27 is an incomplete top exploded view of the second connector of the fourth embodiment.
Figure 28:
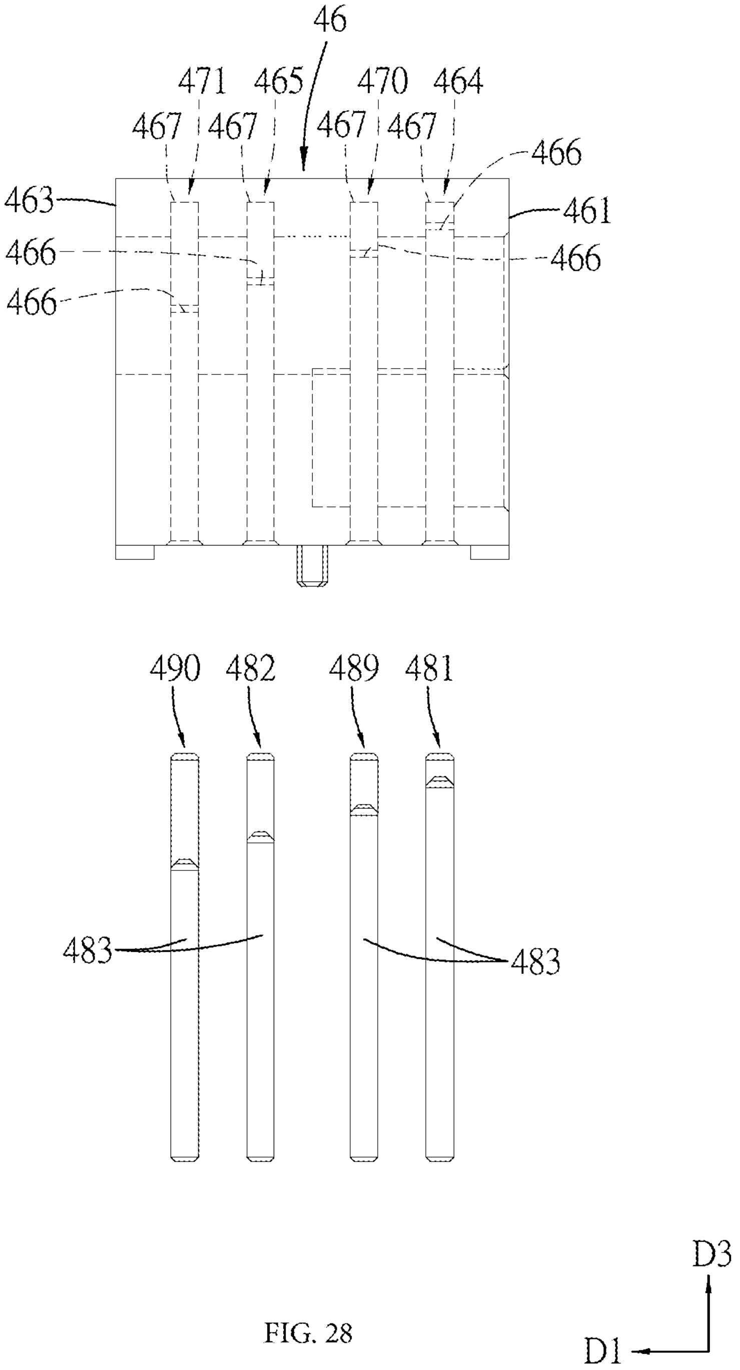
FIG. 28 is an incomplete side exploded view of the second connector of the fourth embodiment.

Referring to FIG. 26, FIG. 27 and FIG. 28, the number of the soldering holes 61 of the circuit board 6 is for example but is not limited to twenty. The insulative base 46 is further formed with a third inserting groove 470 which is positioned between the first inserting groove 464 and the second inserting groove 465 and a fourth inserting groove 471 which is positioned between the second inserting groove 465 and the back face 463. The third inserting groove 470 and the fourth inserting groove 471 each have the first groove portion 466 and the second groove portion 467. The lengths of the first groove portions 466 of the first inserting groove 464, the third inserting groove 470, the second inserting groove 465 and the fourth inserting groove 471 taken along the second direction D2 gradually decrease in the first direction D1 from the second mating face 461 toward the back face 463; the lengths of the first groove portions 466 of the first inserting groove 464, the third inserting groove 470, the second inserting groove 465 and the fourth inserting groove 471 taken along the third direction D3 gradually decrease in the first direction D1 from the second mating face 461 toward the back face 463. That is to say, the length of the first groove portion 466 of the third inserting groove 470 taken along the second direction D2 is smaller than the length of the first groove portion 466 of the first inserting groove 464 taken along the second direction D2 but is larger than the length of the first groove portion 466 of the second inserting groove 465 taken along the second direction D2. The length of the first groove portion 466 of the fourth inserting groove 471 taken along the second direction D2 is smaller than the length of the first groove portion 466 of the second inserting groove 465 taken along the second direction D2. The length of the first groove portion 466 of the third inserting groove 470 taken along the third direction D3 is smaller than the length of the first groove portion 466 of the first inserting groove 464 taken along the third direction D3 but is larger than the length of the first groove portion 466 of the second inserting groove 465 taken along the third direction D3. The length of the first groove portion 466 of the fourth inserting groove 471 taken along the third direction D3 is smaller than the length of the first groove portion 466 of the second inserting groove 465 taken along the third direction D3.

Figure 29:
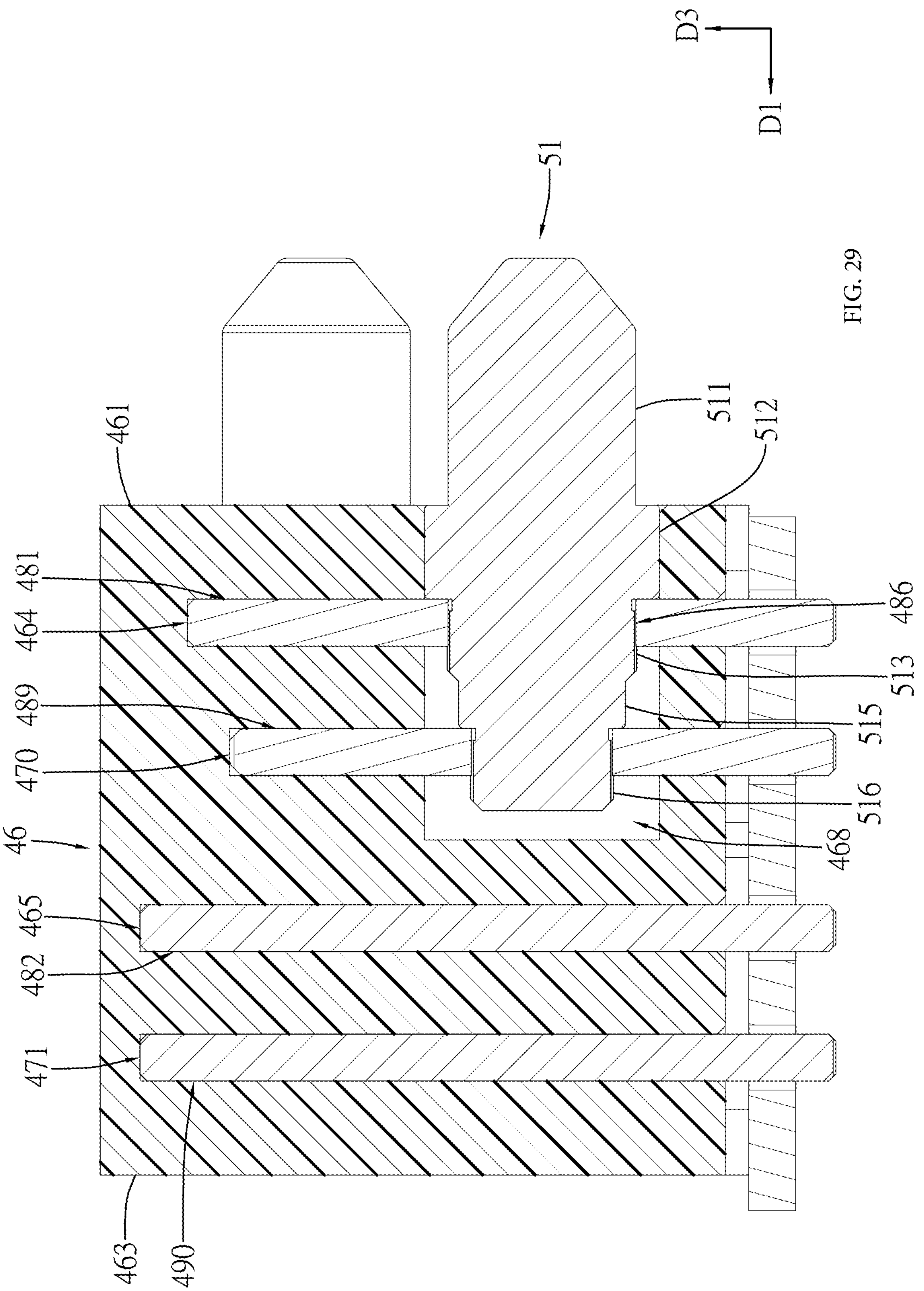
FIG. 29 is a cross sectional view taken along a line XXIX-XXIX of FIG. 25.
Figure 30:
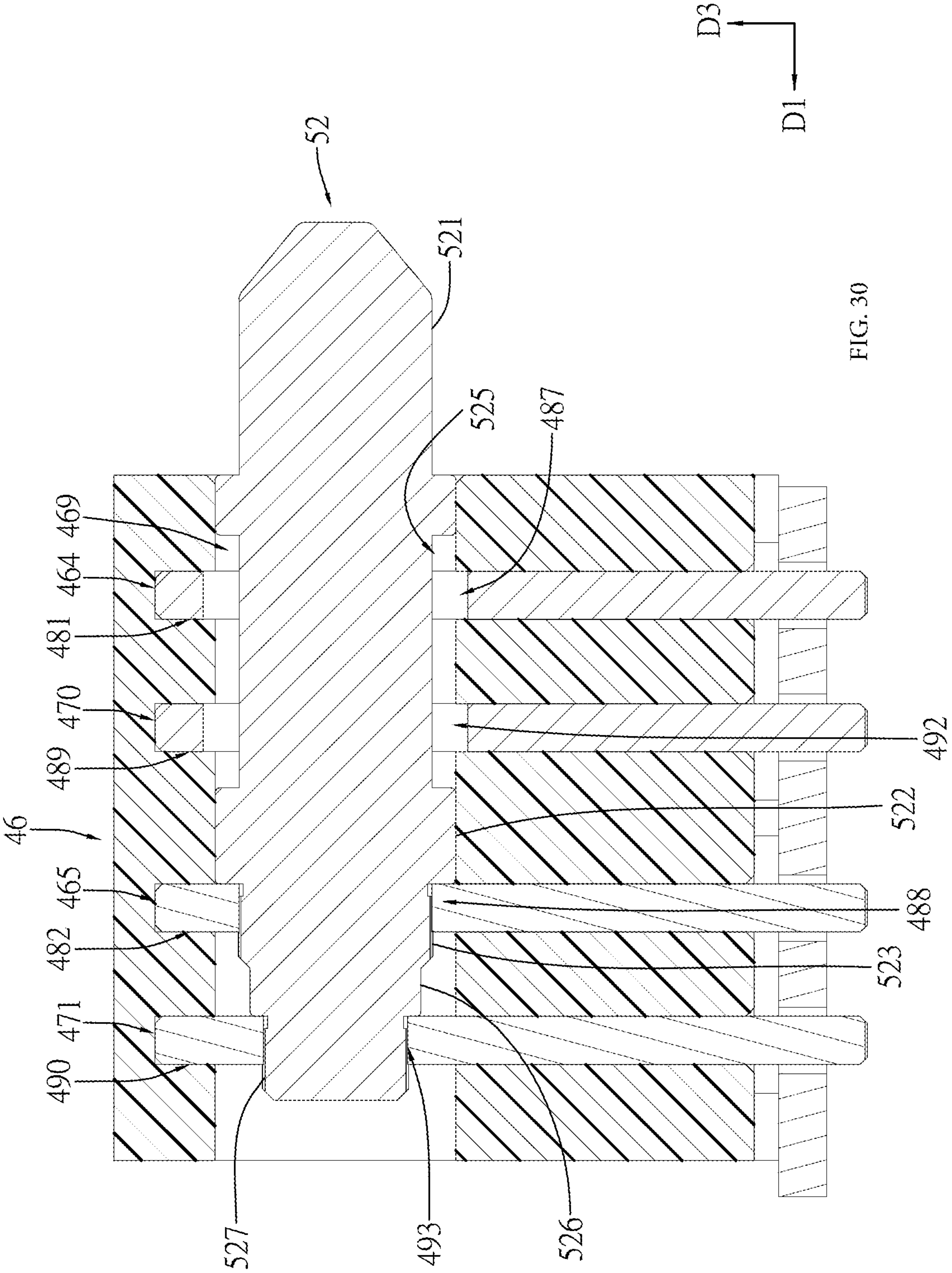
FIG. 30 is a cross sectional view taken along a line XXX-XXX of FIG. 25.

Referring to FIG. 26, FIG. 29 and FIG. 30, the first terminal groove 468 is communicated to the first inserting groove 464 and the third inserting groove 470. The second terminal groove 469 is communicated to the first inserting groove 464, the second inserting groove 465, the third inserting groove 470 and the fourth inserting groove 471.

Referring to FIG. 26, FIG. 27 and FIG. 28, the second connector 4 further includes a third adapting plate 489 which is positioned between the first adapting plate 481 and the second adapting plate 482 and inserts into the third inserting groove 470 and a fourth adapting plate 490 which is positioned at a side of the second adapting plate 482 opposite to the third adapting plate 489 and inserts into the fourth inserting groove 471. The third adapting plate 489 and the fourth adapting plate 490 each have the first plate body 483, the second plate body 484 and the plurality of soldering legs 485. The lengths of the first plate bodies 483 of the first adapting plate 481, the third adapting plate 489, the second adapting plate 482 and the fourth adapting plate 490 taken along the second direction D2 gradually decrease in the first direction D1 from the second mating face 461 toward the back face 463; the length of the first plate bodies 483 of the first adapting plate 481, the third adapting plate 489, the second adapting plate 482 and the fourth adapting plate 490 taken along the third direction D3 gradually decrease in the first direction D1 from the second mating face 461 toward the back face 463. That is to say, the length of the first plate body 483 of the third adapting plate 489 taken along the second direction D2 is smaller than the length of the first plate body 483 of the first adapting plate 481 taken along the second direction D2 but is larger than the length of the first plate body 483 of the second adapting plate 482 taken along the second direction D2. The length of first plate body 483 of the fourth adapting plate 490 taken along the second direction D2 is smaller than the first plate body 483 of the second adapting plate 482 taken along the second direction D2. The length of the first plate body 483 of the third adapting plate 489 taken along the third direction D3 is smaller than the length of the first plate body 483 of the first adapting plate 481 taken along the third direction D3 but is larger than the length of the first plate body 483 of the second adapting plate 482 taken along the third direction D3. The length of the first plate body 483 of the fourth adapting plate 490 taken along the third direction D3 is smaller than the length of the first plate body 483 of the second adapting plate 482 taken along the third direction D3.

Dimensions of the first plate body 483 and the second plate body 484 of the third adapting plate 489 match with a dimension of the third inserting groove 470, so that the first plate body 483 and the second plate body 484 of the third adapting plate 489 only can completely insert into the first groove portion 466 and the second groove portion 467 of the third inserting groove 470 respectively. Dimensions of the first plate body 483 and the second plate body 484 of the fourth adapting plate 490 match with a dimension of the fourth inserting groove 471, so that the first plate body 483 and the second plate body 484 of the fourth adapting plate 490 only can completely insert into the first groove portion 466 and the second groove portion 467 of the fourth inserting groove 471 respectively. Therefore, it can prevent the third adapting plate 489 and the fourth adapting plate 490 from wrongly inserting into the other inserting grooves.

Referring to FIG. 26, FIG. 29 and FIG. 30, the third adapting plate 489 is formed with a third retaining hole 491 which corresponds to the first terminal groove 468 and the first retaining hole 486 and a second through hole 492 which corresponds to the second terminal groove 469 and the first through hole 487. The fourth adapting plate 490 is formed with a fourth retaining hole 493 which corresponds to the second terminal groove 469 and the second retaining hole 488. The first male terminal 51 further has a first stopping segment 515 which extends from a front end of the first retaining segment 513 and a third retaining segment 516 which extends from a front end of the first stopping segment 515. An outer diameter of the first stopping segment 515 is smaller than the outer diameter of the first retaining segment 513, is stopped to the third adapting plate 489, and is used to limit an inserting depth of the first male terminal 51. An outer diameter of the third retaining segment 516 is smaller than the outer diameter of the first stopping segment 515, the third retaining segment 516 is provided to the third retaining hole 491 and is retained to the third retaining hole 491. The third retaining segment 516 is caught to the third adapting plate 489 by interference fit manner and in turn is retained to the third retaining hole 491. Therefore, the first male terminal 51 can be electrically connected to the first adapting plate 481 and the third adapting plate 489.

The second male terminal 52 further has a second stopping segment 526 which extends from a front end of the second retaining segment 523 and a fourth retaining segment 527 which extends from a front end of the second stopping segment 526. An outer diameter of the second stopping segment 526 is smaller than the outer diameter of the second retaining segment 523, is stopped to the fourth adapting plate 490, and is used to limit an inserting depth of the second male terminal 52. An outer diameter of the fourth retaining segment 527 is smaller than the outer diameter of the second stopping segment 526. The fourth retaining segment 527 is provided to the fourth retaining hole 493 and is retained to the fourth retaining hole 493. The fourth retaining segment 527 is caught to the fourth adapting plate 490 by interference fit manner and in turn is retained to the fourth retaining hole 493. Therefore, the second male terminal 52 can be electrically connected to the second adapting plate 482 and the fourth adapting plate 490.

The second positioning segment 522 of the second male terminal 52 passes through the first through hole 487 and the second through hole 492, the annular avoiding groove 525 of the second positioning segment 522 corresponds to the first through hole 487 and the second through hole 492 in position, therefore, it can avoid the second positioning segment 522 contacting the first adapting plate 481 and the third adapting plate 489.

By that the first male terminal 51 and the second male terminal 52 each are electrically connected to the two corresponding adapting plates, the second connector 4 of the fourth embodiment can be applied in high current transmitting circumstance.

Figure 31:
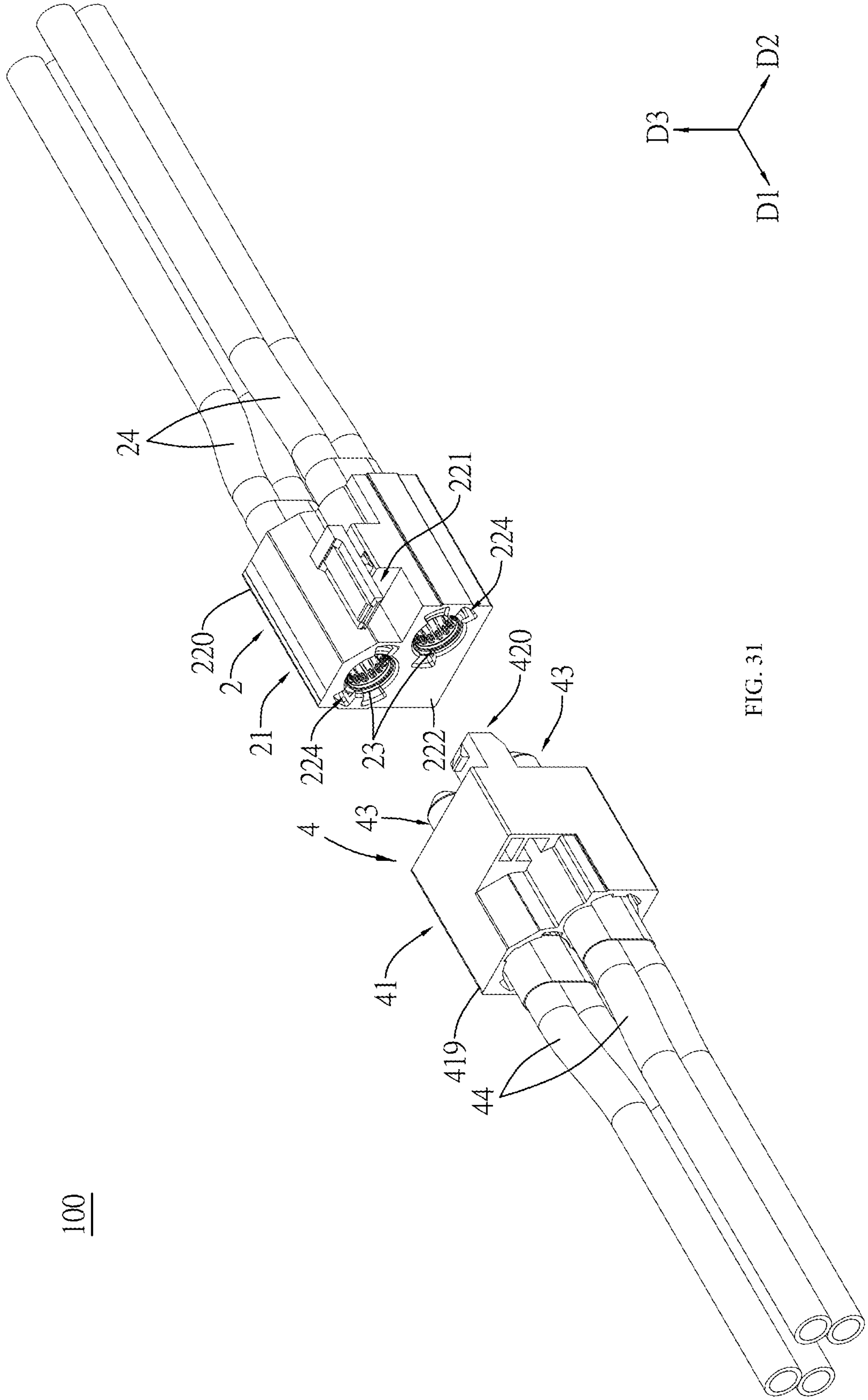
FIG. 31 is a perspective exploded view of a fifth embodiment of the electrical connection device of the present disclosure.
Figure 32:
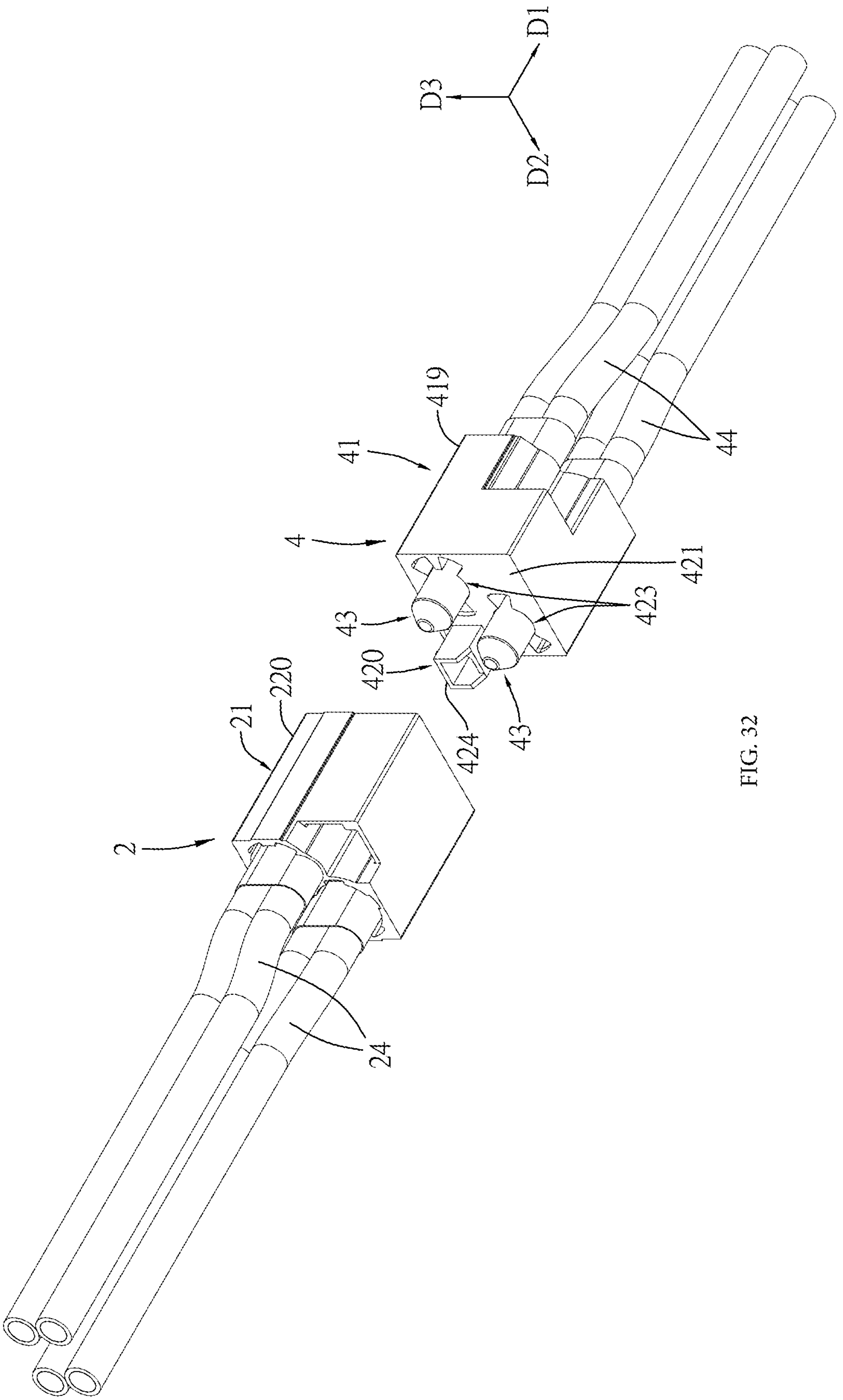
FIG. 32 is a perspective exploded view of the fifth embodiment viewed from another angle.
Figure 33:
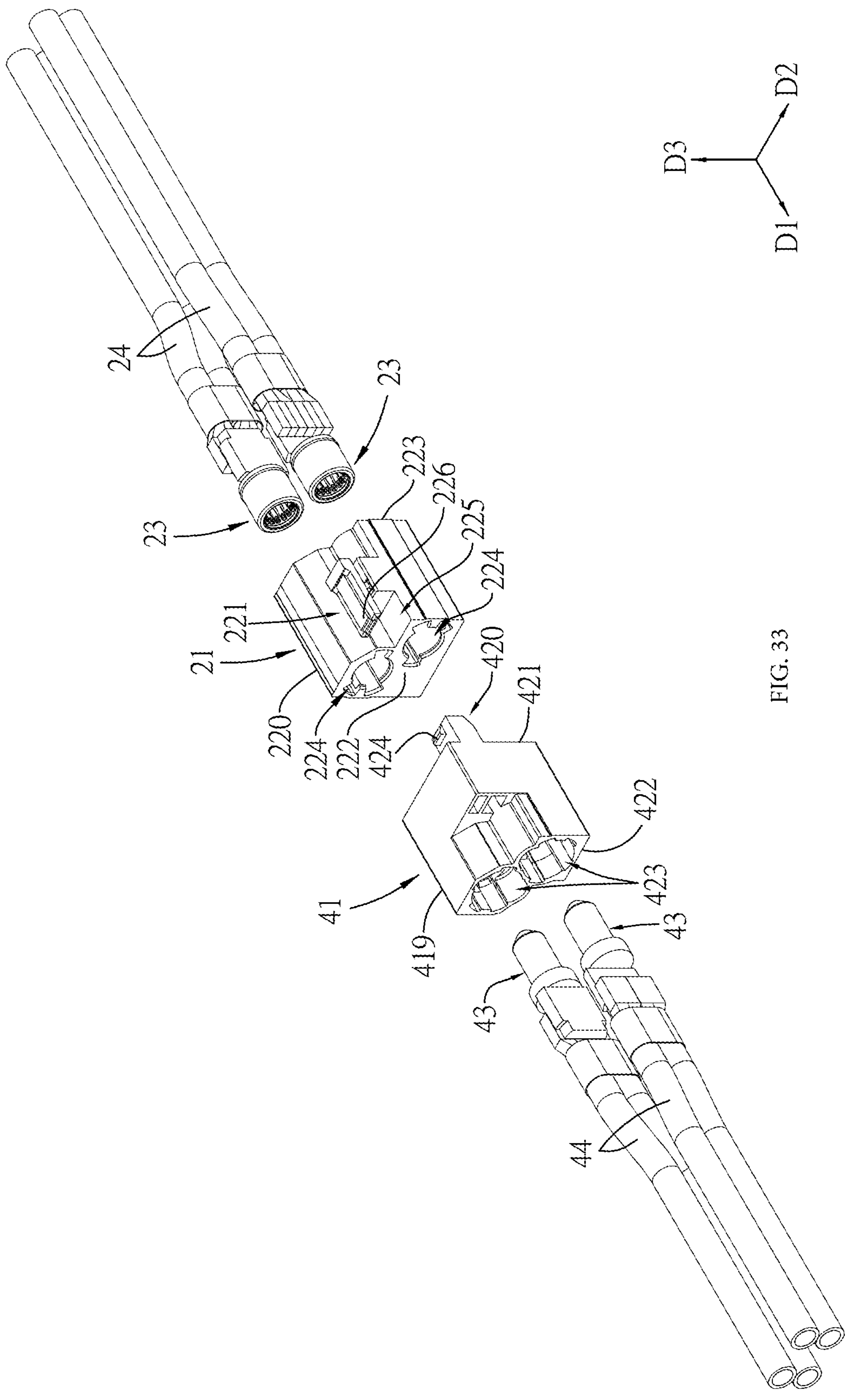
FIG. 33 is a perspective exploded view of the fifth embodiment.
Figure 34:
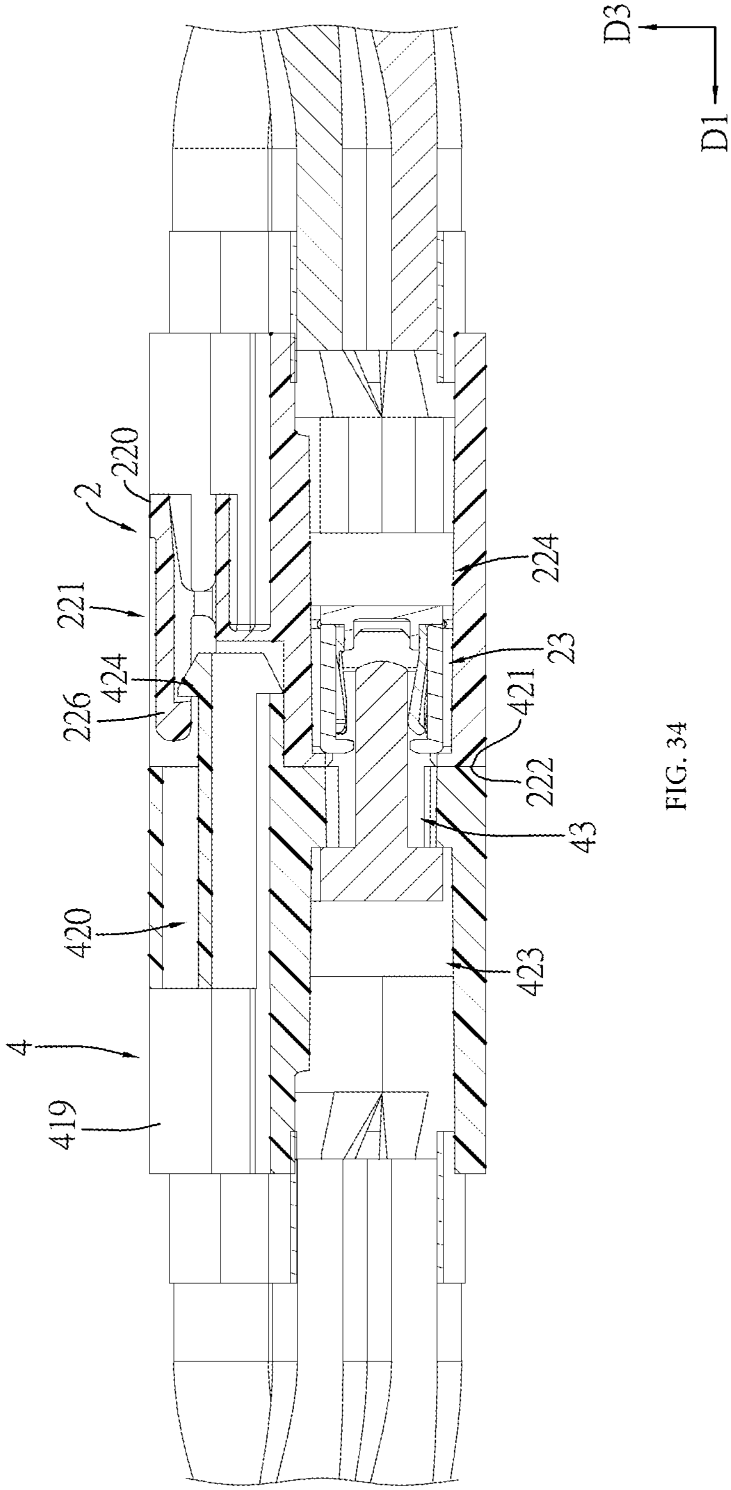
FIG. 34 is an incomplete cross-sectional view of the fifth embodiment.

Referring to FIG. 31, a fifth embodiment of the electrical connection device 100 of the present disclosure is substantially the same as the first embodiment in entire structure, difference lies in the first connector 2 and the second connector 4.

Referring to FIG. 31, FIG. 32, FIG. 33 and FIG. 34, the first connector 2 and the second connector 4 each are a cable-end connector which has a locking structure. The first insulative outer housing 21 of the first connector 2 has a first housing body 220 and a first locking structure 221. The first housing body 220 has a first mating face 222 and a first back face 223 which is opposite to the first mating face 222. The first housing body 220 is formed with two first receiving grooves 224 which extend between the first mating face 222 and the first back face 223 and are in form of oblique arrangement. Each first terminal 23 and a part of the first cable 24 connected to the first terminal 23 are received in the corresponding first receiving groove 224, therefore, the first terminals 23 are in form of oblique arrangement and are provided to the first housing body 220. An outer circumferential surface of the first housing body 220 is recessed to form a recessed portion 225 which is positioned between the first mating face 222 and the first back face 223. The first locking structure 221 is provided to the recessed portion 225, and the first locking structure 221 and the first terminals 23 are in form of triangular arrangement. The first locking structure 221 has an elastic latching arm 226.

The second insulative outer housing 41 of the second connector 4 has a second housing body 419 and a second locking structure 420. The second housing body 419 has a second mating face 421 which mates with the first mating face 222 and a second back face 422 which is opposite to the second mating face 421. The second housing body 419 is formed with two second receiving grooves 423 which extend between the second mating face 421 and the second back face 422 and are in form of oblique arrangement. Each second terminal 43 and a part of the second cable 44 connected to the second terminal 43 are received in the corresponding second receiving groove 423, so that the second terminals 43 are in form of oblique arrangement and are provided to the second housing body 419. The second locking structure 420 protrudes from the second mating face 421 of the second housing body 419, and the second locking structure 420 and the second terminals 43 are in form of triangular arrangement. The second locking structure 420 has a latching arm 424 which is used to latch with the elastic latching arm 226.

By that, the first locking structure 221 and the first terminals 23 are in form of triangular arrangement, length dimensions of the first insulative outer housing 21 in the second direction D2 and the third direction D3 can be reduced, a volume of the first connector 2 can be miniaturized. By that, the second locking structure 420 and the second terminals 43 are in form of triangular arrangement, length dimensions of the second insulative outer housing 41 in the second direction D2 and the third direction D3 can be reduced, a volume of the second connector 4 can be miniaturized. By that the first connector 2 and the second connector 4 respectively have the first locking structure 221 and the second locking structure 420, the electrical connection device 100 of the fifth embodiment provide a technical solution that the cable-end connectors having the locking structures mate with each other, so that the electrical connection device 100 of the fifth embodiment can be applied in the circumstance having the aforementioned need.

Figure 35:
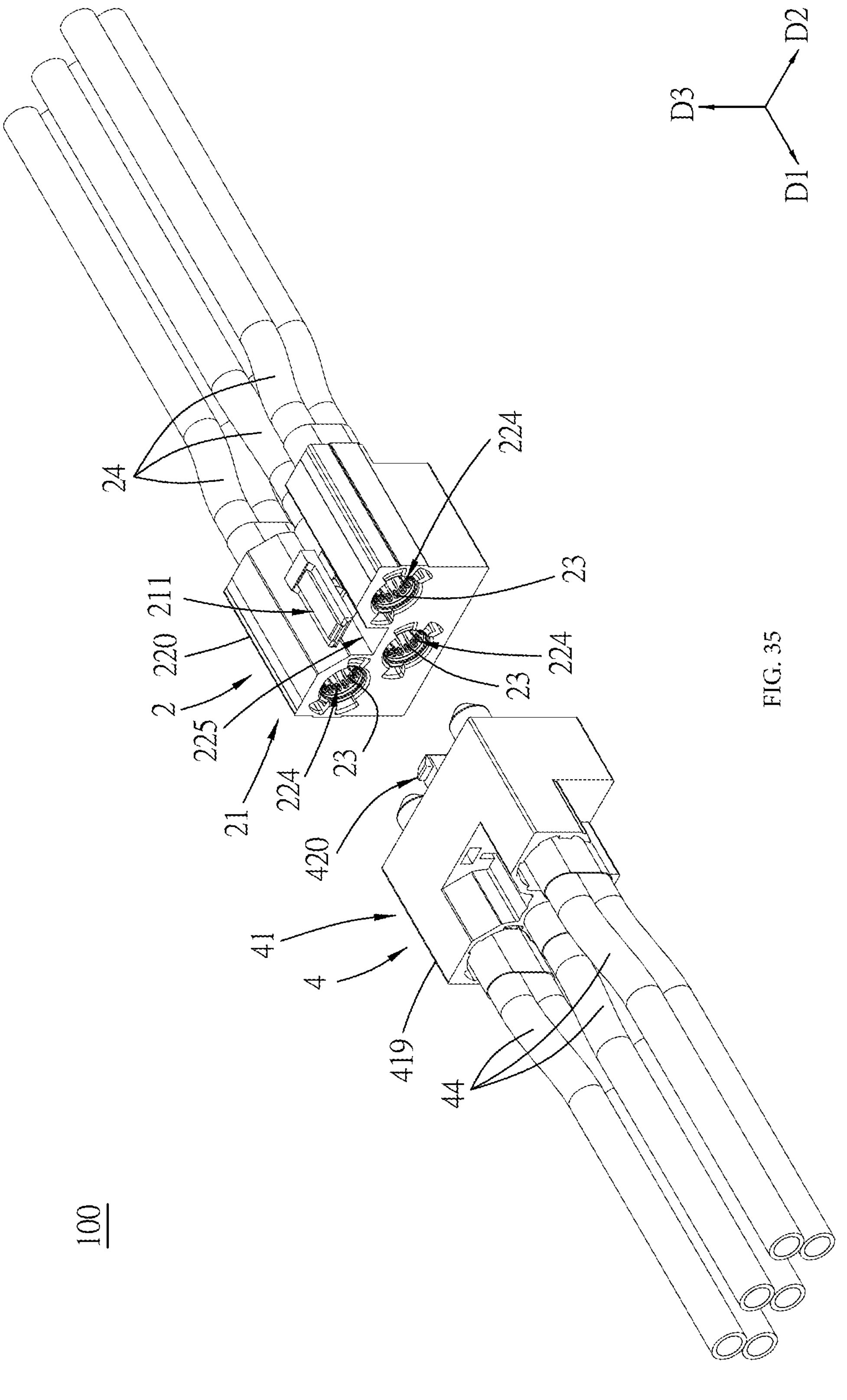
FIG. 35 is a perspective exploded view of a sixth embodiment of the electrical connection device of the present disclosure.

Referring to FIG. 35, a sixth embodiment of the electrical connection device 100 of the present disclosure is substantially the same as the fifth embodiment in entire structure, difference lies in the first connector 2 and the second connector 4.

Figure 36:
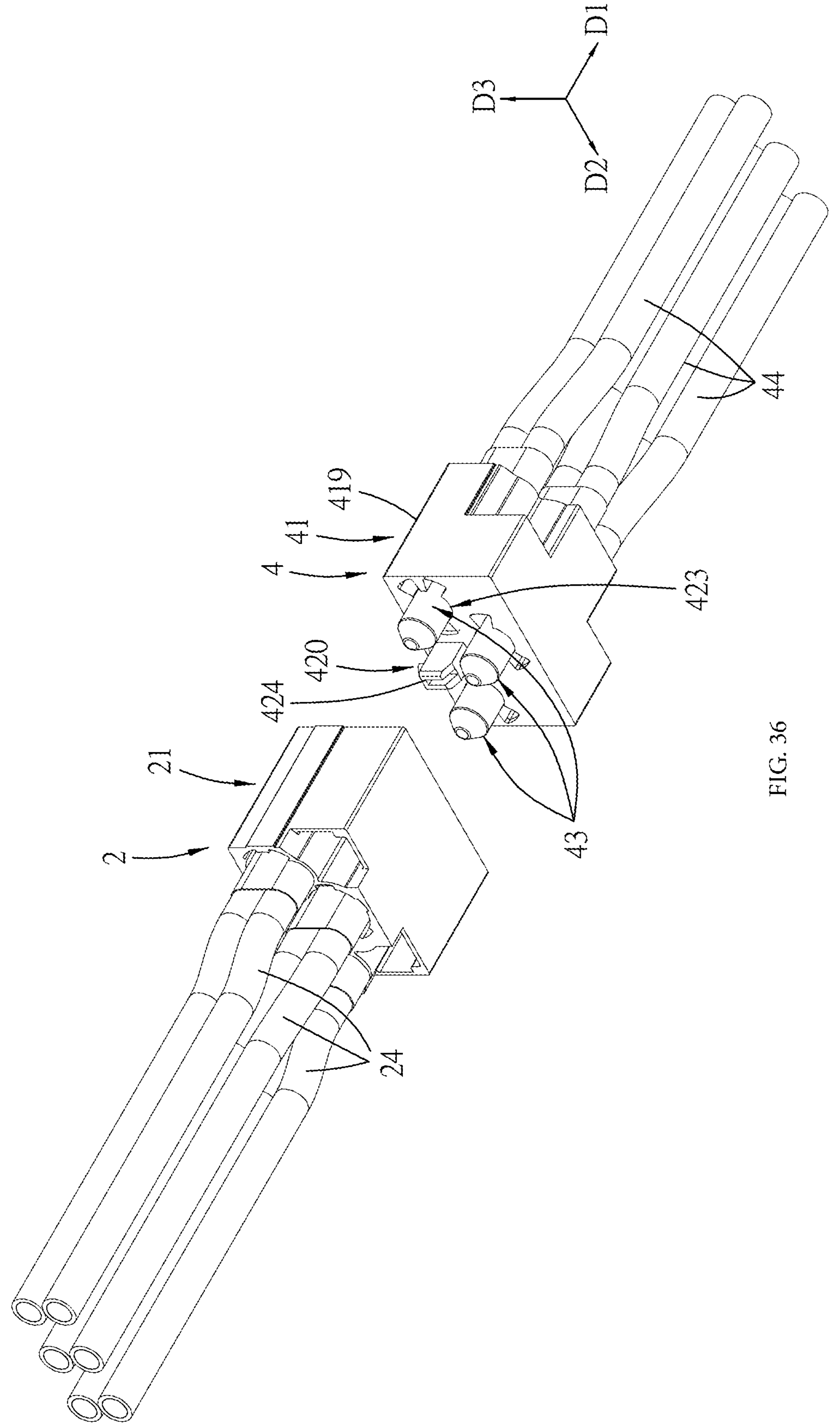
FIG. 36 is a perspective exploded view of the sixth embodiment viewed from another angle.
Figure 37:
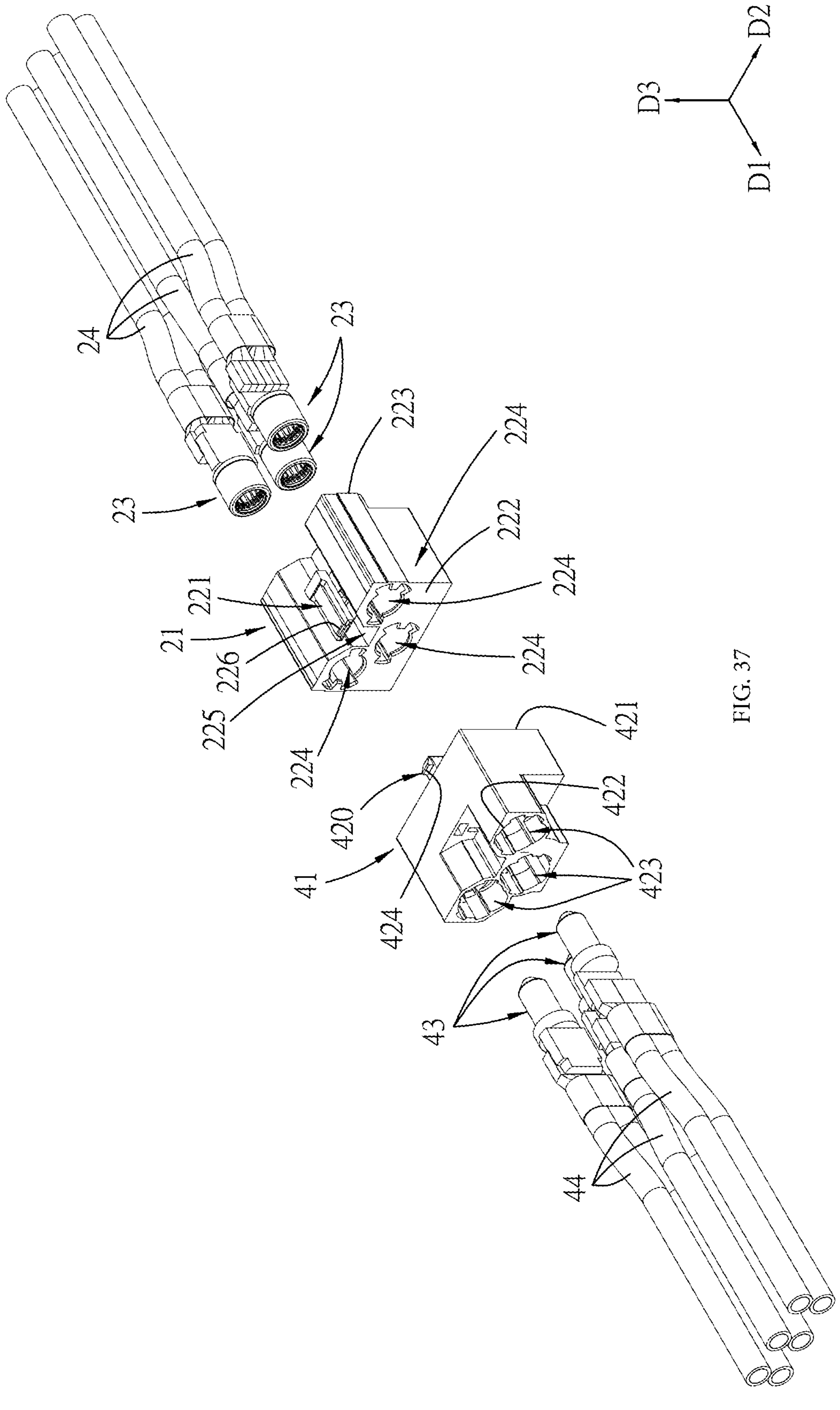
FIG. 37 is a perspective exploded view of the sixth embodiment.

Referring to FIG. 35, FIG. 36 and FIG. 37, the first housing body 220 is formed with three first receiving grooves 224 which extend between the first mating face 222 and the first back face 223 and are in form of triangular arrangement. The two first receiving grooves 224 of the three first receiving grooves 224 are left and right spaced apart from each other along the second direction D2, and the other one first receiving groove 224 of the three first receiving grooves 224 is lower than the two first receiving grooves 224 in height in the third direction D3 and is between the two first receiving grooves 224. The first connector 2 includes three first terminals 23 and three first cables 24 respectively electrically connected with the three first terminals 23. Each first terminal 23 and a part of the first cable 24 connected to the first terminal 23 are received in the corresponding first receiving groove 224, therefore, the three first terminals 23 are in form of triangular arrangement and are provided to the first housing body 220. The two first terminals 23 of the three first receiving grooves 224 are left and right spaced apart from each other along the second direction D2, the other one first terminal 23 of the three first receiving grooves 224 is lower than the two first terminals 23 in height in the third direction D3 and is between the two first terminals 23. The recessed portion 225 of the first housing body 220 is between the three first receiving grooves 224 and is between the three first terminals 23. The first locking structure 221 is provided to the recessed portion 225 and is between the three first terminals 23.

The second housing body 419 is formed with three second receiving grooves 423 which extend between the second mating face 421 and the second back face 422 and are in form of triangular arrangement of. The two second receiving grooves 423 of the three second receiving grooves 423 are left and right spaced apart from each other along the second direction D2, the other one second receiving groove 423 is lower than the two second receiving grooves 423 in height in the third direction D3 and are between the two second receiving grooves 423. The second connector 4 includes three second terminals 43 and three second cables 44 respectively electrically connected with the three second terminals 43. Each second terminal 43 and a part of the second cable 44 connected to the second terminal 43 are received in the corresponding second receiving groove 423, therefore, the two second terminals 43 are in form of triangular arrangement and are provided to the second housing body 419. The two second terminals 43 of the three second terminals 43 are left and right spaced apart from each other along the second direction D2, the other one second terminal 43 of the three second terminals 43 is lower than the two second terminals 43 in height in the third direction D3 and is between the two second terminals 43. The second locking structure 420 protrudes from the second mating face 421 and is between the three second terminals 43.

By that the three first terminals 23 are in form of triangular arrangement and the first locking structure 221 is between the three first terminals 23, length dimensions of the first insulative outer housing 21 in the second direction D2 and the third direction D3 can be reduced, a volume of the first connector 2 can be miniaturized. By that, the three second terminals 43 are in form of triangular arrangement and the second locking structure 420 is between the three second terminals 43, length dimensions of the second insulative outer housing 411 in the second direction D2 and the third direction D3 can be reduced, a volume of the second connector 4 can be miniaturized.

Figure 38:
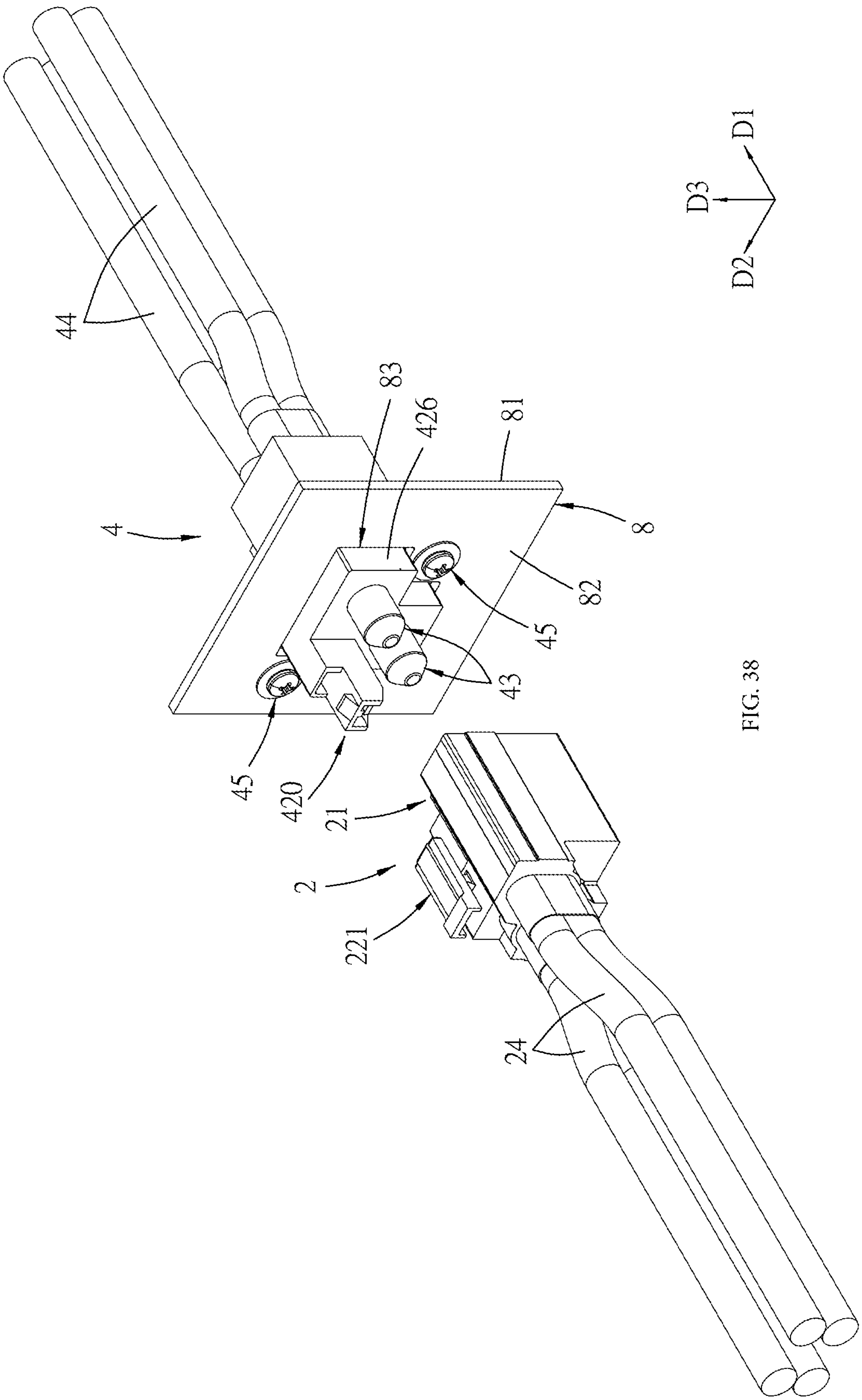
FIG. 38 is a perspective exploded view of a seventh embodiment of the electrical connection device of the present disclosure.
Figure 39:
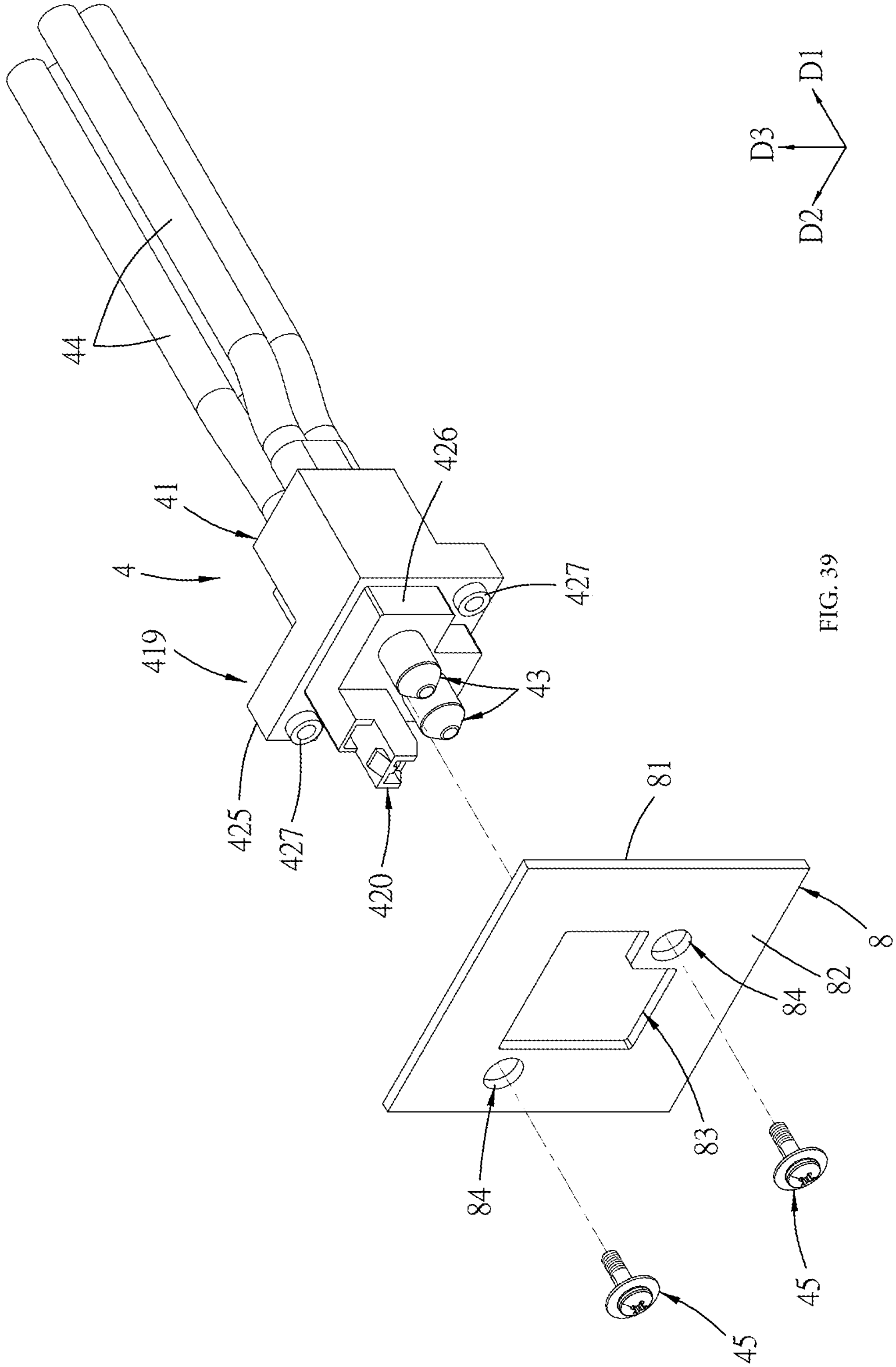
FIG. 39 is a perspective exploded view of a panel and the second connector of the seventh embodiment.

Referring to FIG. 38 and FIG. 39, a seventh embodiment of the electrical connection device 100 of the present disclosure is substantially the same as the first and fifth embodiments in entire structure, difference lies in the second connector 4 which is configured to cooperate with the first connector 2 as shown in FIG. 31.

The electrical connection device 100 further includes a panel 8. The panel 8 has a front face 81 which is toward the rear, a back face 82 which is toward the front and is opposite to the front face 81, and a panel foolproof portion 83. In the seventh embodiment, the panel foolproof portion 83 is a penetrating hole which extends between the front face 81 and the back face 82. A shape of the penetrating hole is an asymmetric shape, the shape of the penetrating hole for example is a multilateral shape which is asymmetric with respect to both the second direction D2 and the third direction D3. The panel 8 is formed with two engaging portions 84 which are obliquely arranged, the two engaging portions 84 are respectively adjacent to a lower right of the panel 8 and an upper left of the panel 8 so as to be diagonally provided to the panel 8. In the seventh embodiment, each engaging portion 84 is a circular through hole which extends between the front face 81 and the back face 82.

The second connector 4 is a panel-end connector which is provided to the panel 8 and is used to mate with the first connector 2. The second housing body 419 of the second connector 4 has a mounting plate 425 which abuts against the front face 81 of the panel 8, a housing foolproof portion 426 which is provided to the mounting plate 425, and two mounting portions 427 which is provided to the mounting plate 425. The housing foolproof portion 426 is used to cooperate with the panel foolproof portion 83, so as to prevent the second insulative outer housing 41 from being wrongly reversely assembled to the panel 8. In the seventh embodiment, the housing foolproof portion 426 is a housing body which protrudes from a rear end of the mounting plate 425, the housing foolproof portion 426 is provided to the panel foolproof portion 83 and partially protrudes from the panel 8. The shape of the housing body in the two-dimensional plane is an asymmetric shape, the shape of the housing body for example is a multilateral shape which is asymmetric with respect to both the second direction D2 and the third direction D3. One mounting portion 427 of the two mounting portions 427 and the two second terminals 43 are in form of triangular arrangement and is transversely arranged at an outer side of the second locking structure 420, the other mounting portion 427 of the two mounting portions 427 and the two second terminals 43 are in form of triangular arrangement, and the other mounting portion 427 of the two mounting portions 427 and the second locking structure 420 are obliquely arranged. In the seventh embodiment, each mounting portion 427 is a protruding ring which protrudes from the rear end of the mounting plate 425 and is received in the corresponding engaging portion 84. A hole edge of each engaging portion 84 is spaced apart from an outer circumferential edge of the corresponding mounting portion 427, each mounting portion 427 is capable of floating in the two-dimensional plane in the corresponding engaging portion 84.

Each second fastening assembly 45 is provided to the corresponding mounting portion 427, the mounting plate 425 and the panel 8, so as to make the panel 8 and the second housing body 419 securely engaged together.

The electrical connection device 100 of the seventh embodiment provides a technical solution that the cable-end connector having the locking structure and the panel-end connector having the locking structure mate with each other, so that the electrical connection device 100 of the seventh embodiment can be applied in the circumstance having the aforementioned need.

Figure 40:
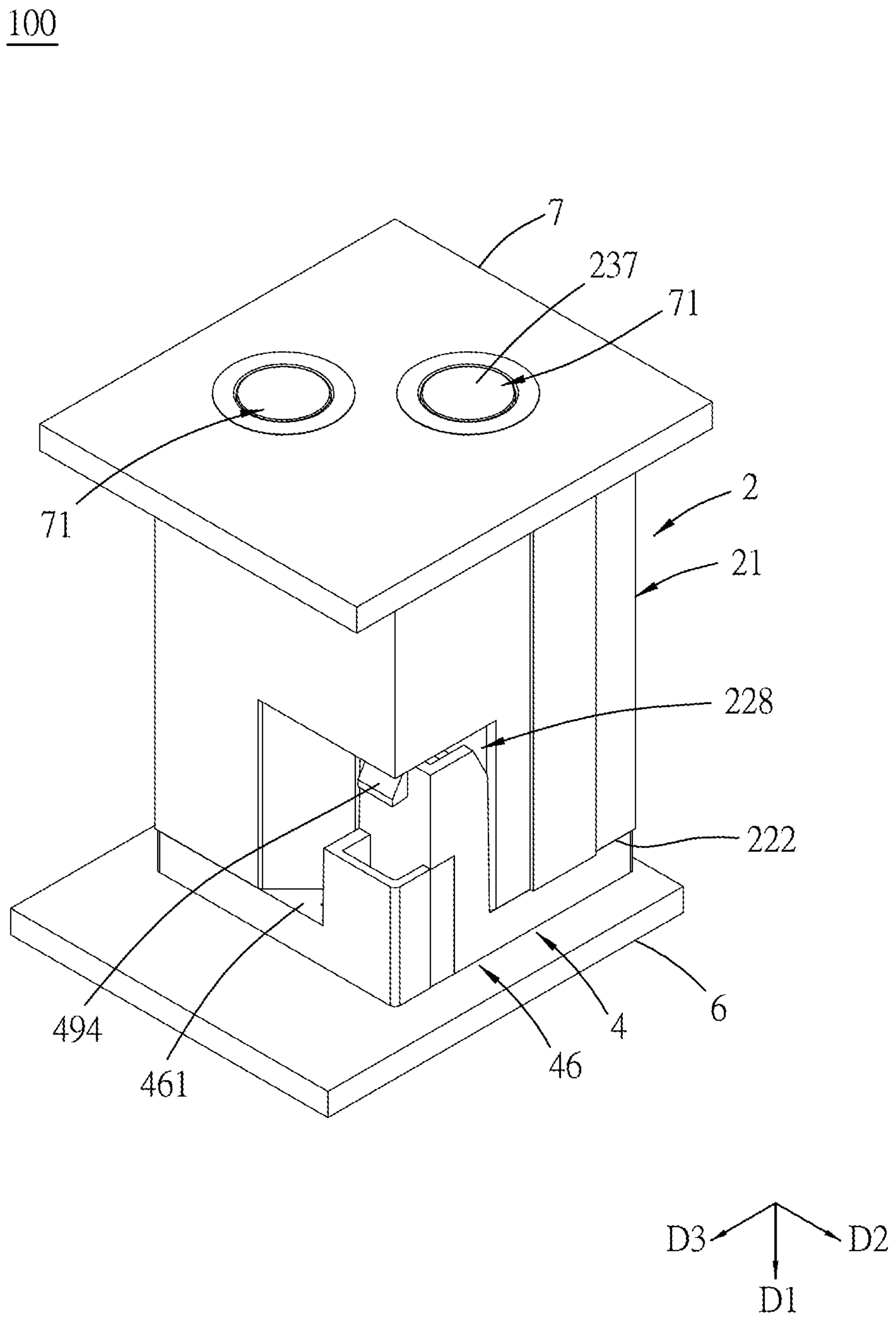
FIG. 40 is a perspective view of an eighth embodiment of the electrical connection device of the present disclosure.

Referring to FIG. 40, an eighth embodiment of the electrical connection device 100 of the present disclosure is substantially the same as the second and fifth embodiments, difference lies in the first connector 2 and the second connector 4.

Referring to FIG. 41, FIG. 42, FIG. 43, FIG. 44 and FIG. 45, the first connector 2 is a straight board-end connector. The first insulative outer housing 21 of the first connector 2 is formed with two perforations 227 which extend between the first mating face 222 and the first back face 223 and are in form of oblique arrangement and an avoiding recessed groove 228 which is recessed in a direction from the first mating face 222 toward the first back face 223. The avoiding recessed groove 228 and the two perforations 227 are in form of triangular arrangement. The two first terminals 23 respectively provided to the two perforations 227, so that the two first terminals 23 are diagonally provided to the first insulative outer housing 21 and the two first terminals 23 and the avoiding recessed groove 228 are in form of triangular arrangement. The cover body 234 of each first terminal 23 is caught to the first insulative outer housing 21 by interference fit manner and in turn is retained to the corresponding perforation 227. The cover body 234 of each first terminal 23 has a soldering portion 237 which protrudes from the first back face 223 of the first insulative outer housing 21.

The electrical connection device 100 further includes a first circuit board 7. The first circuit board 7 is in form of rectangular plate shape and is formed with two soldering holes 71 which are obliquely arranged and are diagonally provided. The soldering portion 237 of each first terminal 23 is provided to the corresponding soldering hole 71 and is soldered to the corresponding soldering hole 71 by a solder, so that the first terminal 23 is electrically connected to the first circuit board 7.

Figure 41:
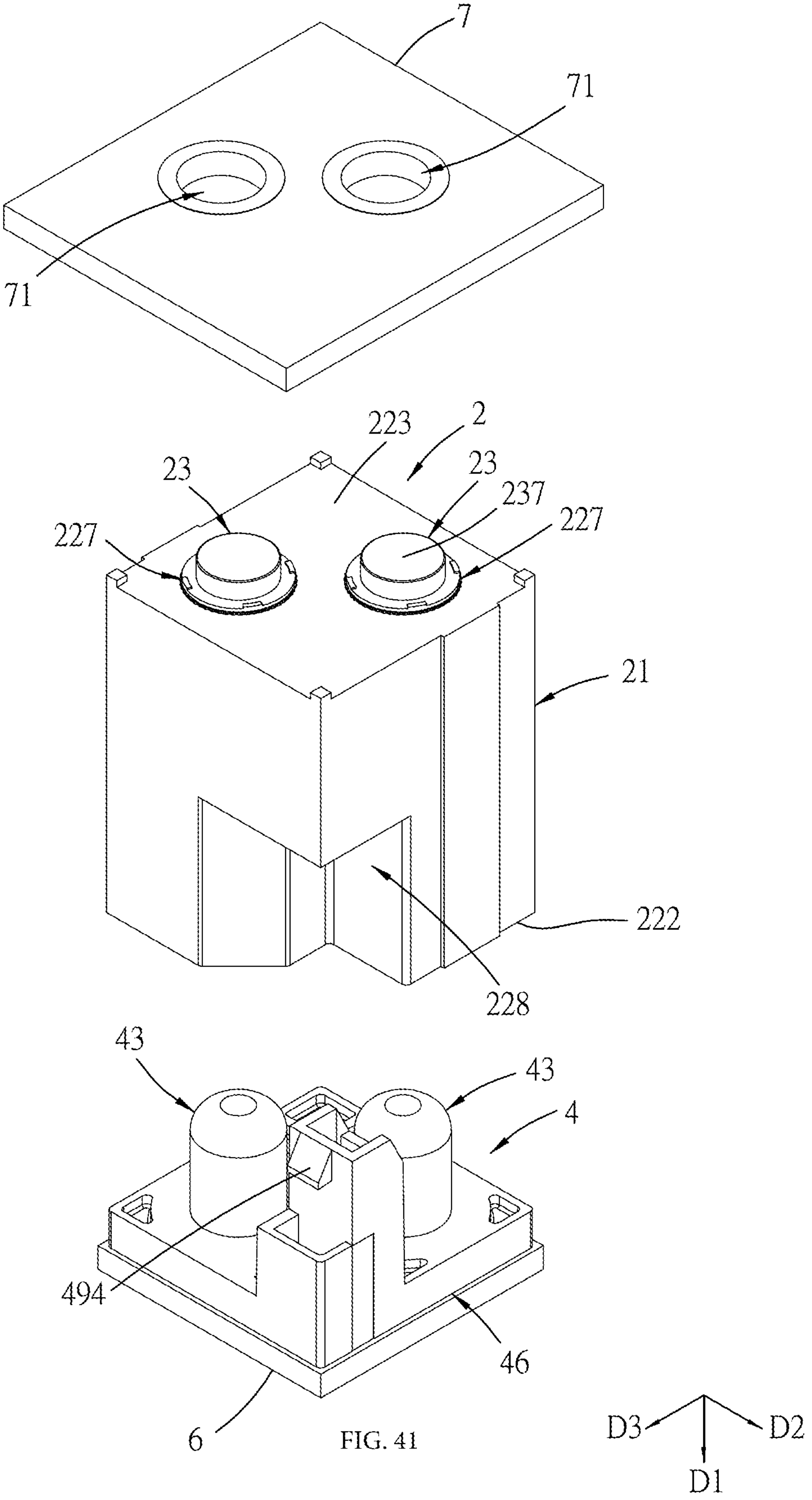
FIG. 41 is a perspective exploded view of the eighth embodiment.
Figure 42:
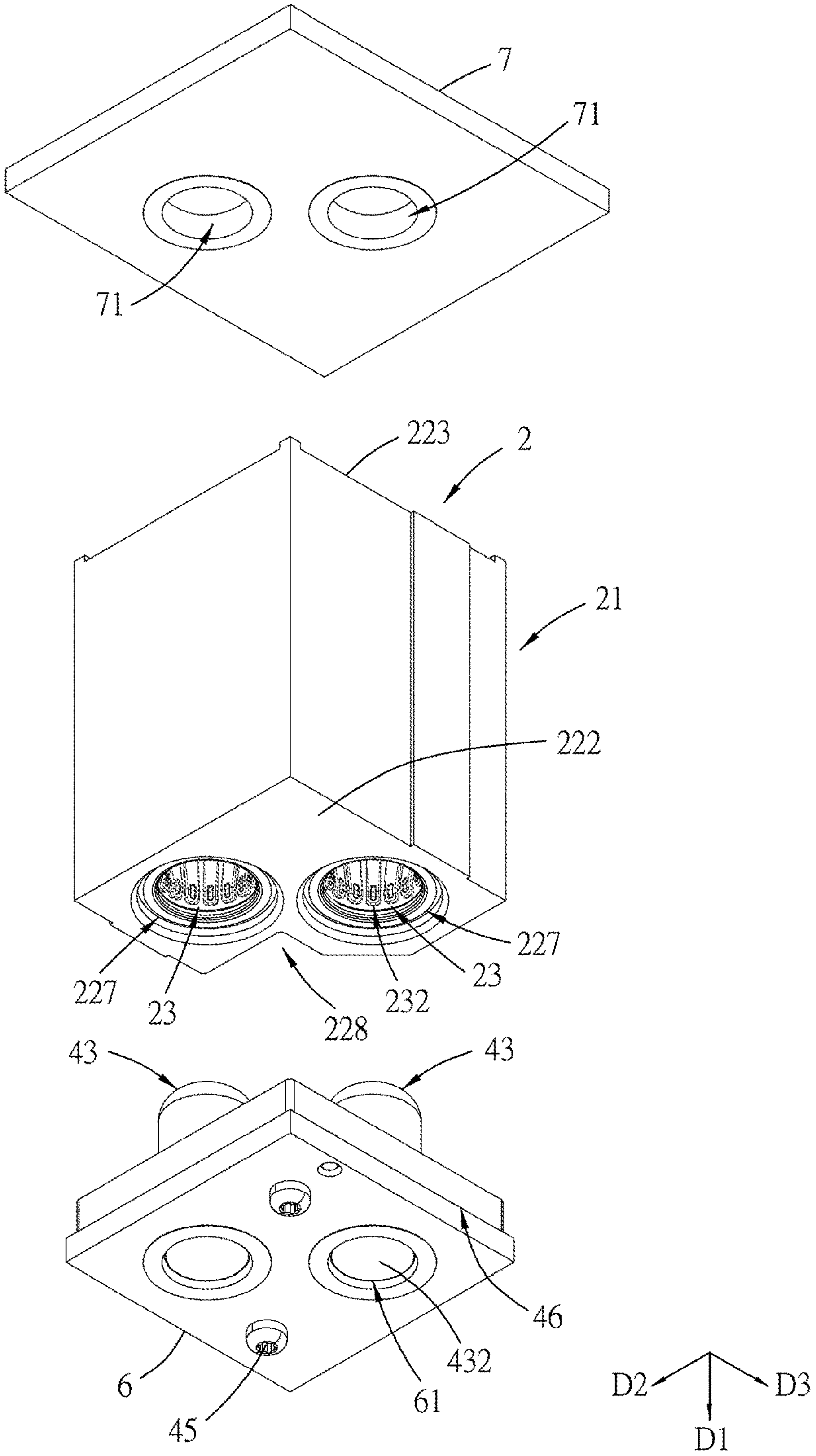
FIG. 42 is a perspective exploded view of the eighth embodiment viewed from another angle.
Figure 43:
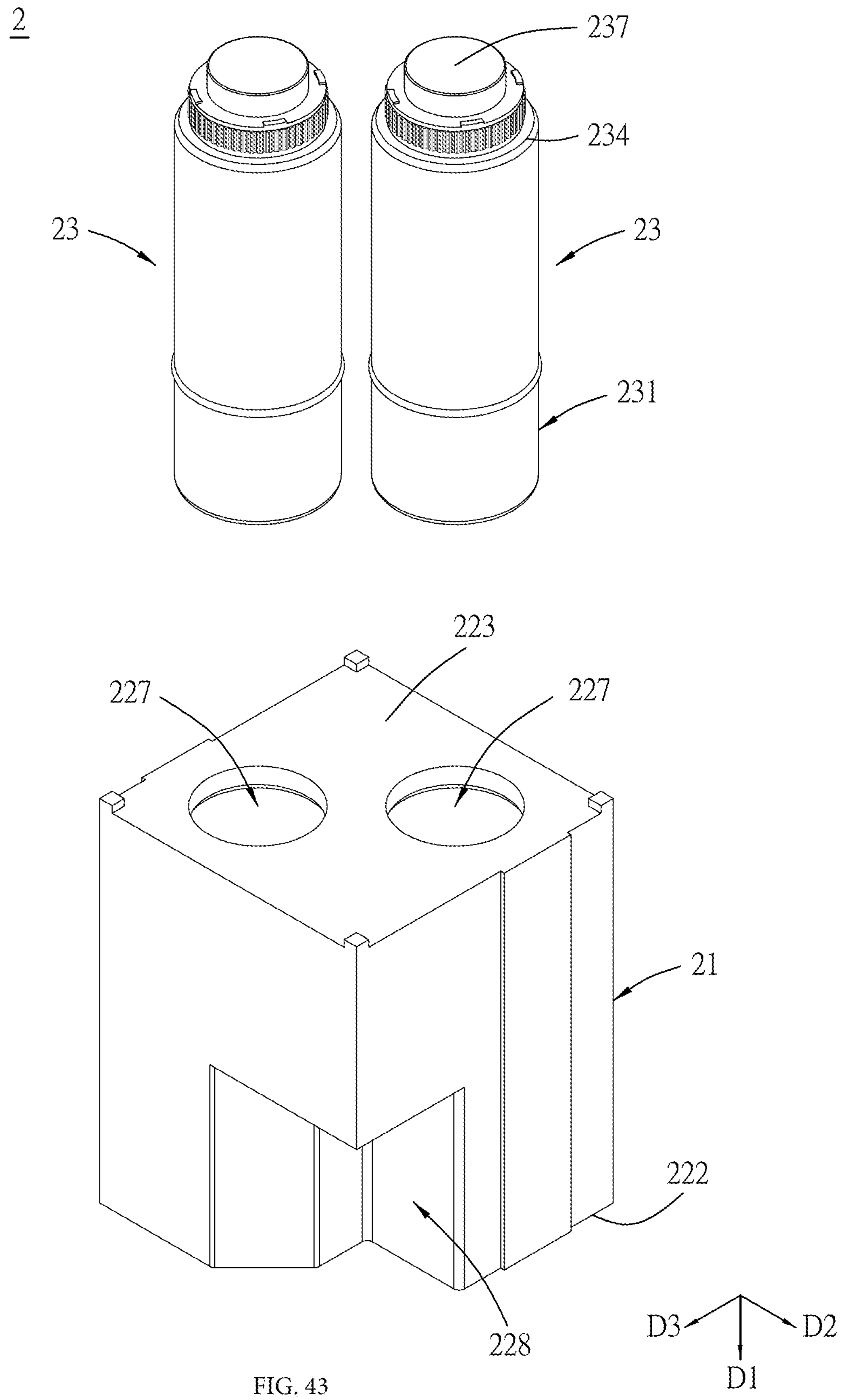
FIG. 43 is a perspective exploded view of the first connector of the eighth embodiment.
Figure 44:
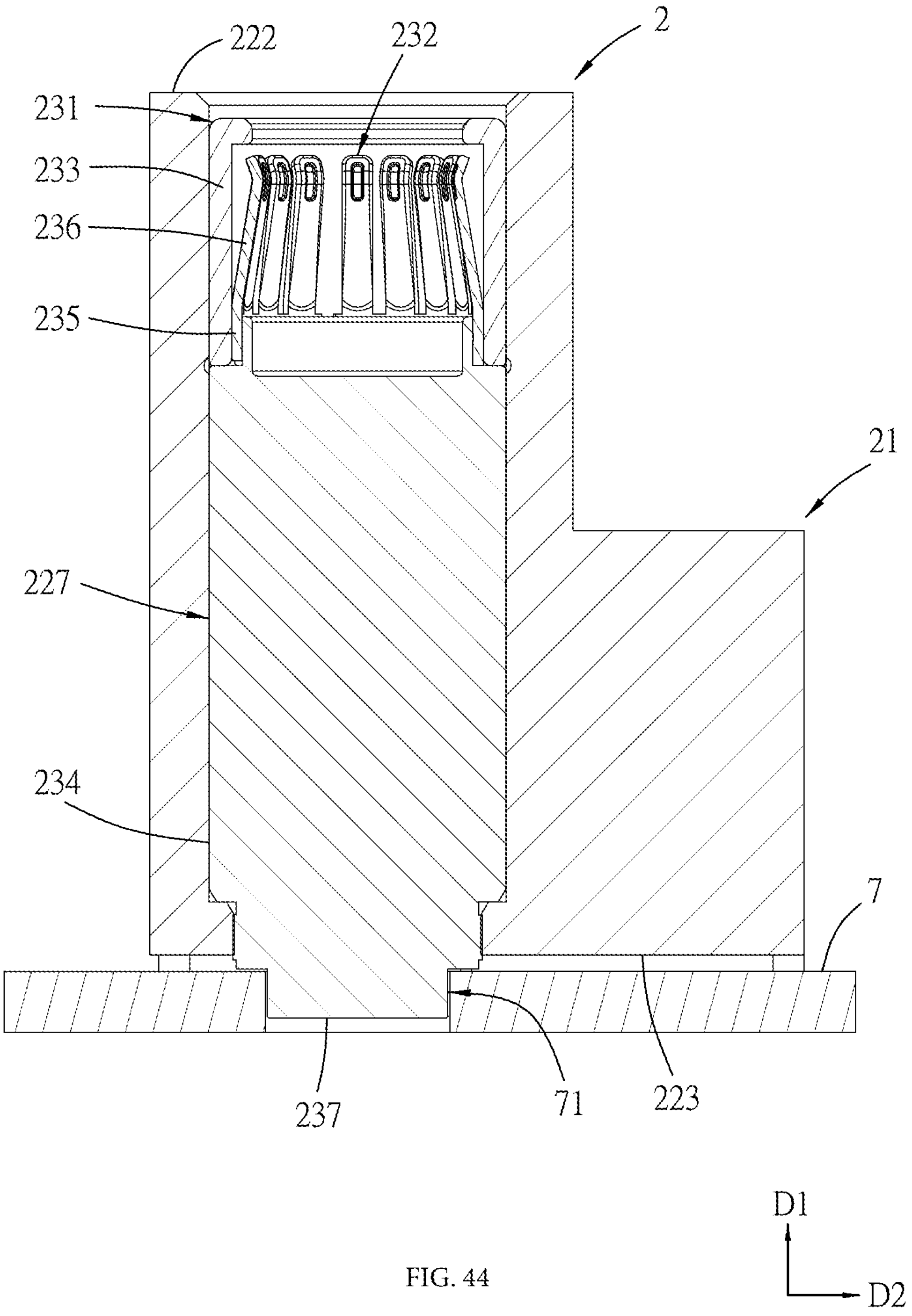
FIG. 44 is a cross sectional view of the first connector and a first circuit board of the eighth embodiment.
Figure 45:
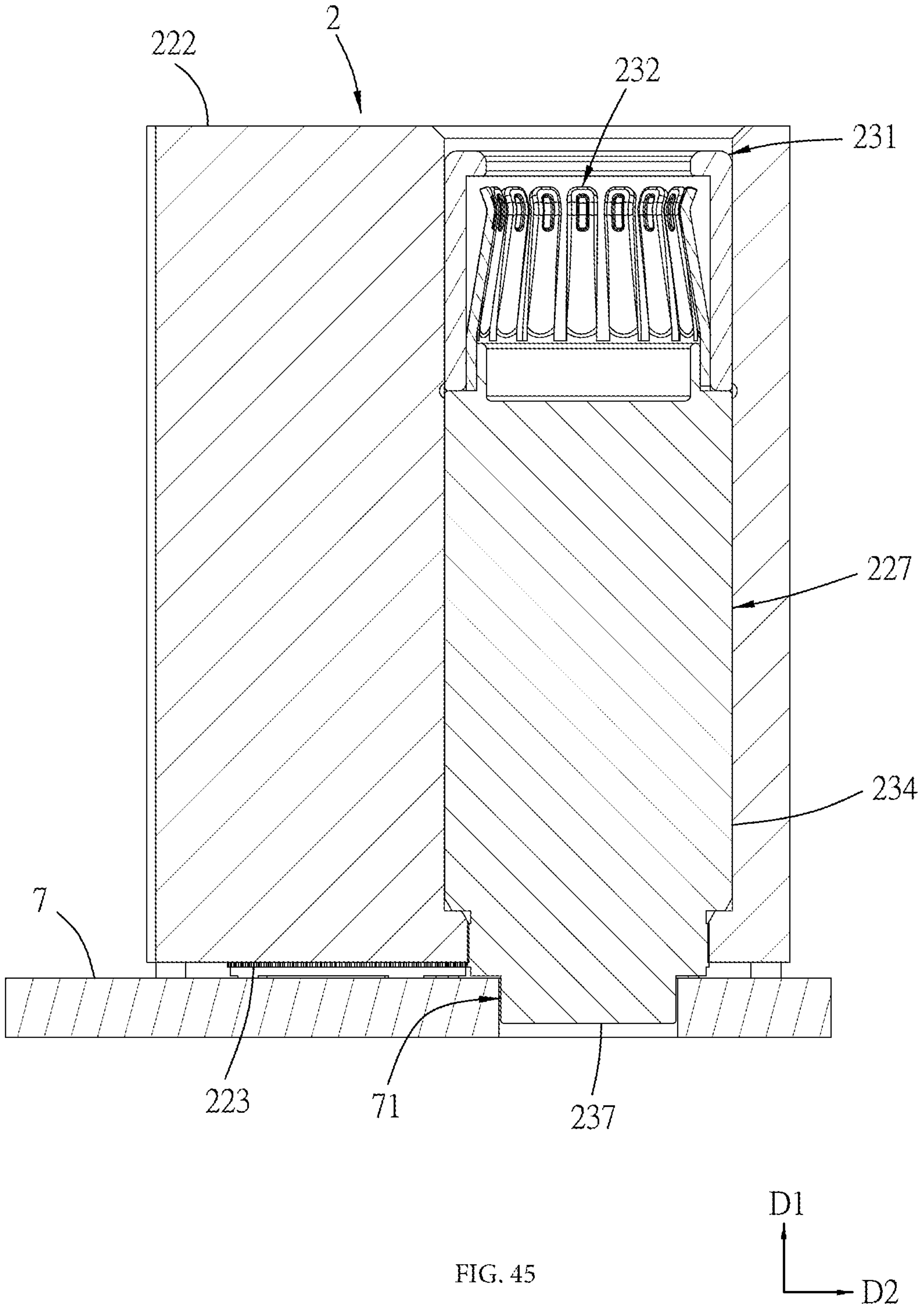
FIG. 45 is a cross sectional view of the first connector and the first circuit board of the eighth embodiment.
Figure 46:
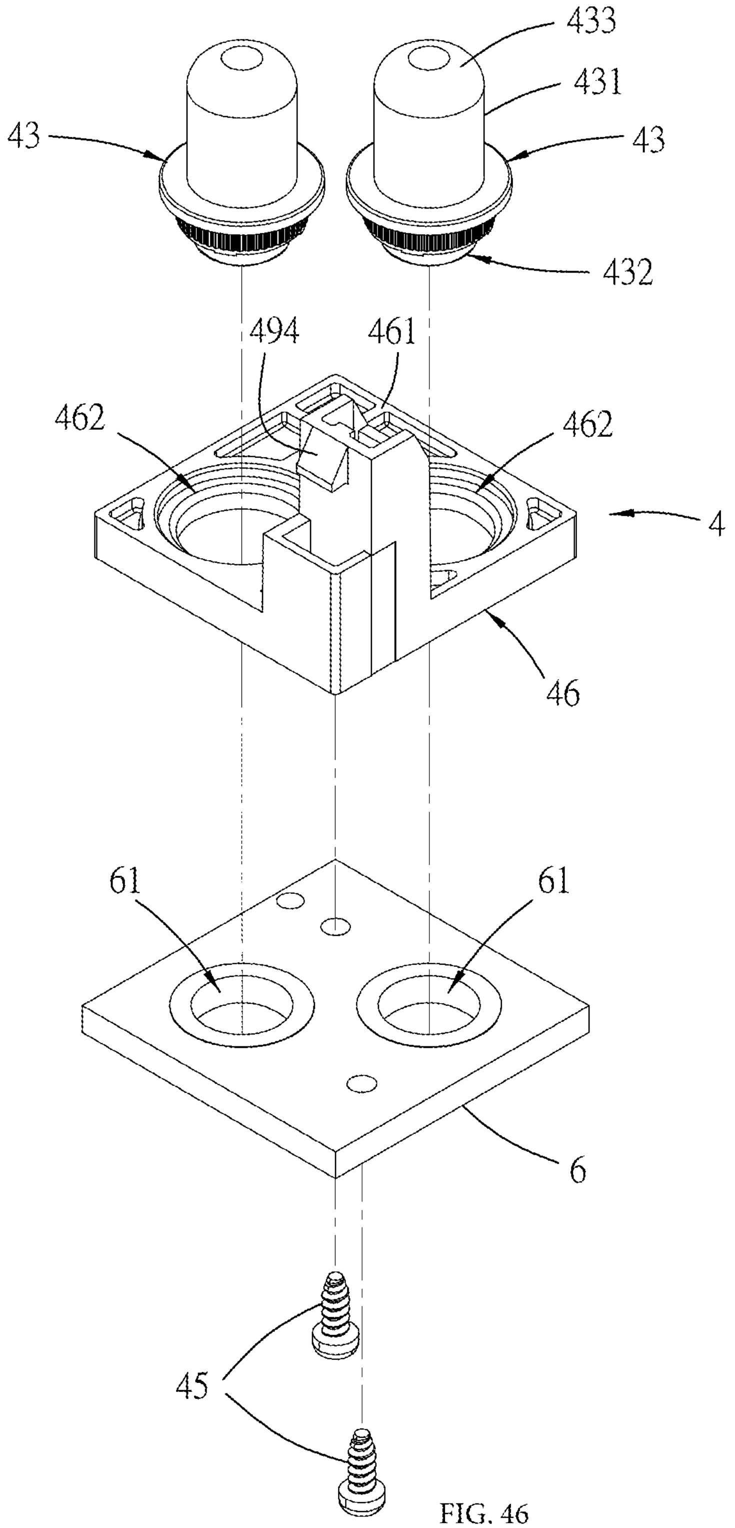
FIG. 46 is a perspective exploded view of the second connector of the eighth embodiment.

Referring to FIG. 40, FIG. 41 and FIG. 46, the second connector 4 is a straight board-end connector, the second insulative outer housing of the second connector 4 is an insulative base 46. A structure of the insulative base 46 is similar to the structure of the insulative base 46 of the second connector 4 of the second embodiment, difference lies in that the insulative base 46 of the second connector 4 of the eighth embodiment further has a locking structure 494 which protrudes from the second mating face 461. The locking structure 494 and the two second terminals 43 are in form of triangular arrangement, and the locking structure 494 is used to be received in the avoiding recessed groove 228 of the first connector 2. The circuit board 6 is a second circuit board which allows the insulative base 46 of the second connector 4 to be provided thereto, the circuit board 6 is electrically connected with the two second terminals 43. When the first connector 2 and the second connector 4 mate with each other, the locking structure 494 is received in the avoiding recessed groove 228, which can prevent the locking structure 494 from colliding the first insulative outer housing 21 to cause that the first connector 2 and the second connector 4 cannot mate with each other.

The electrical connection device 100 of the eighth embodiment provides a technical solution that the two straight board-end connectors mate with each other, so that the electrical connection device 100 of the eighth embodiment can be applied in the circumstance having the aforementioned need.

Figure 47:
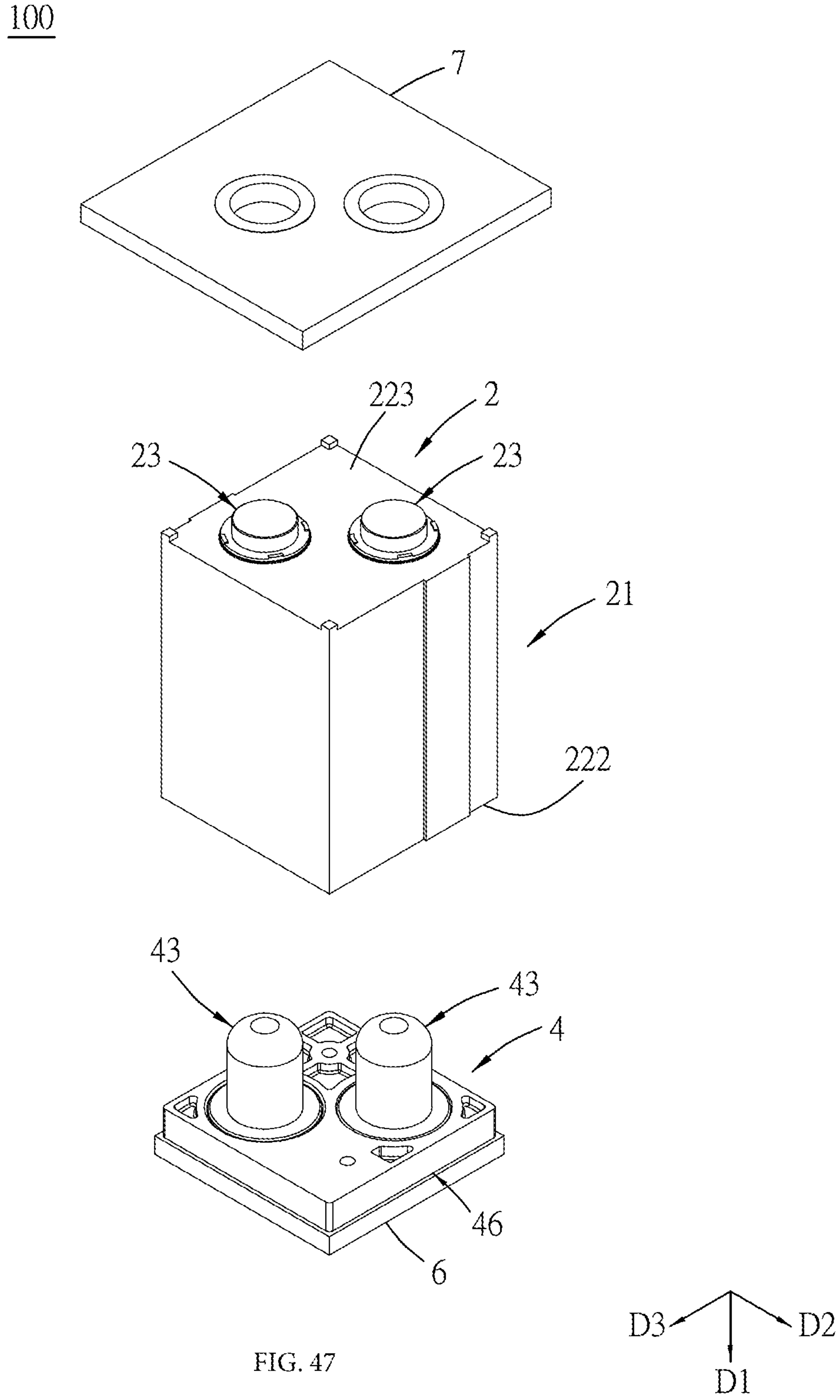
FIG. 47 is a perspective exploded view of a ninth embodiment of the electrical connection device of the present disclosure.

Referring to FIG. 47, a ninth embodiment of the electrical connection device 100 of the present disclosure is substantially the same as the second and eighth embodiments in entire structure, difference lies in the first connector 2 and the second connector 4.

A structure of the second connector 4 is the same as the second connector 4 of the second embodiment and does not have the locking structure 494 as shown in FIG. 41. Therefore, the first insulative outer housing 21 of the first connector 2 does not need provide the avoiding recessed groove 228 as shown in FIG. 41 which allows the locking structure 494 to be received therein.

Figure 48:
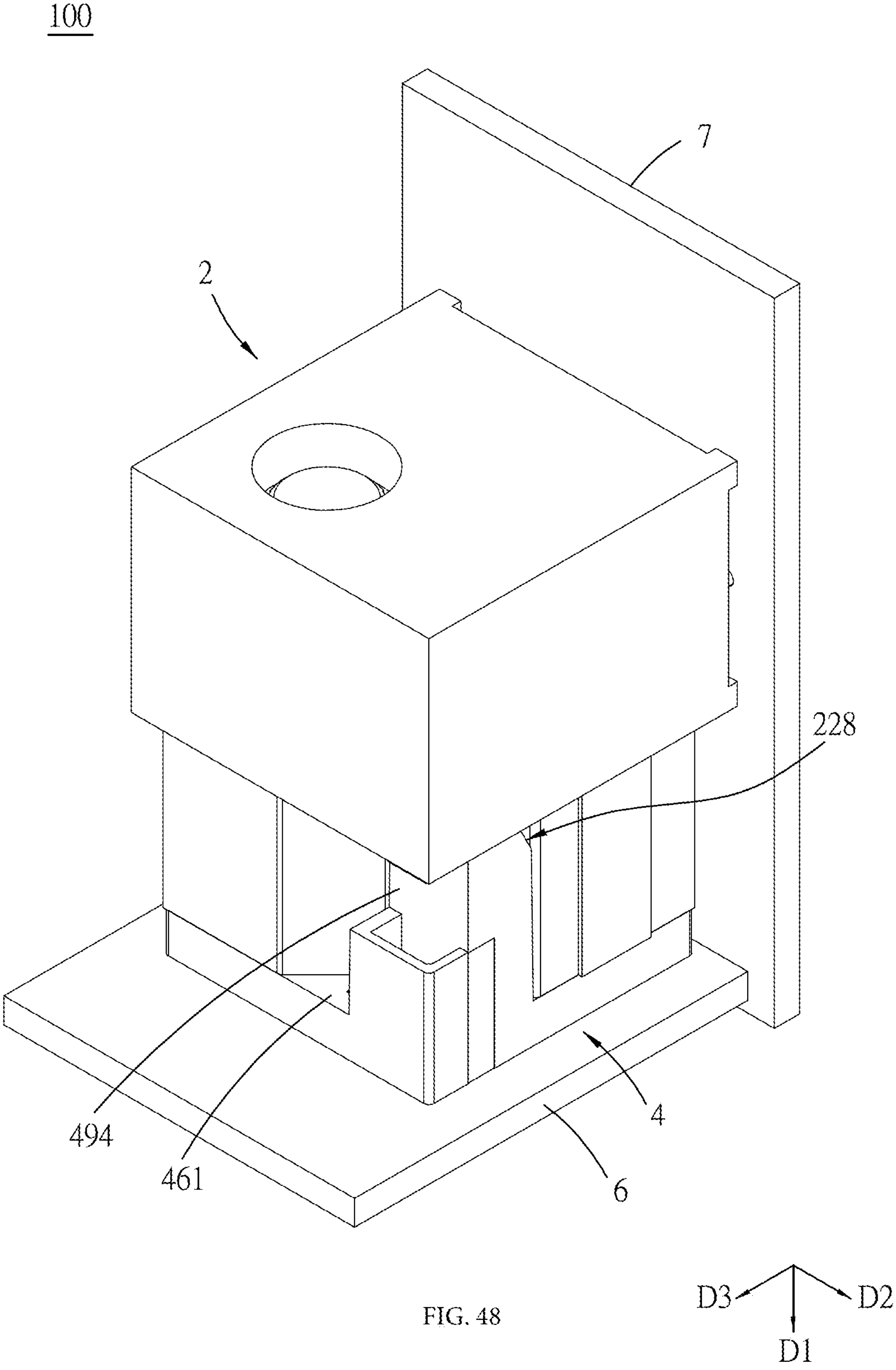
FIG. 48 is a perspective view of a tenth embodiment of the electrical connection device of the present disclosure.

Referring to FIG. 48, a tenth embodiment of the electrical connection device 100 of the present disclosure is substantially the same as the eighth embodiment in entire structure, difference lies in that the first connector 2 and the first circuit board 7. The first connector 2 and the first circuit board 7 are respectively similar to the second connector 4 and the circuit board 6 of the third embodiment in structure.

Referring to FIG. 49, FIG. 50, FIG. 51 and FIG. 52, the first circuit board 7 is positioned in a two-dimensional plane constituted together by the first direction D1 and the second direction D2. The first connector 2 is a right-angle board-end connector which is provided to the first circuit board 7. The first insulative outer housing 21 is formed with a first inserting groove 261, a second inserting groove 262, a first terminal groove 263 and a second terminal groove 264. The first inserting groove 261 and the second inserting groove 262 are arranged and front and rear spaced apart from each other along the first direction D1 and are different from each other in shape. The first terminal groove 263 and the second terminal groove 264 are obliquely arranged and are diagonally provided to the first mating face 222. The first terminal groove 263 and the second terminal groove 264 respectively allow the first terminals to insert therein.

The first connector 2 further includes a first adapting plate 271 and a second adapting plate 272. The first adapting plate 271 and the second adapting plate 272 respectively insert into the first inserting groove 261 and the second inserting groove 262 and are arranged and spaced apart from each other along the first direction D1. The first adapting plate 271 and the second adapting plate 272 are electrically connected to the first circuit board 7 and respectively are electrically connected to the first terminals. The first adapting plate 271 is different from the second adapting plate 272 in shape, the first adapting plate 271 is constructed to be only the same as the first inserting groove 261 in shape so that the first adapting plate 271 is capable of inserting into the first inserting groove 261, the second adapting plate 272 is constructed to be only the same as the second inserting groove 262 in shape so that the second adapting plate 272 is capable of inserting into the second inserting groove 262. Therefore, a foolproof mechanism can be provided to prevent each of the first adapting plate 271 and the second adapting plate 272 from wrongly inserting into another inserting groove.

Referring to FIG. 50, FIG. 51, FIG. 52, FIG. 53 and FIG. 54, the number of the soldering holes 71 of the first circuit board 7 is for example but is not limited to ten. The soldering holes 71 are in form of array arrangement. The first inserting groove 261 and the second inserting groove 262 are positioned between the first mating face 222 and the first back face 223 and are respectively adjacent to the first mating face 222 and the first back face 223. The first inserting groove 261 and the second inserting groove 262 each have a first groove portion 265 which is arranged along the second direction D2 and a second groove portion 266 which is communicated to a right side of the first groove portion 265. The first groove portion 265 and the second groove portion 266 are respectively adjacent to a left side and a right side of the first insulative outer housing 21. A length of the second groove portion 266 taken along the third direction D3 is larger than a length of the first groove portion 265 taken along the third direction D3. Here, a length of the first groove portion 265 of the first inserting groove 261 taken along the second direction D2 and a length of the first groove portion 265 of the second inserting groove 262 taken along the second direction D2 are not the same, and the length of the first groove portion 265 of the first inserting groove 261 taken along the third direction D3 and the length of the first groove portion 265 of the second inserting groove 262 taken along the third direction D3 are not the same. The length of the second groove portion 266 of the first inserting groove 261 taken along the third direction D3 and the length of the second groove portion 266 of the second inserting groove 262 taken along the third direction D3 are the same.

More specifically, the lengths of the first groove portions 265 of the first inserting groove 261 and the second inserting groove 262 taken along the second direction D2 gradually decrease in the first direction D1 from the first mating face 222 toward the first back face 223, and the lengths of the first groove portions 265 of the first inserting groove 261 and the second inserting groove 262 taken along the third direction D3 gradually decrease in the first direction D1 from the first mating face 222 toward the first back face 223. That is to say, the length of the first groove portion 265 of the first inserting groove 261 taken along the second direction D2 is larger than the length of the first groove portion 265 of the second inserting groove 262 taken along the second direction D2. The length of the first groove portion 265 of the first inserting groove 261 taken along the third direction D3 is larger than the length of the first groove portion 265 of the second inserting groove 262 taken along the third direction D3.

The first terminal groove 263 is adjacent to a lower left of the first insulative outer housing 21 and is communicated to the first inserting groove 261. The second terminal groove 264 is adjacent to an upper right of the first insulative outer housing 21 and is communicated to the first inserting groove 261 and the second inserting groove 262.

The first adapting plate 271 and the second adapting plate 272 each have a first plate body 273 which is arranged along the second direction D2 and a second plate body 274 which is connected to a right side of the first plate body 273, and a plurality of soldering legs 275 which protrude from a bottom end of each of the first plate body 273 and the second plate body 274. A length of the second plate body 274 taken along the third direction D3 is larger than a length of the first plate body 273 taken along the third direction D3. Here, a length of the first plate body 273 of the first adapting plate 271 taken along the second direction D2 and a length of the first plate body 273 of the second adapting plate 272 taken along the second direction D2 are not the same, and the length of the first plate body 273 of the first adapting plate 271 taken along the third direction D3 and the length of the first plate body 273 of the second adapting plate 272 taken along the third direction D3 are not the same. The length of the second plate body 274 of the first adapting plate 271 taken along the third direction D3 and the length of the second plate body 274 of the second adapting plate 272 taken along the third direction D3 are the same.

More specifically, the lengths of the first plate bodies 273 of the first adapting plate 271 and the second adapting plate 272 taken along the second direction D2 gradually decrease in the first direction D1 from the first mating face 222 toward the first back face 223, and the lengths of the first plate bodies 273 of the first adapting plate 271 and the second adapting plate 272 taken along the third direction D3 gradually decrease in the first direction D1 from the first mating face 222 toward the first back face 223. That is to say, the length of the first plate body 273 of the first adapting plate 271 taken along the second direction D2 is larger than the length of the first plate body 273 of the second adapting plate 272 taken along the second direction D2. The length of the first plate body 273 of the first adapting plate 271 taken along the third direction D3 is larger than the length of the first plate body 273 of the second adapting plate 272 taken along the third direction D3.

Dimensions of the first plate body 273 and the second plate body 274 of the first adapting plate 271 match with a dimension the first inserting groove 261, so that the first plate body 273 and the second plate body 274 of the first adapting plate 271 only can completely insert into the first groove portion 265 and the second groove portion 266 of the first inserting groove 261 respectively, but cannot completely insert into the first groove portion 265 and the second groove portion 266 of the second inserting groove 262 respectively. Dimensions of the first plate body 273 and the second plate body 274 of the second adapting plate 272 match with a dimension of the second inserting groove 262, so that the first plate body 273 and the second plate body 274 of the second adapting plate 272 only can completely insert into the first groove portion 265 and the second groove portion 266 of the second inserting groove 262 respectively, but cannot completely insert into the first groove portion 265 and the second groove portion 266 of the first inserting groove 261 respectively. Therefore, it can prevent the first adapting plate 271 from wrongly inserting into the second inserting groove 262 and the second adapting plate 272 from wrongly inserting into the first inserting groove 261.

Because the length of the second plate body 274 of the first adapting plate 271 taken along the third direction D3 and the length of the second plate body 274 of the second adapting plate 272 taken along the third direction D3 are the same, before an assembling personnel assembles the first adapting plate 271 and the second adapting plate 272 to the first insulative outer housing 21, the assembling personnel can first adjust the second plate body 274 of the first adapting plate 271 and the second plate body 274 of the second adapting plate 272 to be positioned to the same side. Moreover, the lengths of the first plate bodies 273 of the first adapting plate 271 and the second adapting plate 272 taken along the second direction D2 gradually decrease in the first direction D1 from the first mating face 222 toward the first back face 223, and the lengths of the first plate bodies 273 of the first adapting plate 271 and the second adapting plate 272 taken along the third direction D3 gradually decrease in the first direction D1 from the first mating face 222 toward the first back face 223, as such can the first plate body 273 and the second adapting plate 272 smoothly insert into the first inserting groove 261 and the second inserting groove 262 respectively, therefore, after the assembling personnel adjusts the second plate body 274 of the first adapting plate 271 and the second plate body 274 of the second adapting plate 272 to be positioned to the same side, the assembling personnel may arrange the first adapting plate 271 and the second adapting plate 272 from front to rear along the first direction D1 according to the aforementioned manner, and then can insert the first adapting plate 271 and the second adapting plate 272 into the first inserting groove 261 and the second inserting groove 262 respectively. Therefore, convenience of the operation that the first adapting plate 271 and the second adapting plate 272 are assembled to the first insulative outer housing 21 can be promoted.

The plurality of soldering legs 275 are arranged and spaced apart from each other along the second direction D2. Each soldering leg 275 is provided to the corresponding soldering hole 71 and is soldered to the corresponding soldering hole 71 by a solder, so that the first adapting plate 271 and the second adapting plate 272 are electrically connected to the first circuit board 7.

The first adapting plate 271 is formed with a first retaining hole 276 which corresponds to the first terminal groove 263 and a first through hole 277 which corresponds to the second terminal groove 264. The second adapting plate 272 is formed with a second retaining hole 278 which corresponds to the second terminal groove 264 and the first through hole 277. A hole diameter of the second retaining hole 278 is smaller than a hole diameter of the first through hole 277.

The first terminals are respectively a first female terminal 28 and a second female terminal 29. The first female terminal 28 and the second female terminal 29 each are in form of post shape and extend along the first direction D1 and respectively insert into the first terminal groove 263 and the second terminal groove 264. The first female terminal 28 and the second female terminal 29 each have the connecting member 231, the contacting member 232, the cover body 234, and an inserting post 281, 291 which is connected to the cover body 234 and extends along the first direction D1. The inserting post 281 of the first female terminal 28 has a first positioning segment 282 which extends from a rear end of the cover body 234 and a first retaining segment 283 which extends from a rear end of the first positioning segment 282. The first positioning segment 282 inserts into the first terminal groove 263. An outer diameter of the first positioning segment 282 is larger than an outer diameter of the first retaining segment 283. The first positioning segment 282 is stopped to the first adapting plate 271, and is used to limit an inserting depth of the first female terminal 28. The first retaining segment 283 is provided to the first retaining hole 276 and is retained to the first retaining hole 276. The first retaining segment 283 is caught to the first adapting plate 271 by interference fit manner and in turn is retained to the first retaining hole 276.

A length of the second female terminal 29 extending along the first direction D1 is larger than a length of the first female terminal 28 extending along the first direction D1. The inserting post 291 of the second female terminal 29 has a second positioning segment 292 which extends from the rear end of the cover body 234 and a second retaining segment 293 which extends from a rear end of the second positioning segment 292. The second positioning segment 292 inserts into the second terminal groove 264 and passes through the first adapting plate 271 of the first through hole 277. An outer diameter of the second positioning segment 292 is larger than an outer diameter of the second retaining segment 293. The second positioning segment 292 is stopped to the second adapting plate 272, and is used to limit an inserting depth of the second female terminal 29. The second retaining segment 293 is provided to the second retaining hole 278 and is retained to the second retaining hole 278. The second retaining segment 293 is caught to the second adapting plate 272 by interference fit manner and in turn is retained to the second retaining hole 278.

In order to avoid the second positioning segment 292 contacting the first adapting plate 271 to be electrically connected with the first adapting plate 271, an outer circumferential surface of the second positioning segment 292 is radially recessed to form an annular avoiding groove 294, the annular avoiding groove 294 corresponds to the first through hole 277 in position, therefore, it can avoid the second positioning segment 292 contacting the first adapting plate 271.

The electrical connection device 100 of the tenth embodiment provides a technical solution that the right-angle board-end connector and the straight board-end connector mate with each other, so that the electrical connection device 100 of the tenth embodiment can be applied in the circumstance having the aforementioned need. By that the first female terminal 28 and the second female terminal 29 each are electrically connected to one corresponding adapting plate, the first connector 2 can be applied in low current transmitting circumstance.

Figure 55:
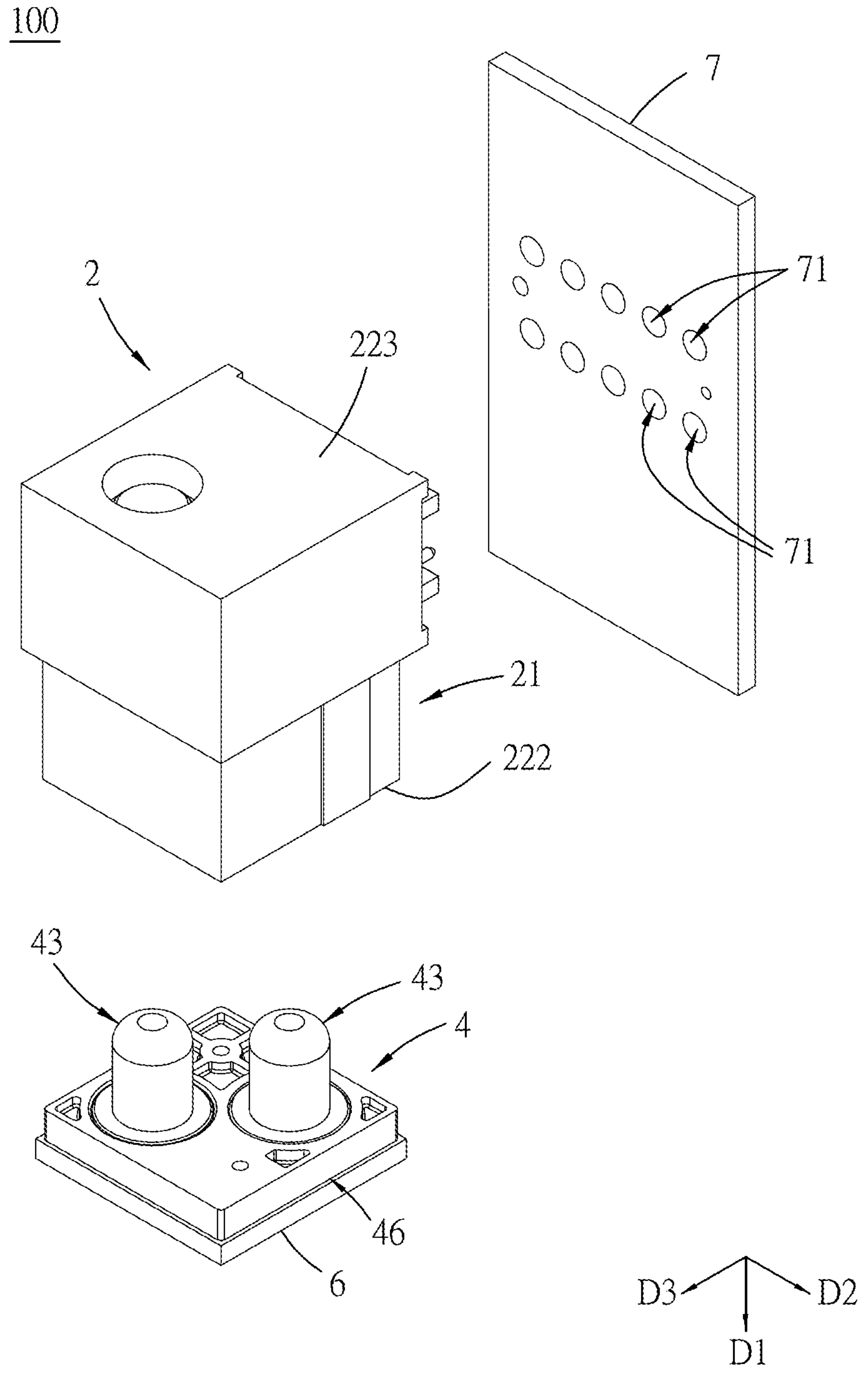
FIG. 55 is a perspective exploded view of an eleventh embodiment of the electrical connection device of the present disclosure.

Referring to FIG. 55, an eleventh embodiment of the electrical connection device 100 of the present disclosure is substantially the same as the second and tenth embodiments in entire structure, difference lies in the first connector 2 and the second connector 4.

Figure 49:
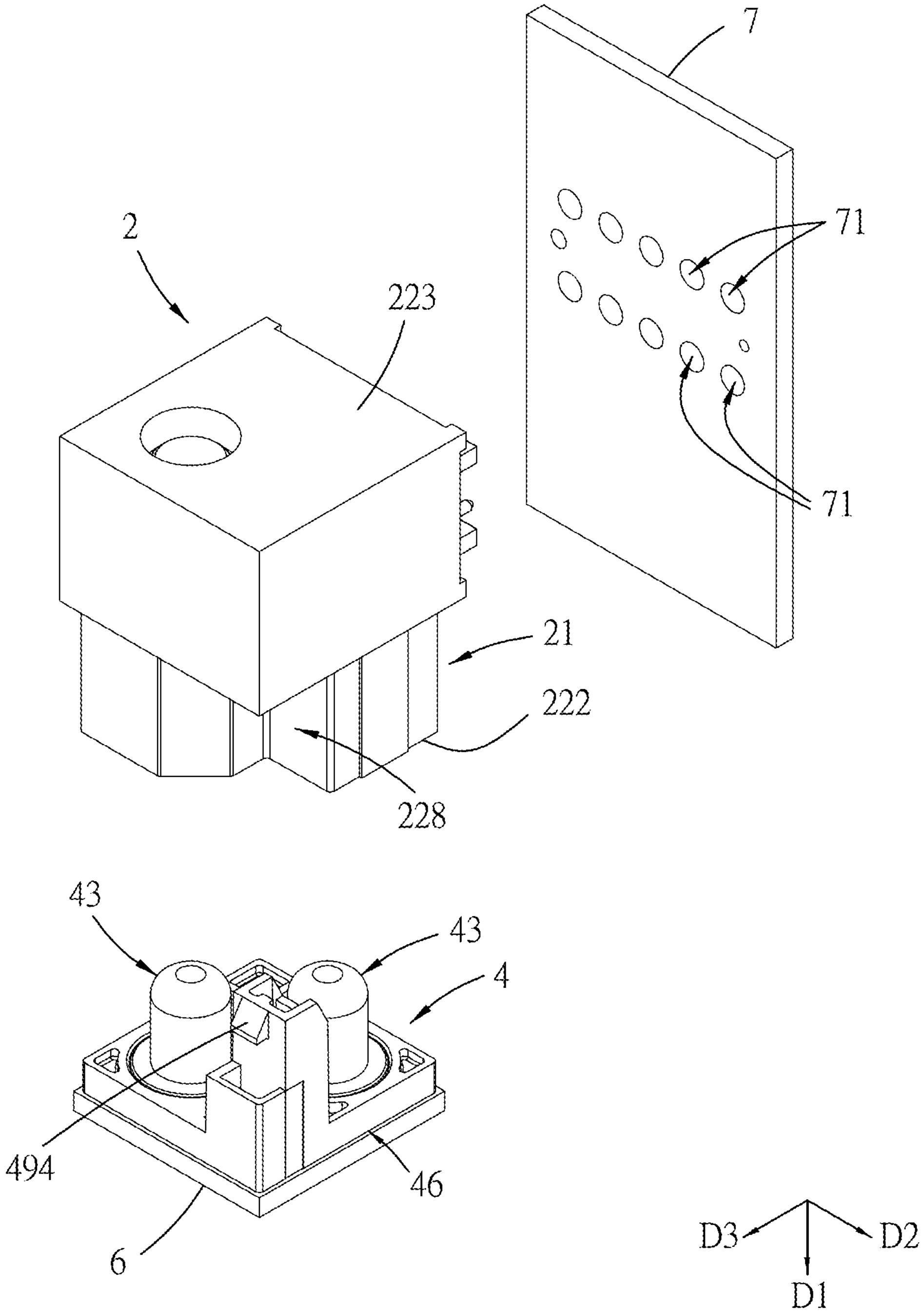
FIG. 49 is a perspective exploded view of the tenth embodiment.
Figure 50:
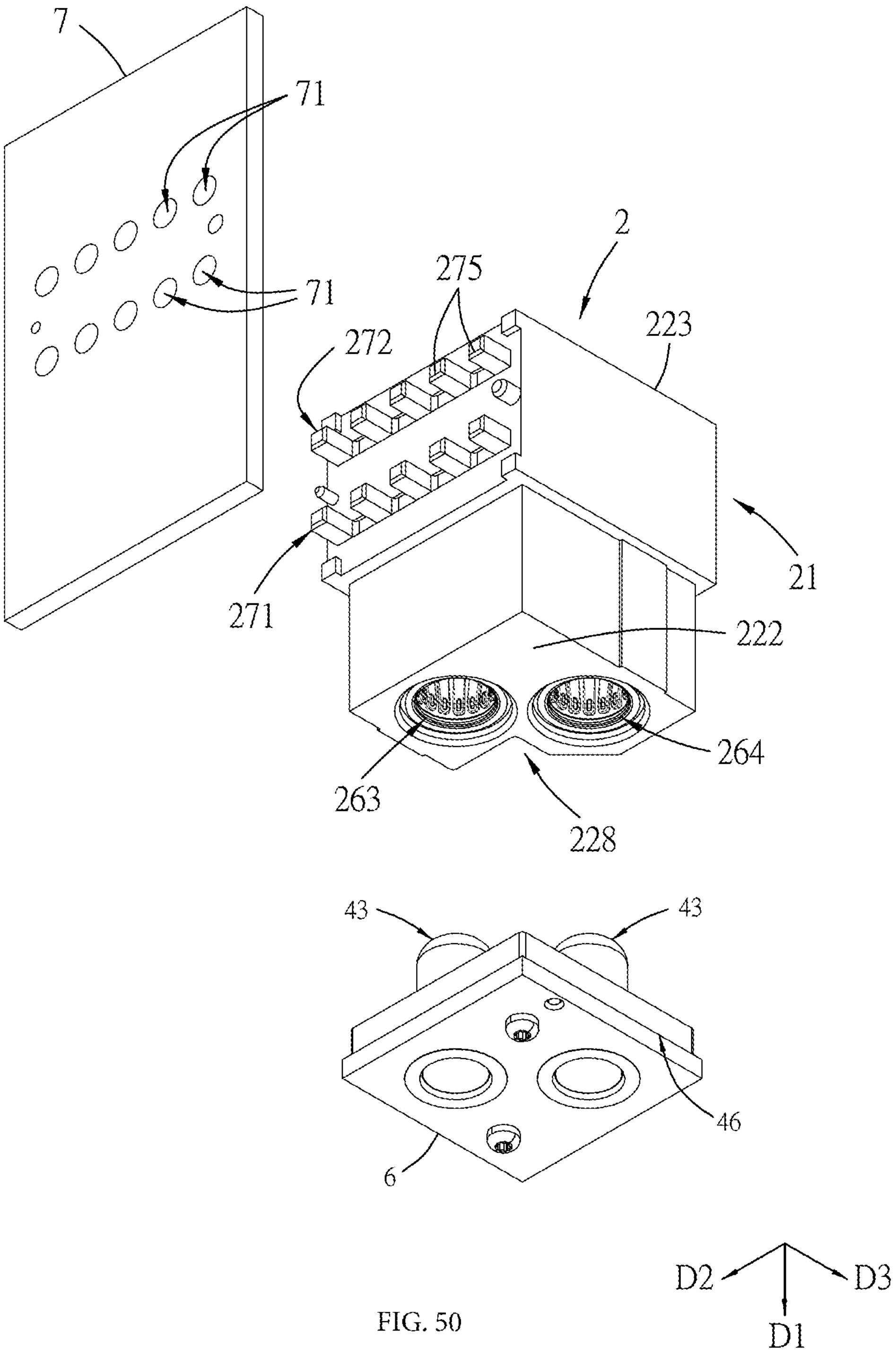
FIG. 50 is a perspective exploded view of the tenth embodiment viewed from another angle.
Figure 51:
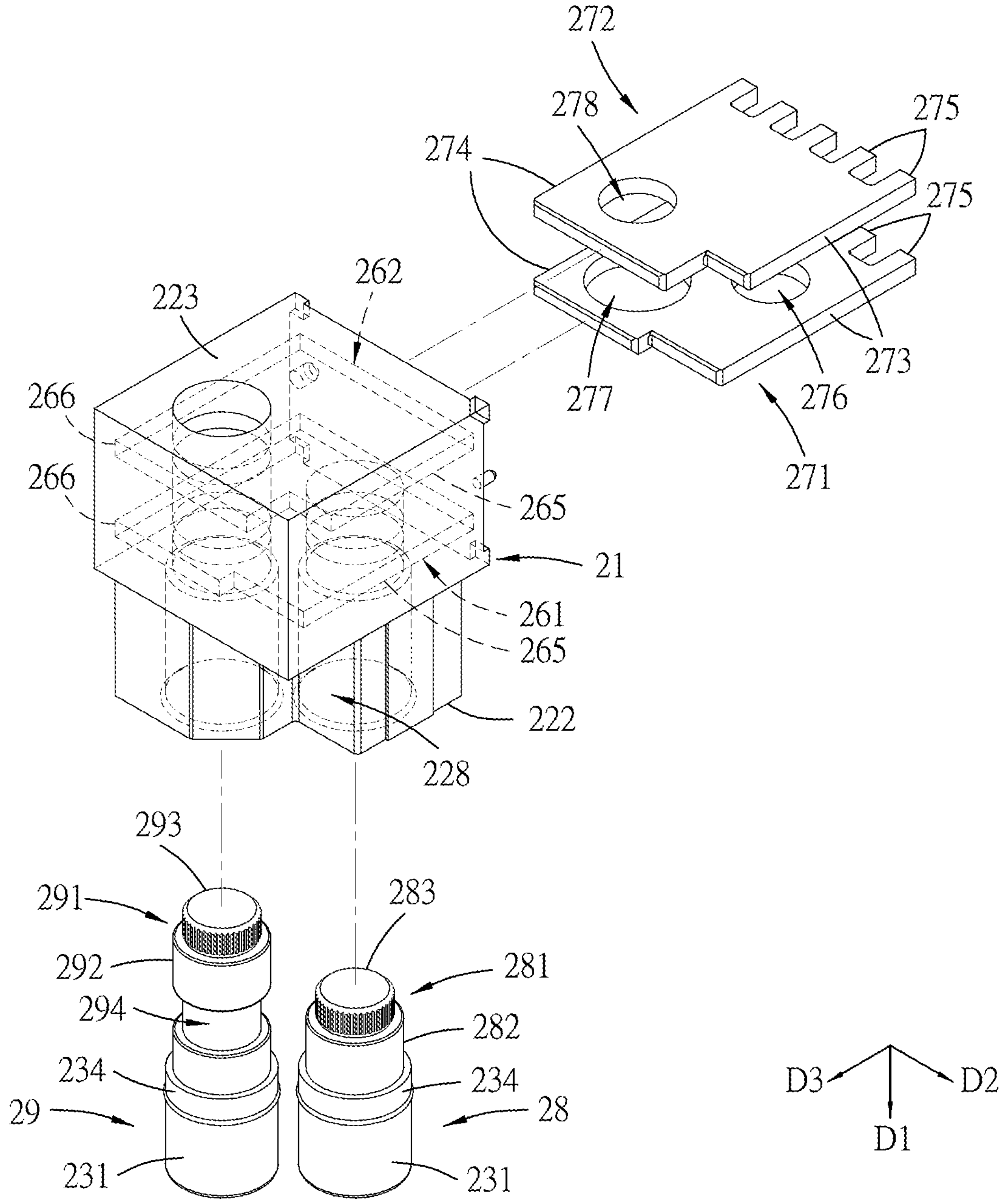
FIG. 51 is a perspective exploded view of the first connector of the tenth embodiment.
Figure 52:
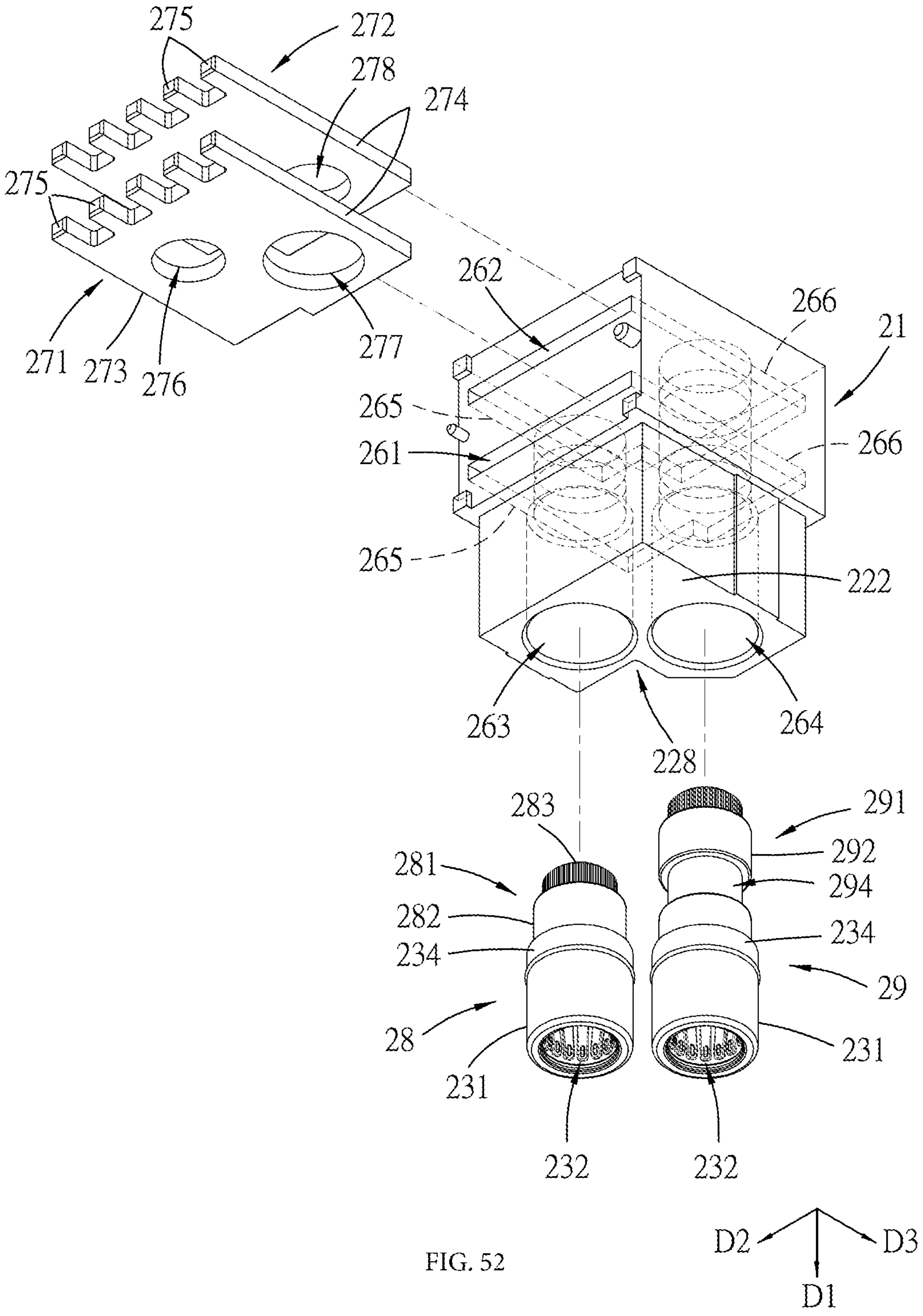
FIG. 52 is a perspective exploded view of the first connector of the tenth embodiment viewed from another angle.
Figure 53:
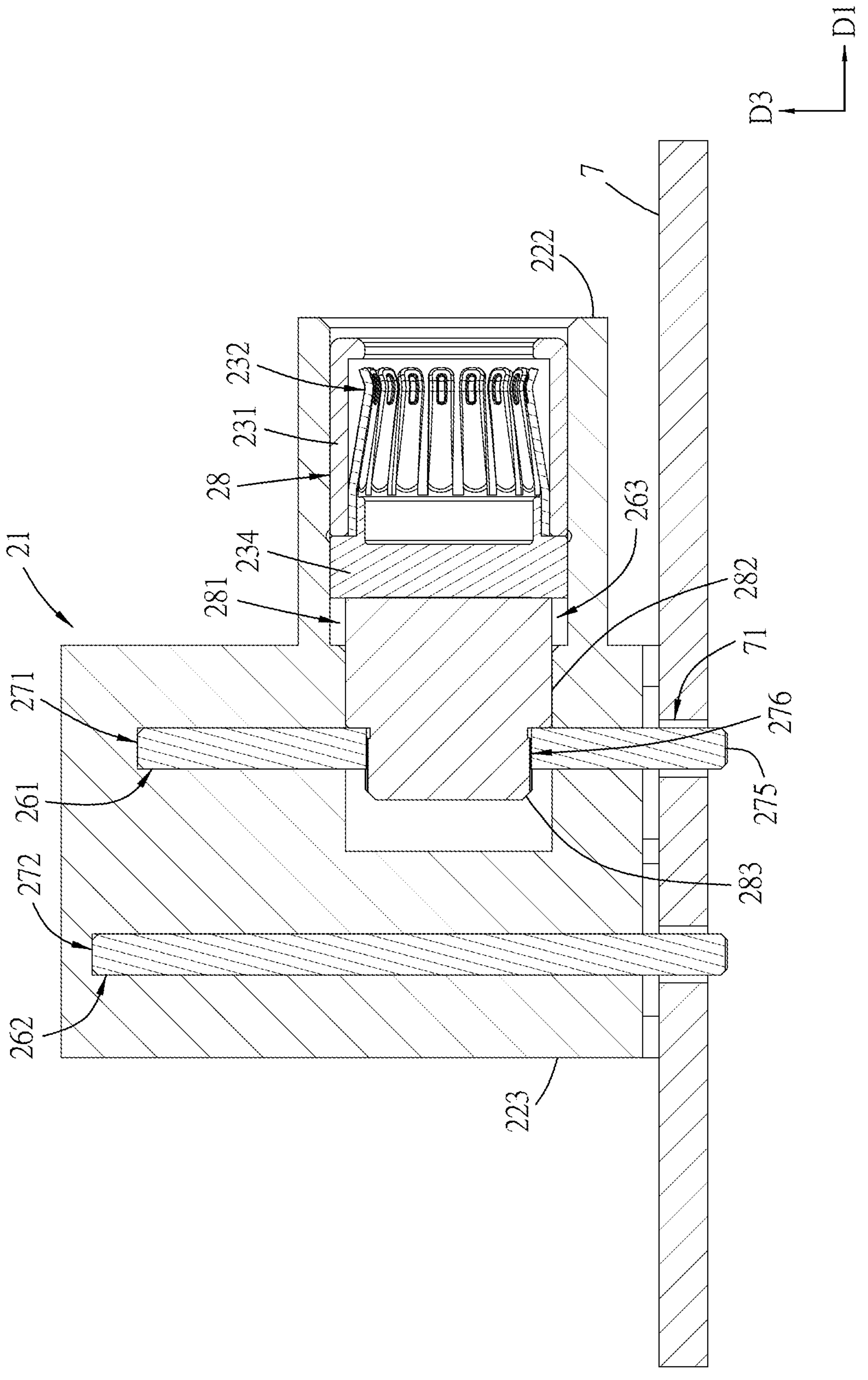
FIG. 53 is a cross sectional view of the first connector and the first circuit board of the tenth embodiment.
Figure 54:
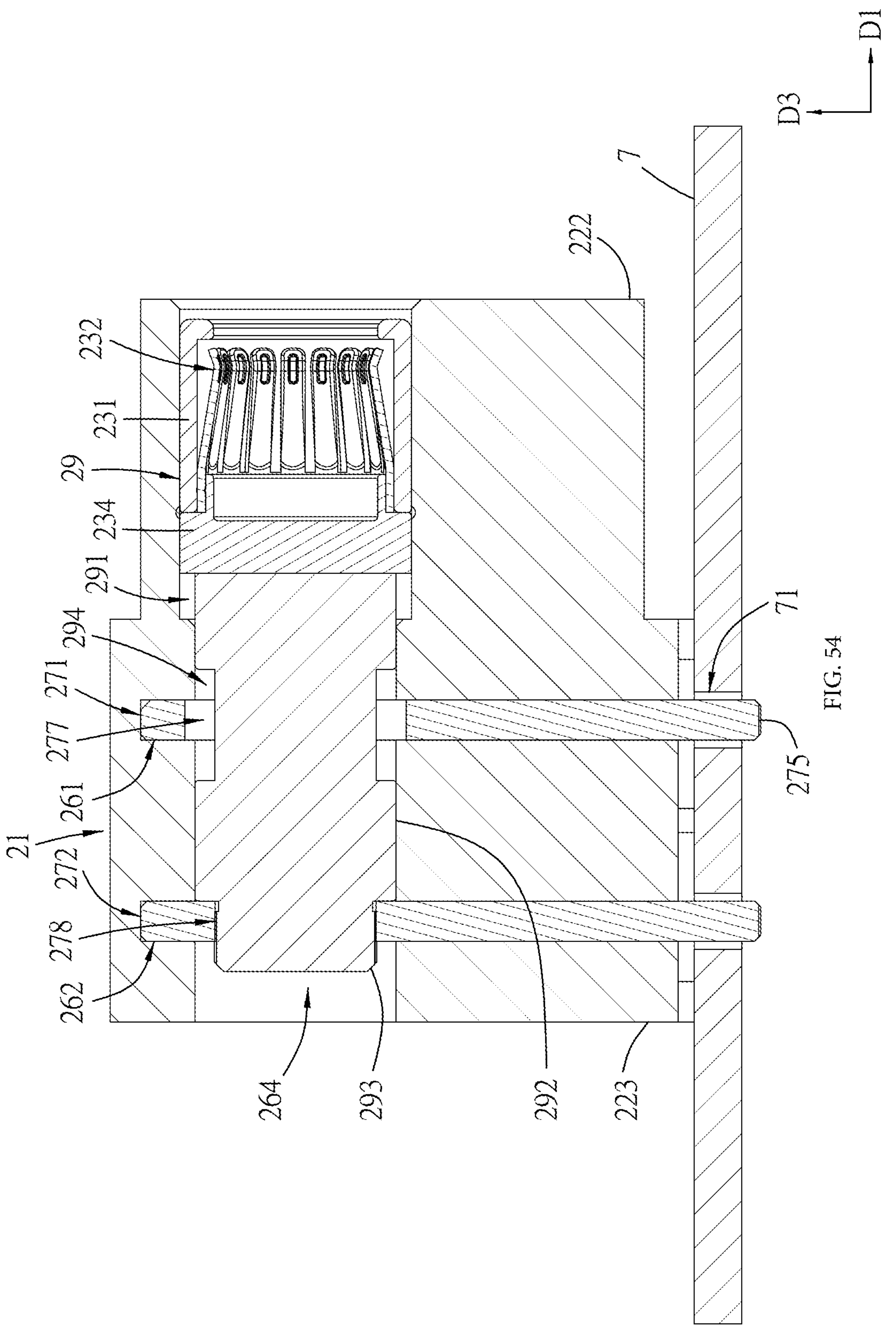
FIG. 54 is a cross sectional view of the first connector and the first circuit board of the tenth embodiment.

The second connector 4 is the same as the second connector 4 of the second embodiment in structure and does not have the locking structure 494 as shown in FIG. 49. Therefore, the first insulative outer housing 21 of the first connector 2 does not need provide the avoiding recessed groove 228 as shown in FIG. 49 which allows the locking structure 494 to be received therein.

Figure 56:
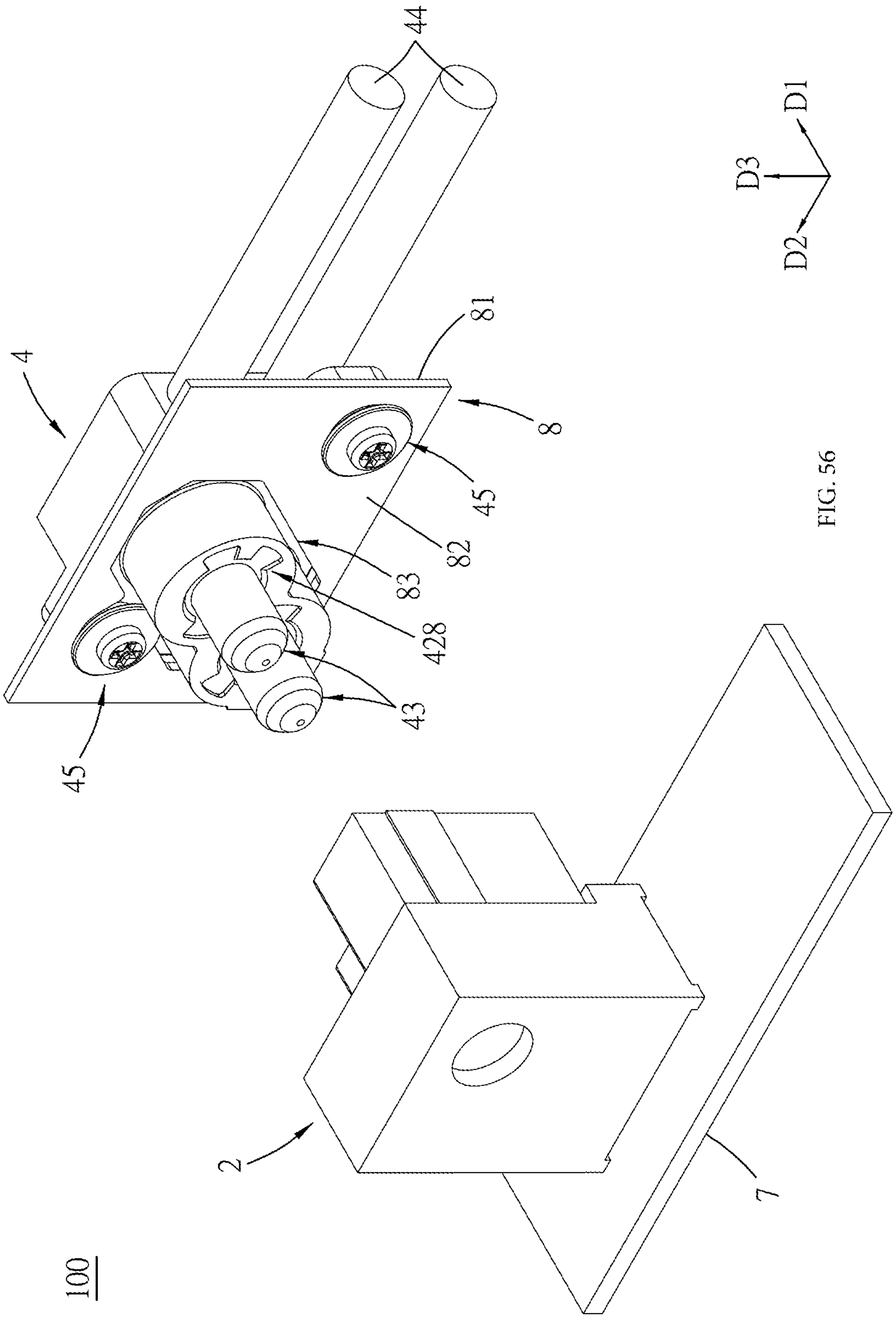
FIG. 56 is a perspective exploded view of a twelfth embodiment of the electrical connection device of the present disclosure.
Figure 57:
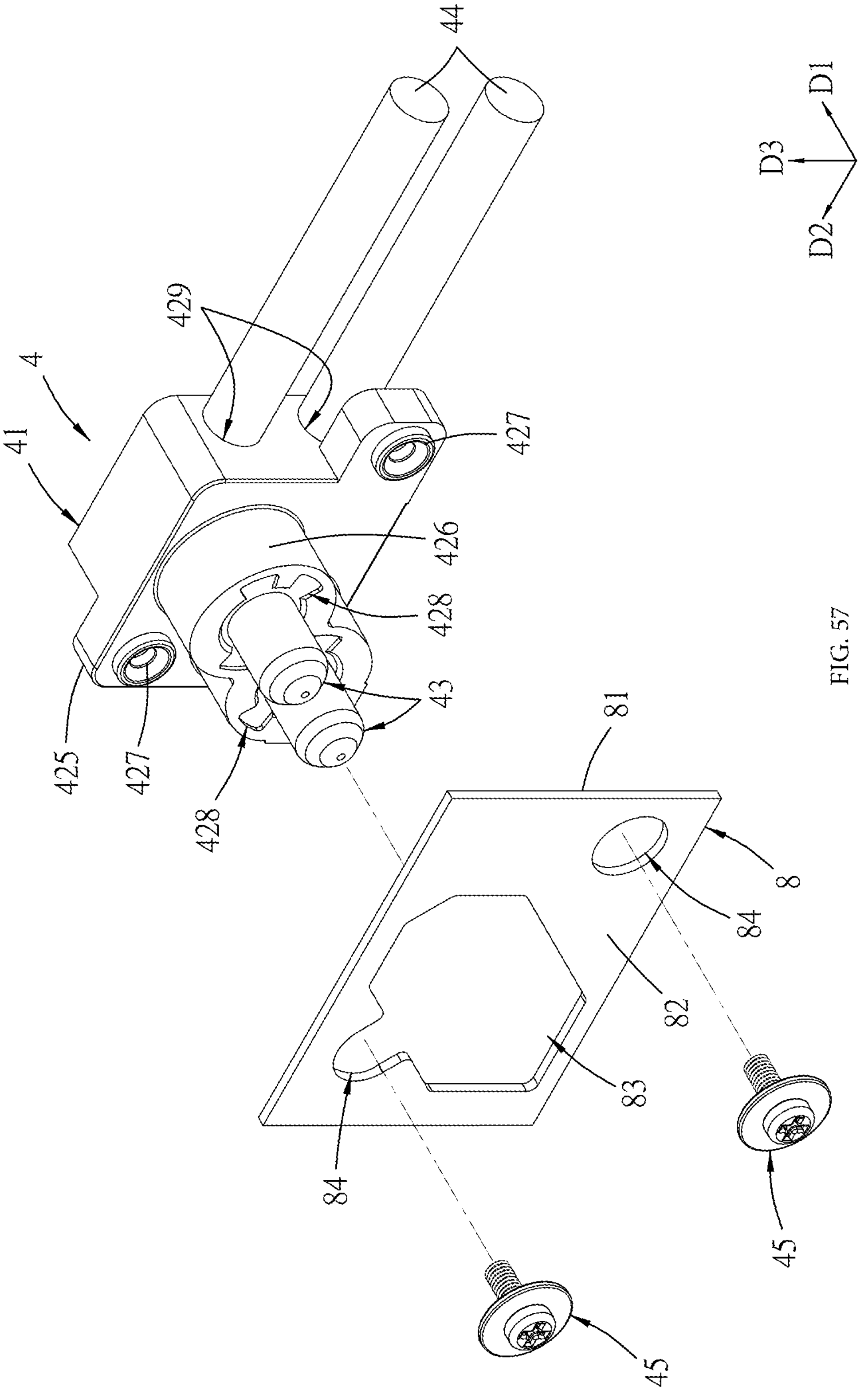
FIG. 57 is a perspective exploded view of the panel and the second connector of the twelfth embodiment.

Referring to FIG. 56 and FIG. 57, a twelfth embodiment of the electrical connection device 100 of the present disclosure is substantially the same as the first and tenth embodiments in entire structure, difference lies in the second connector 4.

The panel 8 of the electrical connection device 100 has the front face 81, the back face 82 and the panel foolproof portion 83. The panel foolproof portion 83 is a penetrating hole which extends between the front face 81 and the back face 82. A shape of the penetrating hole is an asymmetric shape. The panel 8 is formed with two engaging portions 84 which are obliquely arranged. One the engaging portion 84 of the two engaging portions 84 is a circular through hole which is adjacent to a lower right of the panel 8, the other engaging portion 84 of the two engaging portions 84 is an oblique through hole which is adjacent to an upper left of the panel 8 and is communicated with the panel foolproof portion 83.

The second connector 4 is a panel-end connector which is provided to the panel 8 and is used to mate with the first connector 2. The second insulative outer housing 41 of the second connector 4 has the mounting plate 425 which abuts against the front face 81 of the panel 8, the housing foolproof portion 426 which is provided to the mounting plate 425 and is used to cooperate with the panel foolproof portion 83, and mounting portions 427 which provided to the mounting plate 425. The second terminals 43 are obliquely arranged, the mounting portions 427 are obliquely arranged. A hole edge of each engaging portion 84 is spaced apart from an outer circumferential edge of the corresponding mounting portion 427, each mounting portion 427 is capable of floating in the two-dimensional plane in the corresponding engaging portion 84.

The second insulative outer housing 41 is formed with two receiving grooves 428, each receiving groove 428 allows the corresponding second terminal 43 and a part of the corresponding second cable 44 to be received therein. Each receiving groove 428 has a side cable-exiting opening 429 which is positioned to a side surface of the second insulative outer housing 41, each second cable 44 exits via the side cable-exiting opening 429 of the corresponding receiving groove 428. Therefore, a space occupied by the second connector 4 in the first direction D1 can be saved.

Although the first connector 2 of the twelfth embodiment takes a right-angle board-end connector as an example, but the present disclosure is not limited thereto, the first connector 2 also may be a right-angle board-end connector as shown in FIG. 55, or a straight board-end connector as shown in FIG. 40 or FIG. 47.

The electrical connection device 100 of the twelfth embodiment provides a technical solution that the right-angle board-end connector and the panel-end connector mate with each other, so that the electrical connection device 100 of the twelfth embodiment can be applied in the circumstance having the aforementioned need.

In conclusion, in the electrical connection device 100 of each embodiment, by that the volume of the first connector 2 and the volume of the second connector 4 can be miniaturized, the volume of the electrical connection device 100 constituted by the first connector 2 and the second connector 4 also can be miniaturized and can be applied in the circumstance of miniaturized product. Moreover, each embodiment provides the technical solution that different style connectors mate with each other, so that the electrical connection device 100 can be applied in circumstances having different needs. Therefore, the object of the present disclosure can be achieved indeed.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device, comprising:

a first panel comprising a first panel foolproof portion; and a first connector comprising a first insulative outer housing, two first terminals and two first cables, the first insulative outer housing being provided to the first panel and having a first housing foolproof portion which cooperates within the first panel foolproof portion, the two first terminals being diagonally provided to the first insulative outer housing, and the two first cables being electrically connected with the two first terminals respectively.

2. The electrical connection device of claim 1, wherein the first panel comprises a first front face and a first back face, the first panel foolproof portion is a penetrating hole which extends between the first front face and the first back face, and a shape of the penetrating hole is an asymmetric shape, and the first housing foolproof portion is a housing body which is provided to the first panel foolproof portion and partially protrudes from the first front face, a shape of the housing body is an asymmetric shape, and a front face shape of the first housing foolproof portion is the same as a front face shape of the first panel foolproof portion but is different from a back face shape of the first panel foolproof portion.

3. The electrical connection device of claim 1, wherein the first panel foolproof portion is a penetrating hole, and a shape of the penetrating hole is an asymmetric shape, the first insulative outer housing further has a first mounting plate which abuts against the first panel, and the first housing foolproof portion is a housing body which protrudes from an end of the first mounting plate, is provided to the first panel foolproof portion, and partially protrudes from the first panel, a shape of the housing body being an asymmetric shape.

4. The electrical connection device of claim 3, wherein the first mounting plate is in form of rectangular plate shape, the first insulative outer housing further has two first mounting portions which are provided to the first mounting plate and are mounted to the first panel, the two first terminals are obliquely arranged along a first diagonal line of the first mounting plate, and the two first mounting portions are obliquely arranged along a second diagonal line of the first mounting plate, and the second diagonal line intersects the first diagonal line.

5. The electrical connection device of claim 3, wherein the first insulative outer housing further has a first support housing body which protrudes from an end of the first mounting plate opposite to the first housing foolproof portion, the first mounting plate, the first housing foolproof portion and the first support housing body together define two first receiving grooves, and each first receiving groove allows the corresponding first terminal and a part of the corresponding first cable to be received therein, and the first support housing body is similar to the first housing foolproof portion in shape and is used to support the two first cables.

6. The electrical connection device of claim 1, further comprising:

a second connector mating with the first connector, the second connector comprising two second terminals which are diagonally provided, and the two second terminals are respectively electrically connected with the two first terminals.

7. The electrical connection device of claim 6, wherein each first terminal is a female terminal, the first insulative outer housing is formed with two first receiving grooves which allow the two first terminals to be respectively received therein, and the first insulative outer housing has two circumferential edge portions which respectively encircle the two first receiving grooves, and each second terminal is a male terminal and has a guiding conical surface, and the guiding conical surface is used to allow the corresponding circumferential edge portion to contact therewith and guide the corresponding circumferential edge portion to slide thereon.

8. The electrical connection device of claim 6, further comprising:

a second panel, the second panel comprising a second panel foolproof portion, the second connector further comprising a second insulative outer housing and two second cables, the second insulative outer housing being provided to the second panel and having a second housing foolproof portion which cooperates with the second panel foolproof portion, and the two second terminals being diagonally provided to the second insulative outer housing and being electrically connected with the two second cables, respectively.

9. The electrical connection device of claim 6, further comprising:

a circuit board, the second connector further comprising an insulative base which is provided to the circuit board, each first terminal being a female terminal which provided in the first insulative outer housing, each second terminal being a male terminal, and the two second terminals being diagonally provided to the insulative base and partially protruding from the insulative base.

10. An electrical connection device, comprising:

a first connector comprising a first insulative outer housing, at least two first terminals and at least two first cables, the first insulative outer housing having a first locking structure, the first terminals being obliquely provided to the first insulative outer housing, and the first cables being respectively electrically connected with the first terminals; and a second connector used to mate with the first connector and comprising a second insulative outer housing, at least two second terminals and at least two second cables, the second insulative outer housing having a second locking structure which is used to latch to the first locking structure, the second terminals being obliquely provided to the second insulative outer housing and being respectively used to be electrically connected to the first terminals, and the second cables being respectively electrically connected with the second terminals.

11. The electrical connection device of claim 10, wherein the first connector comprises three first terminals and three first cables which are respectively electrically connected with the three first terminals, and the three first terminals are in form of triangular arrangement, and the second connector comprises three second terminals and three second cables which are respectively electrically connected with the three second terminals, and the three second terminals are in a form of triangular arrangement.

12. The electrical connection device of claim 11, wherein the first insulative outer housing further has a first housing body which allows the three first terminals to be provided thereto, the first housing body is formed with a recessed portion which is between the three first terminals, and the first locking structure is provided to the recessed portion and is between the three first terminals, and the second insulative outer housing further has a second housing body which allows the three second terminals to be provided thereto, and the second locking structure protrudes from the second housing body and is between the three second terminals.

13. The electrical connection device of claim 10, wherein the first insulative outer housing further has a first housing body, the first housing body is formed with a recessed portion, the first terminals are obliquely arranged and are provided to the first housing body, the first locking structure is provided to the recessed portion, and the first locking structure and the first terminals are in form of triangular arrangement, and the second insulative outer housing further has a second housing body, the second terminals are obliquely arranged and are provided to the second housing body, the second locking structure protrudes from the second housing body, and the second locking structure and the second terminals are in form of triangular arrangement.

14. The electrical connection device of claim 13, wherein the electrical connection device further comprises a panel, the panel comprises a panel foolproof portion, and the second housing body is provided to the panel and has a housing foolproof portion which cooperates with the panel foolproof portion.

15. The electrical connection device of claim 14, wherein the panel foolproof portion is a penetrating hole, and a shape of the penetrating hole is an asymmetric shape, the second housing body has a mounting plate which abuts against the panel, and the housing foolproof portion is a housing body which protrudes from an end of the mounting plate, is provided to the panel foolproof portion, and partially protrudes from the panel, a shape of the housing body being an asymmetric shape.

16. The electrical connection device of claim 14, wherein the second housing body has a mounting plate which abuts against the panel and two mounting portions which are provided to the mounting plate and are mounted to the panel, one mounting portion of the two mounting portions and the second terminals are in a form of triangular arrangement, and the one mounting portion is transversely arranged at an outer side of the second locking structure, the other mounting portion of the two mounting portions and the second terminals are in a form of triangular arrangement, and the other mounting portion and the second locking structure are obliquely arranged, and the second connector further comprises two fastening assemblies, each fastening assembly is provided to the corresponding mounting portion, the mounting plate, and the panel, so as to make the panel and the second housing body securely engaged together.

17. An electrical connection device, comprising:

a first connector comprising a first insulative outer housing and two first terminals which are diagonally provided to the first insulative outer housing;

a first circuit board used to be electrically connected to the two first terminals;

a second connector used to mate with the first connector and comprising a second insulative outer housing and two second terminals which are diagonally provided to the second insulative outer housing, the two second terminals being respectively used to be electrically connected to the two first terminals; and a second circuit board used to be electrically connected to the two second terminals.

18. The electrical connection device of claim 17, wherein the first insulative outer housing is formed with an avoiding recessed groove, and the avoiding recessed groove and the two first terminals are in form of triangular arrangement, and the second insulative outer housing has a locking structure which is used to be received in the avoiding recessed groove, and the locking structure and the two second terminals are in a form of triangular arrangement.

19. The electrical connection device of claim 17, wherein each first terminal is a female terminal, and each second terminal is a male terminal which partially protrudes from the second insulative outer housing.

20. The electrical connection device of claim 17, wherein the first connector is a straight board-end connector, the first insulative outer housing is formed with two perforations, and the two first terminals are respectively provided to the two perforations and are electrically connected to the first circuit board.

21. The electrical connection device of claim 17, wherein the first connector is a right-angle board-end connector, the first connector further comprises a first adapting plate and a second adapting plate which are provided in the first insulative outer housing, and the first adapting plate and the second adapting plate are arranged and spaced apart from each other along a first direction and are respectively electrically connected to two first terminals, and the first adapting plate and the second adapting plate are electrically connected to the first circuit board.

* * * * *